(12) United States Patent
Ols

(10) Patent No.: US 8,374,725 B1
(45) Date of Patent: Feb. 12, 2013

(54) CLIMATE CONTROL

(76) Inventor: Joseph David Ols, Los Gatos, CA (US)

( * ) Notice: Subject to any disclaimer, the term of this patent is extended or adjusted under 35 U.S.C. 154(b) by 886 days.

(21) Appl. No.: 12/315,152

(22) Filed: Nov. 26, 2008

Related U.S. Application Data

(60) Provisional application No. 61/004,475, filed on Nov. 27, 2007.

(51) Int. Cl.
  *G06F 19/00* (2011.01)
(52) U.S. Cl. ........................ 700/277; 261/118
(58) Field of Classification Search .............. 700/277, 700/276, 275; 261/118; 715/777, 863
  See application file for complete search history.

(56) References Cited

U.S. PATENT DOCUMENTS

| | | |
|---|---|---|
| 4,406,397 A | 9/1983 | Kamata |
| 4,646,964 A | 3/1987 | Parker |
| 4,921,163 A | 5/1990 | Viessmann |
| 5,180,102 A | 1/1993 | Gilbert |
| 5,181,653 A | 1/1993 | Forester |
| 5,186,237 A | 2/1993 | Adasek |
| 5,245,835 A | 9/1993 | Cohen |
| 5,307,990 A | 5/1994 | Adams |
| 5,318,104 A | 6/1994 | Shah |
| 5,348,078 A | 9/1994 | Dushane |
| 5,361,982 A | 11/1994 | Liebl |
| 5,394,324 A | 2/1995 | Clearwater |
| 5,395,042 A * | 3/1995 | Riley et al. .................. 236/46 R |
| 6,739,145 B2 * | 5/2004 | Bhatnagar ....................... 62/127 |
| 6,798,641 B1 * | 9/2004 | Hopper et al. ............. 361/306.1 |
| 6,934,862 B2 * | 8/2005 | Sharood et al. ............... 713/300 |
| 7,004,554 B2 * | 2/2006 | Takekoshi et al. ................ 347/2 |
| 7,274,972 B2 * | 9/2007 | Amundson et al. ........... 700/276 |
| 2009/0140057 A1 * | 6/2009 | Leen ............................ 236/49.3 |

* cited by examiner

*Primary Examiner* — Kidest Bahta

(57) ABSTRACT

A system is provided in which the dampers may be individually controlled. The climate control system may be retrofit to an existing climate control system by connecting the controller to the existing climate control equipment through the thermostat interface. The climate control system may be monitored and set via a remote server.

25 Claims, 35 Drawing Sheets

Greeting 602

| Hello Sue Brown! | 12:08pm |

Current Setpoints 708  710  712  714  704

| From (day) | To (day) | From (time) | To (time) | Temperature | *Delete* this setpoint | *Change* this setpoint |
|---|---|---|---|---|---|---|
| Mon | Fri | 9am | 6pm | 70 °F | [Delete] | [Change] |
| 4-1 | 4-7 | | | off | [Delete] | [Change] |
| 4-8 | 4-8 | 8am | 7pm | 70 °F | [Delete] | [Change] |
| 4-14 | 4-14 | noon | 3pm | off | [Delete] | [Change] |

706   Set Point Tool 716

718  720  722  724  726  728a

| Period | Beginning Date | Ending Date | Beginning & Ending Times | Desired Temp. | |
|---|---|---|---|---|---|
| ○ Every Day* | Monday | Friday | From: [1] [01] [am]  To: [1] [01] [am] | Temp: [30] °F | [Enter] |
| ○ One Day | ◄ June 2004 ►  Su Mo Tu We Th Fr Sa  1 2 3 4 5  6 7 8 9 10 11 12  13 14 15 16 17 18 19  20 21 22 23 24 25 26  27 28 29 30 | | From: [1] [01] [am]  To: [ ] [01] [am] | Temp: [30] °F | |
| ○ Days* | ◄ June 2004 ►  Su Mo Tu We Th Fr Sa  1 2 3 4 5  6 7 8 9 10 11 12  13 14 15 16 17 18 19  20 21 22 23 24 25 26  27 28 29 30 | ◄ June 2004 ►  Su Mo Tu We Th Fr Sa  1 2 3 4 5  6 7 8 9 10 11 12  13 14 15 16 17 18 19  20 21 22 23 24 25 26  27 28 29 30 | From: [1] [01] [am]  To: [1] [01] [am] | Temp: [30] °F | |

[Enter]   * scheduled workdays only; excluding weekends & holidays   | Select units  ○ Celeius  ● Fahrenheit |

728b           Tool Tips 730          Format Options 636

FIG. 7

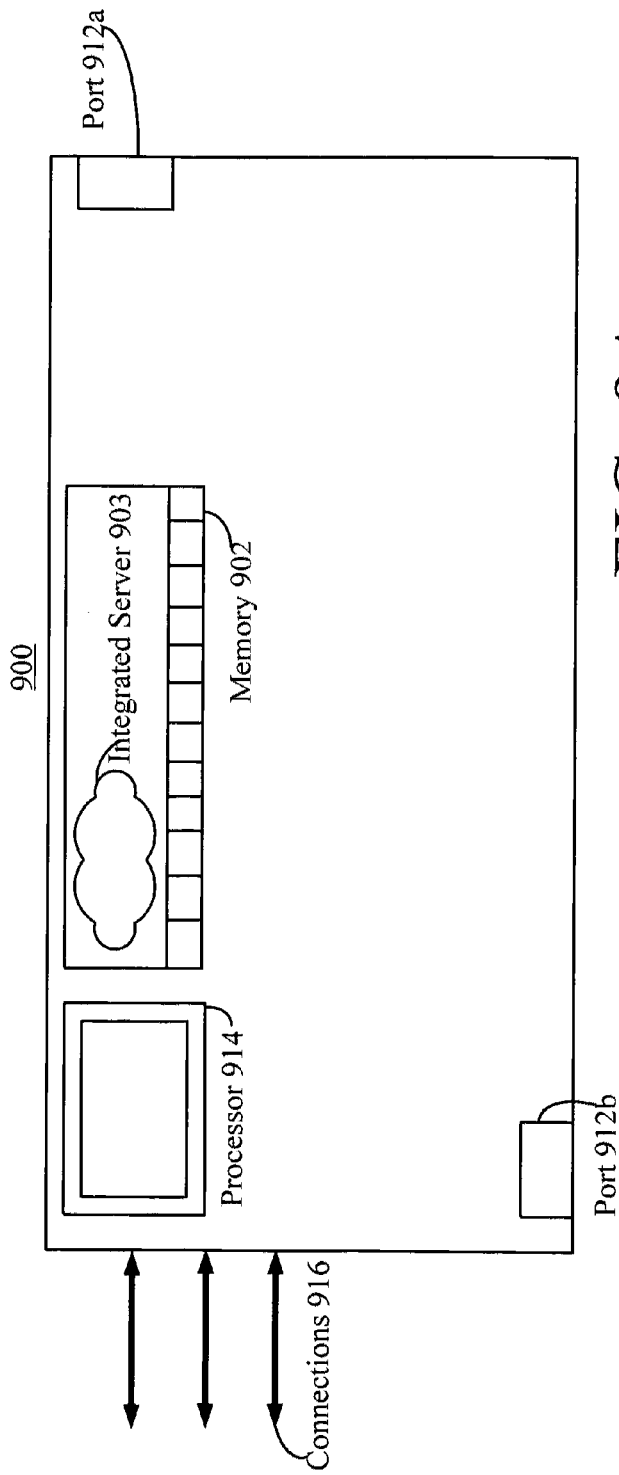
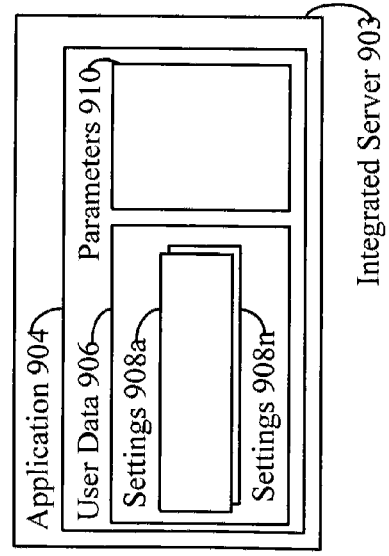
FIG. 9A
FIG. 9B

Zone Temp / Algorithm Database

| Room # | Nominal Duct CFM | Max Duct CFM (normal) | Max Duct CFM (low noise mode) | Add'l Flow coefficient | User Desired Temp (at 50% RH) | Tolerance (+/- degrees) | Measured Humidity | Measured Temperature |
|---|---|---|---|---|---|---|---|---|
| 1 | 1000 | 2000 | 1333 | 1 | 66 | 1.5 | 30% | 70 |
| 2 | 1100 | 2200 | 1467 | 1.1 | 67 | 2 | 40% | 70 |
| 3 | 1200 | 2400 | 1600 | 1.2 | 68 | 2.5 | 50% | 70 |
| 4 | 1300 | 2600 | 1733 | 1.3 | 69 | 2 | 60% | 70 |
| 5 | 1400 | 2800 | 1867 | 1.4 | 70 | 1.2 | 70% | 71 |
| 6 | 1500 | 3000 | 2000 | 1.5 | 71 | 1 | 80% | 71 |
| 7 | 1600 | 3200 | 2133 | 1.6 | 72 | 1.5 | 40% | 72 |
| 8 | 1700 | 3400 | 2267 | 1.7 | 73 | 3 | 50% | 72 |

FIG. 10A

| 1020 Comfort Control (humidity adjustment) On? | 1022 User Desired Temp (at actual RH) | 1024 Controller Adjusted Setpoint Temp | 1026 Temp Error | 1028 Error Signal = Temp Error * Add'l Flow Coeff | 1030 Share of airflow to this zone | 1032 % of Full on duct airflow to this zone | 1034 Desired Duct CFM | 1036 Desired open position (degrees) | 1038 Actual open position (degrees) | 1040 Calculated Airflow into Zone | 1042 Is Airhandler On or Off for this Marcozone? |
|---|---|---|---|---|---|---|---|---|---|---|---|
| no | 70 | 66 | 4 | 4 | 32% | 100% | 1,000 | 90.0 | | | |
| no | 70 | 67 | 3 | 3.3 | 27% | 83% | 908 | 74.3 | | | |
| no | 70 | 68 | 2 | 2.4 | 19% | 60% | 720 | 54.0 | | | |
| no | 70 | 69 | 1 | 1.3 | 10% | 33% | 423 | 29.3 | | | |
| no | 71 | 70 | 1 | 1.4 | 11% | 35% | 490 | 31.5 | | | |
| no | 71 | 71 | 0 | 0 | 0% | 0% | | 0.0 | | | |
| no | 72 | 72 | 0 | 0 | 0% | 0% | | 0.0 | | | |
| no | 72 | 73 | 0 | 0 | 0% | 0% | | 0.0 | | | |
| | | | SUM | 12.4 | 100% | | 3,540 | | | | |
| | | | MAX | 4 | 32% | | | | | | |
| | | | AVG. | 1.55 | | | | | | | |

CLIMATE CONTROL

CROSS-REFERENCE TO RELATED APPLICATIONS

This application claims priority benefit of U.S. Provisional Patent Application No. 61/004,475 filed, Nov. 27, 2007, which is incorporated herein by reference.

FIELD

The specification generally relates to regulating climates.

NOTICE OF COPYRIGHT

A portion or portions of the disclosure of this document contains content that is subject to protection by copyright. There is no objection by the copyright owner to the facsimile reproduction of the patent document and/or the patent disclosure as it is displayed in the records and files of the Patent and Trademark Office, however, the copyright owner reserves all protections otherwise afforded.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Heating and cooling equipment is old and well known. However, heating and cooling equipment often does not provide the flexibility to control the climate in each of a number of different areas as desired. For example, it may not be possible to keep the temperature of two different rooms within the desired temperature ranges for each room. Additionally, retrofitting new climate control equipment to already existing equipment may be difficult because of the large number of different interfaces.

BRIEF DESCRIPTION OF THE FIGURES

In the following drawings like reference numbers are used to refer to like elements. Although the following figures depict various examples of the invention, the invention is not limited to the examples depicted in the figures.

FIG. 7 shows a block diagram of a Graphical User Interface associated with set points.

FIG. 9A shows a block diagram of the hardware components of a sensor.

FIG. 9B shows a block diagram of the content of the memory of a remote server.

FIG. 10A shows a block diagram of a portion of a computation table associated with a retrofit control system.

FIG. 10B shows another block diagram of a portion of a computation table associated with a retrofit control system

FIG. 17 shows screenshot of an embodiment of a Graphical User Interface for the system of FIG. 1.

FIG. 18 shows screenshot of an embodiment of a Graphical User Interface for the system of FIG. 1.

FIG. 24 shows a screenshot of an embodiment of a Graphical User Interface possibly for a Chief Administrator of the system of FIG. 1 to monitor users.

FIG. 25 shows a screenshot of an embodiment of a Graphical User Interface possibly for a Chief Administrator of the system of FIG. 1 to set allowable ranges climate parameters.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1A-10 is a brief description of each element, which may have no more than the name of each of the elements in the particular figure that is being discussed. After the brief description of each element, each element of FIGS. 1A-10 is further discussed in numerical order. In general, each of FIGS. 1A-12B is discussed in numerical order, and the elements within FIGS. 1A-12B are also usually discussed in numerical order to facilitate easily locating the discussion of a particular element. Nonetheless, there is not necessarily any one location where all of the information of any element of FIGS. 1A-12B is located. Unique information about any particular element or any other aspect of any of FIGS. 1A-12B may be found in, or implied by, any part of the specification.

Figure 1A:
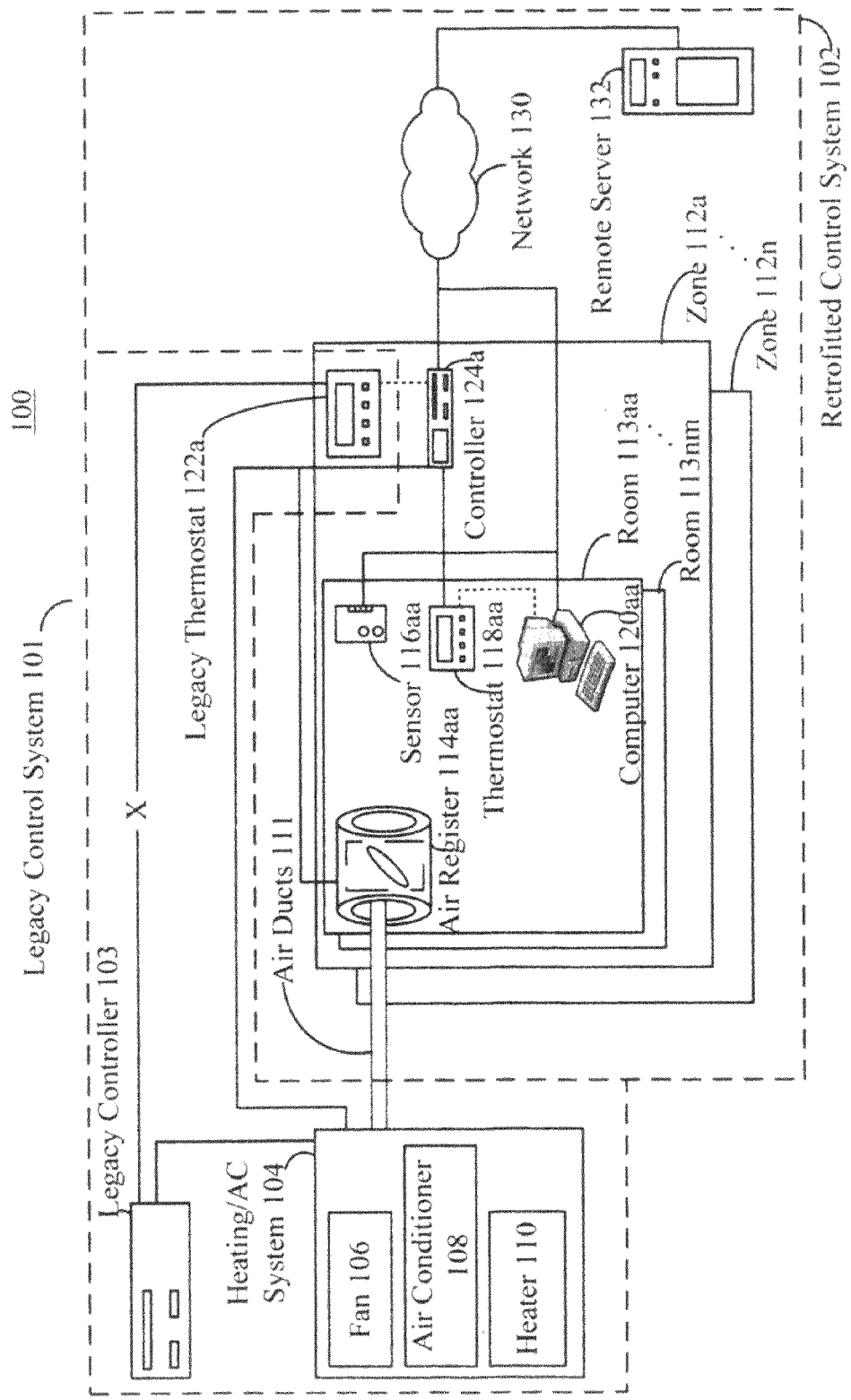
FIG. 1A shows a block diagram of an embodiment of a climate control system.

FIG. 1A shows a diagram of an embodiment of a climate control system 100. Climate control system 100 includes legacy control system 101, having legacy controller 103, and heating/AC system 104, which includes fan 106, air conditioner 108 and heater 110. In this specification, the term "heating/AC" and "HVAC" may be substituted for one another in any place in the specification to obtain new embodiments. Climate control system 100 further includes air ducts 111 and retrofit control system 102, having zones 112a-112n, which include legacy thermostats 122a-122n, controllers 124a-124n, and rooms 113aa-113nm. Rooms 113aa-113nm include air registers 114aa-114nm, sensors 116aa-116nm, optional thermostats 118aa-118nm and computers 120aa-120nm. Climate control system 100 also includes network 130 and remote server 132. In other embodiments, climate control system 100 may not have all of the components listed above or may have other components instead of and/or in addition to those listed above (e.g., humidity control and fresh air control).

Climate control system 100 may regulate temperatures and climate settings for any of a plurality of rooms and/or zones, thereby providing more precise management of temperatures, climates, and/or energy consumption.

Legacy control system 101 is a pre-existing control system for a heating, cooling, and/or ventilation.

Retrofit control system 102 is a control system that replaces all or at least a part of legacy control system 101, and regulates temperatures and climate settings for any one or more of rooms 113aa-113nm and/or zones 112a-112n. In an embodiment, retrofit control system 102 allows more precise climate control over locations and may control the climate by heating, cooling, ventilation, and other climate systems such as humidification, dehumidification, return air source (e.g., fresh/outside air control and/or multiple inside sources), steam/hot-water heat, under floor heating/cooling, steam generation (incl for steam baths), resistive (e.g. baseboard) heaters, sauna control, etc.

Legacy controller 103 may be an existing controller for controlling a heating, ventilation, air conditioning and/or other climate control system. In an embodiment, legacy controller 102 may control temperature settings by switching components (e.g. a heat pump, heater, air cooling unit, or fan) on and off and/or changing their settings (e.g., motor speeds and/or the amount of heated or cooled air generated). Legacy controller 103 may be coupled with a thermostat that directs the switching function of legacy controller 103, an automated controller directed by programmable settings, or any of the plurality of controllers that are used for controlling heating, ventilation, and air conditioning systems. Legacy controller 103 may be disconnected, partially disabled, and/or fully disabled in the process of retrofitting (e.g., installing) retrofit control system 102 within climate control system 100.

Heating/AC system 104 may circulate air to any of a plurality of locations associated with climate control system 100. Heating/AC system 104 may heat and/or cool the location. The air circulated may be heated, cooled, or unaltered. In other embodiments, heating/AC system 104 may include other components, such as one or more heat pumps, humidifiers, and/or sump pumps in addition to, or instead of, fan 106, air conditioner 108, and/or heater 110.

Fan 106 may cause air to flow and/or circulate within climate control system 100. In an embodiment, fan 106 may direct air into a ventilation system, which causes it to enter and/or circulate through ducts and/or within an environment. Fan 106 may be a single fan. In another embodiment, fan 106 is replaced by a system of fans. Fan 106 or any of the fans of climate control system 100 may be included within a heater, an air conditioner, or may be a separate unit.

Air conditioner 108 may be any type of unit or device for cooling air. In an embodiment, air conditioner 108 cools air, which is sent into an environment in which it is desirable to reduce the temperature. Heater 110 may be any type of unit or device for heating air (e.g., a gas or electric heater). In an embodiment, heater 110 may direct heated air into an environment in which it is desirable to increase the temperature. Air conditioner 108 and/or heater 110 may have a fan for distributing the heated or cooled air. In an embodiment, fan 106 may be part of heater 110 and/or air conditioner 108. In another embodiment, fan 106 may be a separate unit and optionally air conditioner 108 and/or heater 110 may have their own fan.

Air ducts 111 may be a system of one or more ducts, which may be suitable for delivering heated, cooled, otherwise altered, and/or unaltered air. In an embodiment, air duct 111 may be a segmented network of interconnected ventilation ducts. Air ducts 111 may include one or more valves for directing the flow and volume of air that flows through any given duct. Air ducts 111 are the conduit through which air is delivered from heating A/C system 104 to the individual rooms and zones of climate control system 100 (which will be discussed below). Air ducts 111 may be used for ventilation, dumping air outside, and bringing air inside. Fan 106 may be located within air ducts 111 and/or at an entrance to one or more air ducts 111.

Each of zones 112a-112n is a collection of one or more locations. Each of the locations within a zone has at least one climate parameter that is controlled to have related values throughout the zone. In a simple case, the particular zone has one sensor and one air register or another piece of equipment that allows conditioned air to enter the room (or to otherwise control the climate parameter which is measured). In another example, instead of having just one sensor, the zone has multiple sensors, and the average value of the measurements or some other function of the measurements of the sensors is used in place of a single sensor measurement to determine the settings for controlling the climate. As another example, there is one sensor and multiple air registers or multiple pieces of another type of equipment that affects the climate of the zone, and each air register or other piece of equipment is controlled to maintain a particular reading of at least one climate parameter. As a more specific example, one portion of a zone having one temperature sensor may be sent more cool air or less hot air than another portion of the zone, because one portion tends to receive more sunlight. As another more specific example, one portion of a zone having one temperature sensor may be sent more cool air or less hot air than another portion of the zone, because one portion may need to be kept cooler than another portion of the same zone, so as to keep certain equipment at a cooler temperature. In another example, there are multiple sensors and multiple air registers or other multiple pieces of equipment are used instead of a single measurement from a single sensor to determine one or more settings of a climate control parameter. In another embodiment, one or more functions of a combination of the measurements from the sensors are used instead the values of the various sensor readings to determine one or more settings of a climate control parameter. For example, all of the air registers may be opened by related amounts. The related amounts may be amounts that are expected to produce a particular value of the function (the function of the combination of the individual sensor measurements). Alternatively or additionally, the related amounts may be amounts (that the registers are opened) that are expected to produce related values of the measurements at different locations in the zone at which there may or may not be one or more sensors. For example, by opening different registers by different pre-calculated amounts different parts of a room may be maintained at different temperature according to different people's preferences listed in those locations even though there is only one temperature sensor, and instead of maintaining the sensor at a given temperature a function may be minimized, where the function may be the sum of the absolute differences between the expected and desired temperatures at each locations in the room.

For a Multi Input, Multi Output (MIMO) system each sensory location monitors one or more climate parameters (e.g., temperature, humidity, CO, $CO_2$, VOCs, radioactivity, and/or biological contaminants). The state of the air flowing through ducts may be controlled by individually controlling individual dampers, registers, and/or other actuators within the ducts and/or zones, and/or by controlling groups of dampers, registers, and/or other actuators within the ducts and/or zones together. The control may be for affecting one output variable (e.g., heating air) or for multiple output variables (e.g., heating air, cooling air, humidifying air, dehumidifying air, airflow rate, airflow duty cycle, and/or percent fresh outside air). The relationship between Sensor Inputs and Actuated Outputs may be Single Input and Single Output (SISO), MIMO, (e.g., multi inputs from one sensor location OR from many sensor locations and/or one or more estimated state(s) of the Climate System, multi output), SIMO or MISO.

Each of zones $112a$-$112n$ may include one or more rooms $113aa$-$113nm$ (mentioned below). Optionally, there may be one or more zones within the same room (especially if the room is large, includes dividers, includes partitions, and/or includes multiple cubicles).

Each of rooms $113aa$-$113nm$ is a walled-in location within one or more of zones $112a$-$112n$ within which climate regulation is implemented via retrofit control system 102 (mentioned above). Rooms $113aa$-$113nm$ may contain, air registers $114aa$-$114nm$, sensors $116aa$-$116nm$, optional thermostats $118aa$-$118nm$, and/or computers $120aa$-$120nm$ (which will be discussed below). Rooms $113aa$-$113nm$ are examples of user locations. In the specification a user location is a location for which it is convenient to set to one uniform set of climate settings. In an embodiment, user locations are chosen according to which locations tend to be used by the same user or group of users. For example, a user location may be a work area of a particular user or group of users. As an example of the definition of the term user location, if the climate control is only regulating the temperature, any given individual user location has only one temperature setting. In an embodiment, other user locations may be included within control system 100 instead of, and/or in addition to, rooms $113aa$-$113nm$. Although in FIG. 1A each of rooms $113aa$-$133nm$ is depicted as being with a zone, and no rooms contain multiple zones, in an embodiment a room may contain multiple zones or a zone may contain multiple rooms. For example, a large room having many cubicles may be divided into multiple zones, one zone for each air register. It may be advantageous to divide a large room into multiple zones in situations where the environment tends to heat or cool one part of a room more so than another. For example, in a large room which gets sunlight on only one side, it may be desirable to either heat less or cool more of the portion of the room which receives the extra sunlight.

Air registers $114aa$-$114nm$ allow, limit, or prevent the flow of air from air ducts 111 into and/or from rooms $113aa$-$113nm$, where (for example) one of air registers $114aa$-$114nm$ is located. Air registers $114aa$-$114nm$ may be any airflow modifying devices, such as dampers (which restrict airflow) and/or duct fans (which increase airflow). In an embodiment, air registers $114aa$-$114nm$ may connect air ducts 111 to a room. In another embodiment, air registers $114aa$-$114nm$ may be located within air ducts 111 at a segment other than the segment conjoining air ducts 111 with a room. Air registers $114aa$-$114nm$ may be retrofit into a legacy climate control system 101 and may be controlled by a climate control system retrofit onto the legacy control system (e.g., retrofit control system 102). Although in FIG. 1A there is a one-to-one relationship between rooms $113aa$-$113nm$ and air registers $114aa$-$114nm$, in an embodiment, there may be multiple air registers in any of rooms $113aa$-$113nm$ and/or there may be some of rooms $113aa$-$113nm$ that do not have an air register.

Sensors $116aa$-$116nm$ may monitor the state of a room (e.g. the temperature, humidity, presence of individuals, concentrations of CO, $CO_2$, radioactivity, organic compounds, etc.) and/or devices that indicate the location of individuals or equipment that requires a certain climate (e.g., an RFID device) in a location associated with one or more sensors $116aa$-$nm$. A discussion of an embodiment of a sensor that may be used for any combination of sensors $116aa$-$116nm$ is discussed in conjunction with FIGS. 5A-5C. In an embodiment there is at least one sensor in each room and/or user location. Although in FIG. 1A there is a one-to-one relationship between rooms $113aa$-$113nm$ and sensors $116aa$-$116nm$, in an embodiment, there may be multiple sensors in any of rooms $113aa$-$113nm$ (to obtain more accurate climate information of the room, especially if the room contains more than one zone) and/or there may be some of rooms $113aa$-$113nm$ and/or user locations that do not have sensor. In an embodiment, there is at least one sensor in each zone.

Optional thermostats $118aa$-$118nm$ may receive and/or display temperature and/or other sensor readings from sensors $116aa$-$116nm$ (for example, or from other sensor). Optional thermostats $118aa$-$118nm$ may be used for inputting or modifying (e.g., a device that allows a user to change the setpoint a given number of degrees and/or HVAC On/Off control) desired climate settings, and optional thermostats $118aa$-$118nm$ sends output signals to a controller that manages the climate of a room. Computers $120aa$-$120nm$ implement a browser or specialized software that functions as a digital thermostat for controlling climate settings for one or more environments associated with heating/AC system 104. In an embodiment, computers $120aa$-$120nm$ may be a personal computer, laptop, personal assistant, wireless phone, or any network device capable of rendering a browser interface and/or executing software for interacting with climate control system 100. Computers $120aa$-$nm$ are optional. In an embodiment, computers $120aa$-$120nm$ may perform one or more of the functions of and/or may replace optional thermostats $118aa$-$118nm$.

Computers 120aa-120nm may render a graphical user interface (GUI) that displays any or all of the one or more environments associated with heating/AC system 104, and/or a climate controller. Computers 120aa-120nm may store settings to any storage medium that can be read by a computing device and/or to a network associated with a climate controller. In an embodiment, computers 120aa-120nm may be an embodiment of computer 800 (of FIG. 8A).

Legacy thermostats 122a-122n may be pre-existing devices for regulating temperatures via legacy controller 103. In an embodiment, each of zones 112a-112n includes at least one of legacy thermostats 122a-122n. In an embodiment, legacy thermostats 122a-122n, which would control temperatures for one or more rooms 113aa-113nm, are disconnected, and instead computers 102aa-120nm access (e.g., via a browser) a GUI on an external server to enter climate settings. Alternatively, one or more of optional thermostats 118aa-118nm may be used for entering climate settings instead of legacy thermostats 122a-122n. Further, legacy thermostats 122a-122n, prior to being disconnected, may have had the limitation of being incapable of controlling climates of individual rooms and/or user locations within a group of rooms that were regulated by one of legacy thermostats 122a-122n.

Controllers 124a-124n regulate temperature settings for individual rooms and zones. In an embodiment, controllers 124a-124n are configured to control, circumvent, and/or partially circumvent a preexisting legacy controller 103.

In an embodiment, controllers 124a-124n may receive temperature and humidity (and/or other sensor) measurements from a sensor 116aa-116nm. Controllers 124a-124n may receive temperature, humidity, and/or other schedule settings from thermostat 118aa-118nm and/or computers 120aa-120nm. Based on the sensor measurements and the settings received, one or more of controllers 124a-124n may determine whether to turn on or turn off at least one or more of fan 106, air conditioner 108, heater 110. Controllers 124a-124n may also determine whether to adjust the positions of the dampers of air registers 114aa-114nm. Further, controllers 124a-124n may control signals for changing the state and/or settings of components of climate control system 100. In an embodiment, controllers 124a-124n may be communicatively coupled with others of controllers 124a-124n within climate control system 100. Controllers 124a-124n may send and/or receive updates (e.g., new climate readings, user settings, and/or inputs to a thermostat) to and from communicatively coupled components within climate control system 100. As a result of the updating, directives to heating/AC system 104 may be computed and implemented for altering temperature settings, the position of one or more dampers within one or more air registers 114aa-114nm, and display information associated with a GUI (such as GUI 600 and/or GUI 700 of FIGS. 6 and 7, respectively).

In an embodiment, one or more of controllers 124a-124n may regularly monitor and manage the operations of climate control system 100. For example, controllers 124a-124n may communicate with other controllers, one or more sensors 116aa-116nm, optional thermostats 118aa-118nm, and/or other devices communicatively coupled with a network. As a result, information related to climate control system 100 components within rooms 113aa-113nm, their status, readings and/or settings may be returned to the one or more of controllers 124a-124n. Controllers 124a-124n may also retrieve configuration settings from a server and/or other devices coupled with a network. Prior to sending control directives to components of climate control system 100 (e.g., heating/AC system 104 and/or air registers 114aa-114nm), the master controller (e.g., one of controllers 124a-124n) may determine the most efficient manner of maintaining climate conditions in one room by considering the climate conditions in other rooms (e.g. by considering the state of the entire system). Consequently, to consider the state of the entire system, the master controller may cross reference climate settings and measurements of one room with climate settings and measurements of other rooms (to determine a desired method of obtaining or maintaining a particular set of climate conditions). Controllers 124a-124n may determine the nature of an adjustment (e.g. towards an open or closed position) and/or the degree of an adjustment of a damper 204 (of FIG. 2), and whether to change the settings and/or state (e.g., on or off) of fan 106, air conditioner 108, or heater 110, based on selected user settings and sensor measurements. For example, controllers 124a-124n may adjust the components of climate control system 100 to correspond to settings previously established for a user based on a previously set adjustment time and/or initiate the adjustments in response to user interaction (e.g. user input, the entry of a user into one of rooms 113aa-113nm with which the user is associated and/or other means of detecting a user).

The most recent measurements of sensors 116aa-116nm may be sent to a server for rendering to display devices, and adjustments to the configuration of heating/AC system 104 may be made. In another embodiment, one of controllers 124a-124n may act as a master controller and perform the monitoring and management of other controllers in addition to monitoring and managing climate control system 100. The master controller (if present), may include an integrated server and related software for sending, receiving and managing the operating tasks of climate control system 100. In another embodiment, the monitoring and management functions may involve peer-to-peer communications and control (no master controller), or other components than those listed above, and are optional.

Network 130 is any of one or more networks of devices communicatively coupled with one another. In an embodiment, network 130 can be a Local Area Network (LAN), wide area network (WAN), cable network, telephone network, wireless network, peer-to-peer network, point-to-point network, star network, token ring network, hub network, another suitable network, or any combination of the above networks. Transfer Control Protocol/Internet Protocol (TCP/IP) networks are commonly implemented. The Internet is an example of a TCP/IP network, and may be included within or may be an embodiment of network 130.

Remote server 132 allows control over features of climate control system 100 via network 130. Remote server 132 may perform control functions instead of, or in addition to, controllers 124a-124n. Remote server 132 may store updates to software that run on optional thermostats 118aa-118nm, computers 120aa-120nm, and/or controllers 124a-124n. In an embodiment, remote server 132 may be used for entering settings (such as desired temperatures) for portions of climate control system 100.

Figure 1B:
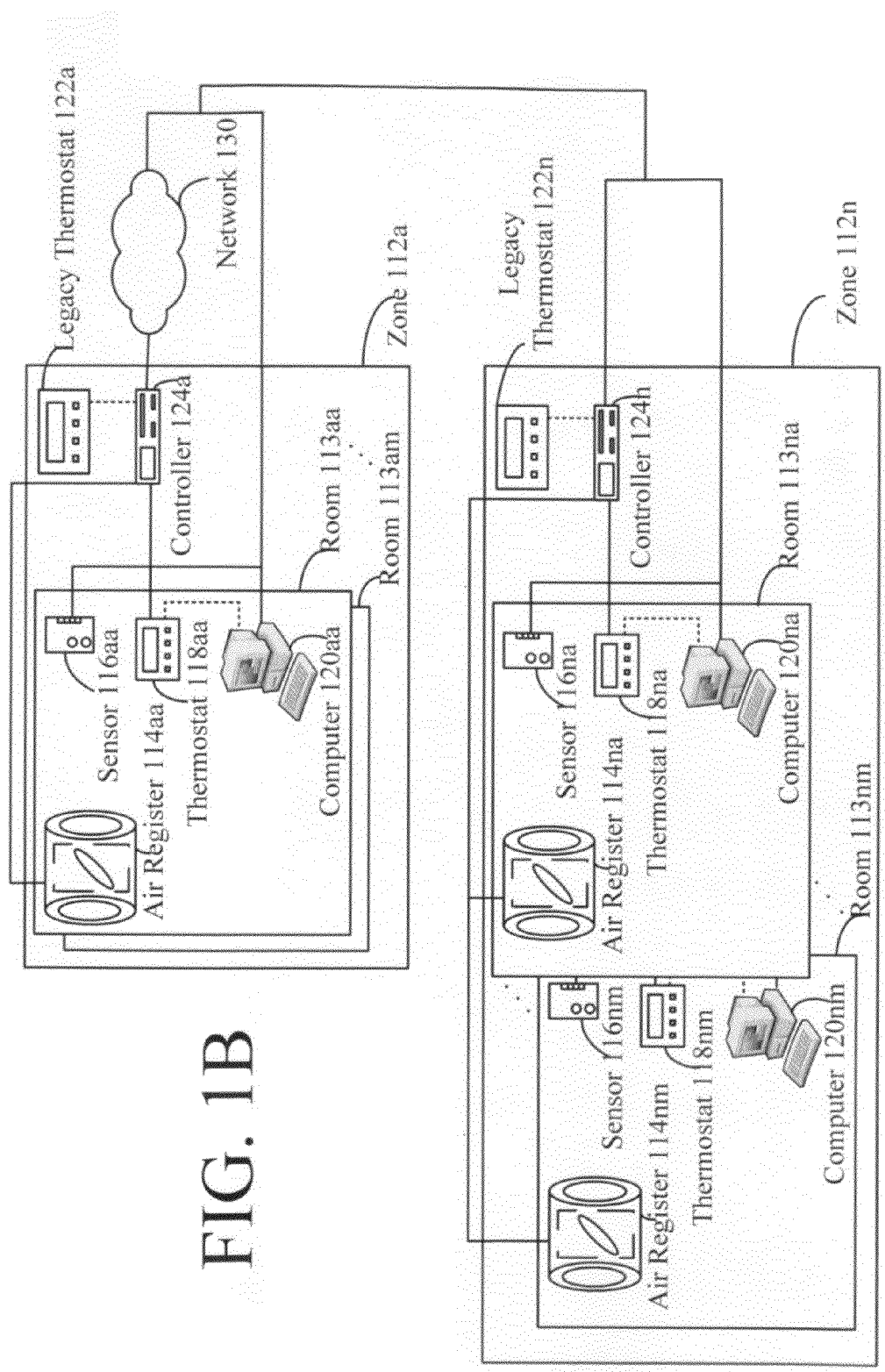
FIG. 1B shows a block diagram of a view of the locations and components within the zones of climate control system.

FIG. 1B shows a diagram of an embodiment of the zones 112a-112n of climate control system 100 including portions that cannot be seen in FIG. 1A. FIG. 1B, and may include the locations and components within zones 112a-112n. Zones 112a-112n include legacy thermostats 122a-122n, controllers 124a-124n, and rooms 113aa-113nm. Rooms 113aa-113nm may include air registers 114aa-114nm, sensors 116aa-116nm, optional thermostats 118aa-118nm and computers 120aa-120nm. In other embodiments, climate control system 100 may not have all of the components listed above or may have other components instead of, and/or in addition to, those listed above. Zones 112a-112n, legacy thermostats 122a-122n, controllers 124a-124n, rooms 113aa-113nm, air registers 114aa-114nm, sensors 116aa-116nm, optional thermostats 118aa-118nm and computers 120aa-120nm were discussed above in conjunction with FIG. 1A.

The climate control system may be provided as a service with no (or, optionally, limited) upfront fee, so that the purchaser can achieve an immediate (or a very fast) financial breakeven, with no (or reduced-) risk, or other cost of ownership, and therefore could achieve no (or limited) financial or other downside. Consequently, the seller may eventually capture much more revenue than would be possible by asking for the entire payment upfront. Overall, accepting installment payments better aligns the risk with those who have control over the risk (the seller) and thereby leads to greater economic efficiency (and therefore benefit to the customer and seller).

The mechanical system damper (one that uses moving parts) may be completely internal to the duct (within the cylindrical walls), having no motor pack on the outside of unit. The damper may use a single butterfly valve which may be on or off center with respect to the point at which the valve pivots, and/or off center with respect to the duct within which the valve is located. Such a configuration may be especially desirable for use in round ducts, multiple louvers in rectangular ducts, or with other types of valves. The damper is placed inside an existing duct by sliding the damper in the duct (after removing the register, which may only require removing two screws).

The damper may be separated into multiple pieces which are then easily and accurately reassembled in a way that reduces and/or avoids geometry issues (akin to making a ship in a bottle) that might otherwise prevent it from successfully sliding it into a duct with difficult duct geometric properties. For example, in an embodiment the damper is separated into 3 to 4 sections which are inserted into a duct, and installed while inside the duct.

As a result, in this embodiment, there is no need to cut ducting, drill holes, install set screws, or wrap duct tape when installing the damper. For the same reasons, there is no need to remove drywall if the duct is behind a wall. A compressible material may be placed around the periphery of the damper to reduce airflow leaks and to simultaneously position the damper firmly and/or permanently into the duct.

The damper and the gear may be an integral piece, e.g., the gear and damper may be one piece (e.g., if the damper is plastic) or one assembly otherwise (e.g., if the damper metal or similar material). A worm gear may be placed directly upon the damper/gear assembly to preventing damper from moving the actuator. The use of a worm gear may reduce the number of required components, and lower equipment costs.

The temperature, humidity, and/or other sensors may be used to verify correct operation of the actuators that position the damper. The action/effect relationship data that relates to the heating and/or cooling of the room are an indication of whether the actuator is moving the position of the damper. This is different than direct position-feedback sensors in use with other actuators, which tend to be much more expensive as a result of the cost of the sensors, the installation costs associated with the sensors, and similar realities related to the controllers required to read sensors.

A stepper motor (or other motor providing sufficiently accurate open loop control) may both power and control the positioning of the damper without needing additional components (keeping costs down).

The end-stops may be recalibrated periodically (e.g., nightly in business environments or during the daytime in homes). In general, there are times when the system is OFF. For example, when the system is not in use or when few people are likely to be present. It is desirable to recalibrate the position of components at such times. Recalibration of a damper's end-stop may be accomplished with a stepper motor, by attempting to drive the actuator past the zero/datum position which, with end-stops, puts it back to exactly the zero/datum position. In the specification, the process of causing a damper to rotate beyond a position associated with a closed state is referred to as "overdriving." For example, controllers 124a-124n may overdrive the dampers of air registers 114aa-144nm.

The interface of Legacy HVAC equipment is extremely varied (because there are many manufacturers that have produced such equipment over many years, and in many markets/countries). However, the existing thermostat wire/interface may be used as a 'Common' interface (common to essentially all Legacy HVAC equipment). Typically, the thermostat wire/interface has a 24VAC On/Off. Although the thermostat interface may also vary (e.g., pneumatic systems), the thermostat interface is the easiest way to interface with a large variety of HVAC equipment to existing Legacy Controllers and/or HVAC equipment such as fan 106, air conditioner 108, and heater 110 with On/Off signals to each piece of equipment and/or stage (e.g., heating, cool or fan) of such equipment.

Because there exists 40+ years of HVAC equipment of various types which are currently in use, and which were manufactured by many manufacturers, interfacing perfectly with all hardware from all manufacturers is difficult. This difficulty is a key reason why a better developed retrofit control system (e.g., a supplemental control system) has not emerged for interfacing with existing HVAC equipment/control systems.

In an embodiment, the thermostat interface (or a more direct HVAC equipment stages interface) may be a practical interface for enabling essentially all existing HVAC equipment to be used for individual temperature control. Nearly (e.g., 90+%) of) perfect control in many senses may be obtained by such interface to nearly all legacy systems in such a way as to be able to create a low cost and low installation cost retrofit control system for essentially all buildings worldwide with forced air heating/cooling (e.g., with either no loss or little loss of the functions provided by the legacy HVAC equipment) as well as to many non-forced-air HVAC systems. For some systems, the motor speeds of the fans, and the temperature settings of the heater and/or air conditioner and/or other other HVAC equipment may be controllable from the thermostat interface. In some systems, the only control mechanism for such as HVAC equipment may be switching fan, heater, and/or air conditioner on or off. For systems in which the fan heater and/or air conditioner may only be turned on or off, the power to the fan heater and/or air conditioner may be pulsed to effectively obtain a particular air flow, and/or particular amount of heating and/or air conditioning.

As part of a control-loop algorithm, a computational model may be used that factors in real-time characteristics such as the diameter of ducts, length of ducts, airflow pressure, and the airflow characteristics of factors which would result in a pressure increase and/or airflow decrease (such as modulating actuators/dampers, and/or the number of people in a room). When multiple people are in the room an average or median of temperature preferences may be used. Alternatively, a user ranking system may be established for user in implementing the preferences of the ranked users based on a weighted average in which those of higher ranking are given a greater weight while averaging the climate preferences, or the preferences of those of a higher ranking supersede the preferences of those of a lower ranking. The airflow delivered to each air register supplied by a HVAC system is controlled (e.g., types of control may include heating, cooling, humidification, dehumidification). The computation of the airflow may include factors for ensuring that there is a sufficient amount of airflow across a heat exchanger (air handler) to prevent damage to HVAC system equipment.

Optionally sensors (e.g., temperature sensors) may be included upstream and/or downstream of the heat exchanger to ensure safe operation and ensure that no other (expensive) system (e.g., a system of bypass dampers) is required.

The computation of the airflow may evaluate whether airflow through any particular air-register is considerably high and likely to generate an amount of noise, or other effects, significant enough to be considered undesirable by some users. For example, if the airflow is too high papers may be blown off of desks or the system may be too noisy.

A user override/adjustment may be provided that allows an individual to adjust the airflow according to the individual's personal preference. There may be user settings that allow the user to set a maximum allowable airflow (e.g., to limit the amount of noise in case an individual finds a particular air flow too loud). The user airflow and other settings may be time dependent (e.g., in a house, the user may be more sensitive to loud airflows at night).

In the prior art, in multi-zone temperature control systems, bypass dampers maybe required to ensure that high airflow or higher airflow is maintained across heat exchangers while allowing low airflow or lower airflow to smaller zones. In some cases, the air that would have been sent to the zone that does not need the airflow is dumped outside or to zones that do not require conditioned air for user comfort or fuel efficiency, which is inefficient. The bypass dampers are costly to buy and install. Bypass dampers are also inefficient economically and often inefficient thermodynamically. Also, bypass dampers sometimes may cause damage to the Air Handlers. By using dampers placed in the air registers and computing the airflow to take into account noise and safety factors, the noise and safety concerns may be avoided at a lower cost.

In addition to lowering the total amount of energy used (e.g., the lowering of the total energy used being enabled via Central Monitoring & Control of the airflow) a company may control the way in which energy is used, and thereby save more money. Specifically, as a result of controlling the airflow and consequently the heating/cooling delivered to each room, the peak hour power consumption may be reduced. Also, the heat sent to individual rooms may be turned off, and/or turned down, and/or otherwise adjusted to help a company reduce their energy costs. An analysis of the heat required verses electrical load needed to produce that heat and/or a cost benefit analysis may be performed, and based on the analysis, the electrical load may be managed to reduce costs according to the cost of the load at a particular time of day.

Performing an analysis of the electrical load required to change the temperature and/or climate of different rooms may enable businesses to manage their energy consumption more efficiently so that they can more effectively participate in utility company load management programs and reduce costs.

Learning software (e.g., algorithms) may embed intelligence into the retrofit control system by learning about the HVAC equipment and office spaces. The learning software may analyze relationships between past actions and effects, create and update a model (e.g., in real time) that more accurately predicts the additional/reduced airflow needed to account for relative room volume, the distance air must travel from HVAC equipment to the area where air is desired, relative air duct size, and differences in the ease of return airflow, and/or other factors that may affect the efficiency of heating, cooling, and/or humidifying an area.

Other thermostats typically turn on based on only one temperature input, and only respond to current errors (e.g., current difference between the desired and actual temperature. In an embodiment, many temperature inputs are analyzed, and the control algorithm learns the appropriate current action to take based on evaluations of what has happened in the past.

For example, the learning algorithm may learn how fast certain zones (e.g., rooms) react to actions relative to other rooms (e.g., a large room with a small and long duct vs. a small room with a large and short duct).

For example, the processor system of the controller may include a neural net or Turing machine control (such as a conventional feedback loop). The simplest version is to update a parameter which is proportional to how much more actuator input is needed for a certain zone (e.g., how much more the damper should be opened) to get a similar response in other zones (e.g., if a room is large, a duct is blocked, or the door is shut). Similarly, the parameter for the actuator input may need to be adjusted, because the room load is currently high (for example, the sun is shining on the room, the number of people in the room is high, the amount of equipment generating heat currently in the room is high, and/or other factors that may be currently present making the room difficult to cool). As a result of learning from historical data, the adjustment to the parameter may be computed to take into account the slower temperature response as a result of the higher load that is normally in the room. Similarly, a projected actuator input for a current load that is different than usual may be computed based on other times when the room had a similar load or based on the changes in the actuator input required in other rooms when the load is changed.

As part of the control-loop algorithm for Climate/Temp Control, there may be Dynamic/Virtual 'Zones', instead of, or in addition to, the static (hard-wired and hard-ducted) zones that have existed since the beginning of forced air HVAC.

For example, on a day when 10 people are in a building having 100 offices, a temporary zone may be established automatically that includes only the locations where the ten people are located. As a result of treating the locations of the ten people as one zone, conditioned air may flow to only the locations where the 10 people currently. The temporary zone may be established dynamically and may be a virtual zone. The dynamic zone may change according to when people are scheduled to enter and leave the building and/or change locations in the building. Similarly, the dynamic zones may change according to the locations at which the users are detected (e.g., as a result of wearing RFID devices, as a result of sonic detectors, and/or as a result of IR detectors) to be currently located. Optionally, location sensors (RFID, Sonic, IR, etc.) may be included in climate control system 100. The location control sensor may be independent of or may be part of the Lighting Control (a light switch and/or an integrated light switch with a presence sensor may also trigger a response by the climate control system when a person enters the room). An integrated light and/or HVAC switch and location sensor can optionally have communications with a Master Controller via wireless and/or Power Line Carriers (PLC) communication link so as to not require more wiring.

Lights are different than HVAC (they turn On/Off immediately, and may have a separate local light generator (light bulbs) for each switch). However, lights and HVAC are otherwise are very similar, and sometimes may be controlled simultaneously. For example, one may often desire both lighting control and climate control, neither lighting control nor climate control, only lighting control or only climate control. Typically, when a user is in an office the user wants both climate control and lighting, and when the user is not in the office, the user does not need either, and consequently, when the user is not in the office, the lights and climate control may be in standby modes, which for lights may be off and for climate control may be a reduced or off mode.

By integrating the lights and the HVAC, saving energy on lighting when the office is not in use may trigger a savings of heating and/or cooling energy. For example, turning off the lights may turn off the HVAC or place the HVAC in a standby mode.

The shutting off of the lights may provide an immediate feedback to employees in an office that their HVAC has turned off. Similarly, if HVAC is connected to an occupancy sensor, such as a motion sensor or noise sensor, the user may turn both the lights and HVAC by waving his/her arms, making noise, or performing another action.

The climate control system may include RFID employee tags (and/or other Security System tags) independent of the lighting system. In an embodiment, the climate control system controls and monitors more than just temperature in real-time. For example, the climate control may provide continuous fan control. In an embodiment, the fan may be kept on for at least a fixed percentage of time (e.g., 35% of the time) even if the heating and/or cooling of the air performed a much lower percentage of the time. Sometimes the temp and humidity are fine, but the user wants more airflow or more fresh outside air. In an embodiment, individual control of the humidity (e.g., control of both humidifier(s) and dehumidifiers) for each room may be provided for those who have such equipment in their HVAC system. In an embodiment, other parameters are monitored, such as $CO_2$, CO, Radon/radioactivity, VOC (volatile organic compounds), and/or mold spores, and the airflow may be activated or increased to reduce these other parameters for those who have such equipment in their HVAC for detecting when such elements are high, regardless of the temperature, prior airflow, and/or humidity. A variety of other sensors may be added to the climate control system for monitoring and controlling other parameters in real time (according to customer needs).

Optionally the temperature is auto-corrected as a function of humidity to keep users more comfortable. For example, the perceived temperature varies by 12° F. at 72° F. depending on relative humidity variation from 0% to 100% according to some US government data. The affect of humidity variations on perceived temperature may be removed by monitoring and correcting the humidity adjusted temperature instead of the actual temperature. Specifically, a personal climate control system may control comfort instead of temperature, even though comfort is a function of multiple variables (e.g., temperature and humidity). Since comfort is a function of temperature and humidity, then controlling a temperature to maximize comfort is better than simply keeping the temperature close to a given temperature set point. For example, if a user wants the comfort of 72° F. at 50% humidity, but the humidity is now 80%, the algorithm of the climate control system may automatically calculate that the temp should be 70° F. to achieve the same comfort.

In an embodiment the user interface to the climate control system is web-based. Consequently, relative to conventional thermostats, the display is better, more attractive, and/or the internal database may be much more complicated than the database of a standard climate control system. Using a web-based user interface facilitates accepting more complicated set-points (e.g., set points that account for future vacations, business trips, sales calls, and/or other specific requests on specific dates). Using a web based user interface, the user interface may be displayed on an existing, large, high resolution, color monitors that overcomes problems of previous thermostat displays. For example, prior art thermostat displays have few characters, one line (or a small number of lines), typically one color, no graphics, and are often not lit and/or not backlit.

By using a web based user interface, better user input devices may be used. For example, a keyboard and/or mouse may be used, which the user may already own and be familiar with how to use (which reduces acquisition and training costs that may otherwise be necessary). Prior art inputs had few keys and/or buttons, fragile and/or unreliable keys and/or buttons that often require multi-function keys and/or buttons, which users find confusing. Prior art inputs have no mouse. Since many users already have a keyboard, there is no cost for hardware or for Installation of the input device, and the climate control can be accessed remotely and/or by others. Since most users already have a computer, there is no need for a separate input unit for each person (Secretary, Nurses' Station, etc. can do this for others who request it). The output device may support html, .jpg, .gif, and/or other scripts, standards, and/or languages that allow for an appealing graphical interface. Also, a web-based user interface with an existing computer has exactly or nearly zero installation cost. However, running new wires through existing walls for prior art thermostats can be extremely expensive.

A good user interface is helpful for gaining market acceptance. The climate control system may keep track of energy savings by day, week, month, year, and/or another period of time (e.g., a period of time designated by an administrator or user of climate control system 100). In an embodiment, energy savings may be tracked. Tracking of energy consumption and/or savings may be useful for multiple reasons, including post consumption marketing, which may influence a customer's decision of whether to continue using the climate control service. Web based monitoring easily avails centralized monitoring & control. Duty cycles (e.g. of the Room Actuator, a local variable air volume and/or Air Handler) may be monitored, and the owner of the climate control system may have immediate access to status information and notifications. The climate control system may monitor equipment failure (or degradation and/or inefficiency that may lead to future failure), detect doors and/or windows that are left open, monitor individual and/or selected rooms.

The GUI may promotes energy savings behavior amongst employees via peer pressure (aka viral marketing, etc.), which may promote increased use (and therefore, value to the customer by cost savings and/or productivity improvements and/or increased comfort) of the climate control system by those having the climate control system available to them, and promote marketing of system to others who do not use the climate control system.

The climate control system may enable $3^{rd}$ party accounting of HVAC usage so that employees can have comfort when desired and so that the businesses can may be charged for only the heating/cooling the business needs (e.g., not be charged for heating/cooling the entire 100 office building on a Saturday when few people may come in to their offices for a few hours).

Optionally, the climate control system may display and control the climate of locations in a person-dependent manner, instead of a room-dependent manner, which automatically allows better temperature/comfort optimization by computers whenever multiple people share an area (e.g., two in an office, multiple people in a conference room).

The climate control system may ensure rooms are kept at a certain climate independent of personnel, such as computer rooms that need to be cooled regardless of personal preference. The climate control system may allow areas/rooms to be designated and/or approved for anti-mode control. For example, during winter one room may be cooled even though all other rooms are only being heated (e.g., a room housing a server may request and get cooling year round whether or not anyone else in the building is granted that privilege).

The climate control system may provide both better comfort in rooms/areas that do not allow anti-mode use, provide less expensive comfort in rooms/areas that do allow anti-mode use, and may do so at a lower cost by saving energy, by using fan control to totally/partially condition specific rooms/areas when the ambient temperature of the return air of the HVAC equipment is closer to that desired than the current state of the room/area. For example, if in a Winter heating mode one bedroom that faces the sun becomes too warm, the room can be cooled (or conditioned) with the naturally cooler unconditioned air from other rooms, which in return get the warmer air they desire. In other words, a sunny hot room can be used as a heat exchanger for absorbing solar heat and at least partially heating other rooms. In an embodiment, a sunny otherwise hot room can be used to heat air that is then pumped to other rooms and heat those other rooms with the sun heated air, thereby lowering heating costs.

The climate control system enables control of not only conditioned air, but also the control of return air by modulating dampers and sensors. Controlling the return air may balance the airflow in/around a building for comfort and energy efficiency. For example, return air may be drawn from certain areas only in certain times/modes and from other areas at other times and in other modes. For example, in Winter, while in Heating Mode, air may be drawn from the area around hot ovens, whereas in the Summer, while in a Cooling Mode, the air may be vented to the outdoors from the area near the ovens.

Figure 2:
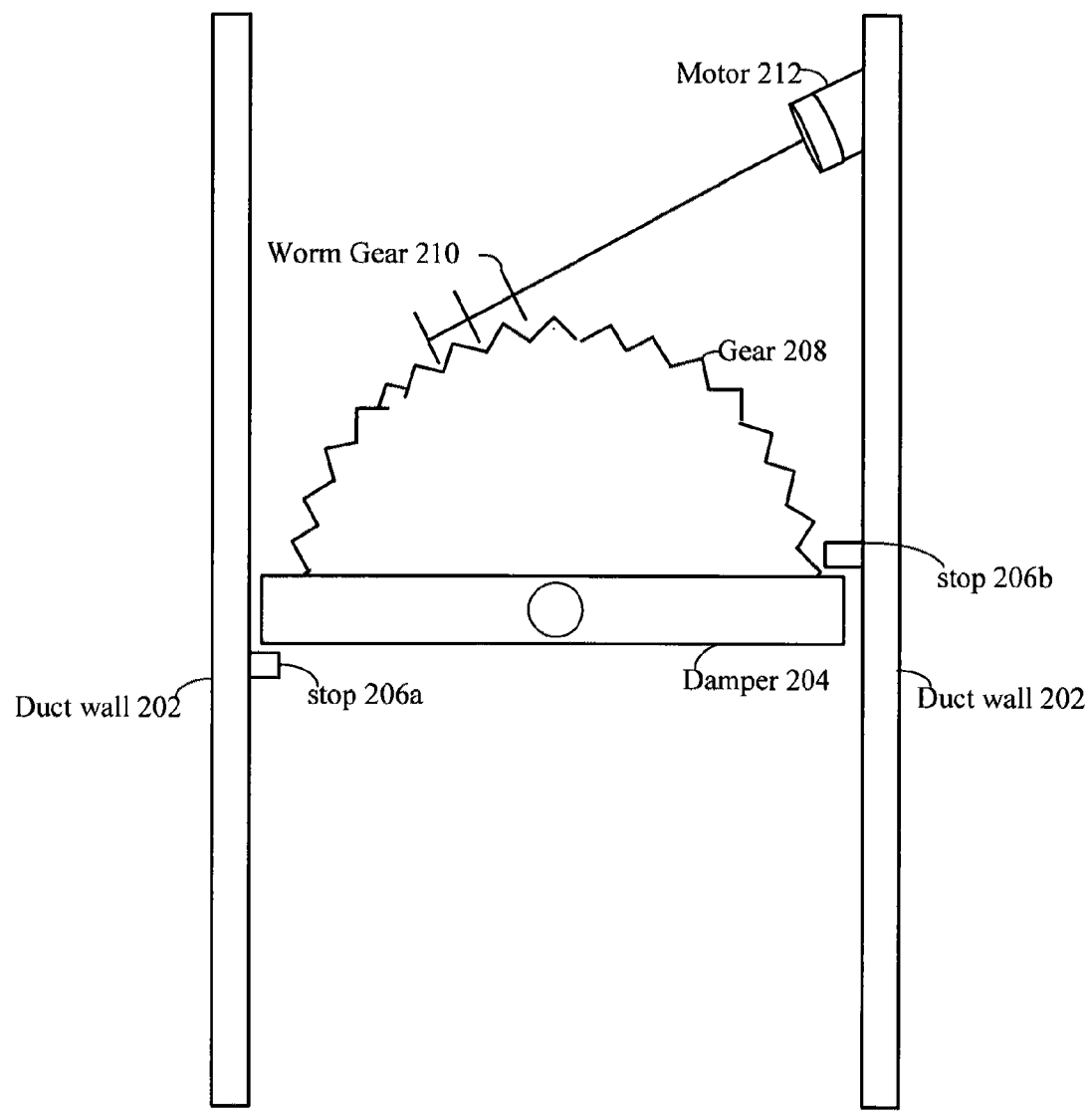
FIG. 2 shows a block diagram of a cross section of an embodiment of an air register.

FIG. 2 shows a diagram of a cross section of an air register 200 having the pivot axis oriented perpendicular to the page of the drawing. Air register 200 includes duct wall 202, damper 204, stops 206a and 206b, gear 208, worm gear 210, and motor 212. In other embodiments, cross section 200 may not have all of the components listed above or may have other components instead of and/or in addition to those listed above.

Air register 200 may be an embodiment of one of air registers 114aa-114nm (of FIG. 1). Air register 200 may be installed in air ducts 111 and/or retrofit into retrofit control system 102 within system 100 (which were discussed in conjunction with FIG. 1). In an embodiment, sections of air register 200 slide into air ducts 111 and are joined together within air ducts 111.

Duct wall 202 may be the walls of air register 200. Damper 204 may allow or prevent (e.g. block) the flow of air into and/or from a location (such as rooms 113aa-113nm of FIG. 1). In an embodiment, damper 204 may be a valve that opens or closes as a result of the turning of one or more gears. In an embodiment, gear 208 and damper 204 may form a single, integral unit or assembly.

Stops 206a and 206b may inhibit the movement of a damper beyond a desired stopping point in either direction. In an embodiment, stops 206a and 206b may be or may include seals that prevent or significantly reduce the leakage of air past the damper when the damper is in the closed position. Stops 206a and 206b limit the turning of damper 204.

Gear 208 may be a portion (e.g. half) of a gear that is attached to one side of damper 206. Gear 208 may be a portion of a disk with gear teeth at the edge of the disk. The gear teeth may be shaped for interlocking with a worm gear. In an embodiment, the teeth may have a triangular shape and have a width small enough and an appropriate shape to fit within the grooves of a worm gear, and engage the worm gear. In an embodiment, gear 208 and damper 204 may form a single, integral unit or assembly.

Worm gear 210 may be a cylindrical gear with spiraling groves that are compatible with the teeth of gear 208 (discussed above). In an embodiment, when worm gear 210 is turned, worm gear 210 causes gear 208 to move in one of two directions, initiating the movement of damper 204 towards a fully closed or towards a fully open position. Due to the tendency of worm gears to facilitate a reduced rotational speed, worm gear 210 facilitates a more precise degree of control than would exist with another type of gear. Worm gear 210 may also be configured to facilitate locating the motor in a location that does not interfere with the motion of damper 204.

Motor 212 is an electromechanical motor that turns worm gear 210, causing gear 208 to rotate, thereby adjusting the position of damper 204. In an embodiment, motor 212 receives a direct or indirect signal from one of controllers 124a-124n with which air register 200 is associated. In an embodiment, there may not be any feedback to controllers 124a-124n of the actual position of damper 204. The position and/or the correct functioning of damper 204 may nonetheless be computed by tracking the amount one or more controllers 124a-124n directs motor 212 to rotate damper 204 and/or by sensing the resulting change in the temperature (and/or other climate parameters) as feedback for correctly positioning damper 204 for obtaining the desired climate conditions. For example, it may be expected based on the computed position that damper 204 would reach a closed position upon turning 90 degrees, and as such, one or more controllers 124a-124n may direct motor 212 to rotate damper 204 further than 90 degrees (e.g. 180 degrees, 360 degrees, etc.) to a position at which damper 204 would certainly have closed. As a result of the overdriving, an expected position is recalibrated by computing the future expected positions of damper 204 from the expected position after the most recent overdriving, and computing the amount that motor 212 has been driven in each direction since the most recent overdriving. Accordingly, a more accurate determination of the position of damper 204 may be obtained after overdriving the damper. In an embodiment, damper 204 may be overdriven at regular intervals of time (e.g. nightly, weekly or monthly). In another embodiment, the overdriving of damper 204 is optional. Additionally, after moving damper 204 the amount computed to bring the damper to the desired location, the temperature is (and/or other climate parameters are) measured. If the desired climate is not achieved, the position of damper 204 is further adjusted to obtain the desired location that produces the desired temperature (and/or other climate conditions).

In an embodiment, worm gear 210 and motor 212 may prevent flowing air from moving damper 204 more than the amount of motion allowed by the play in the assembly of worm gear 208, motor 212, and gear 208.

Figure 3:
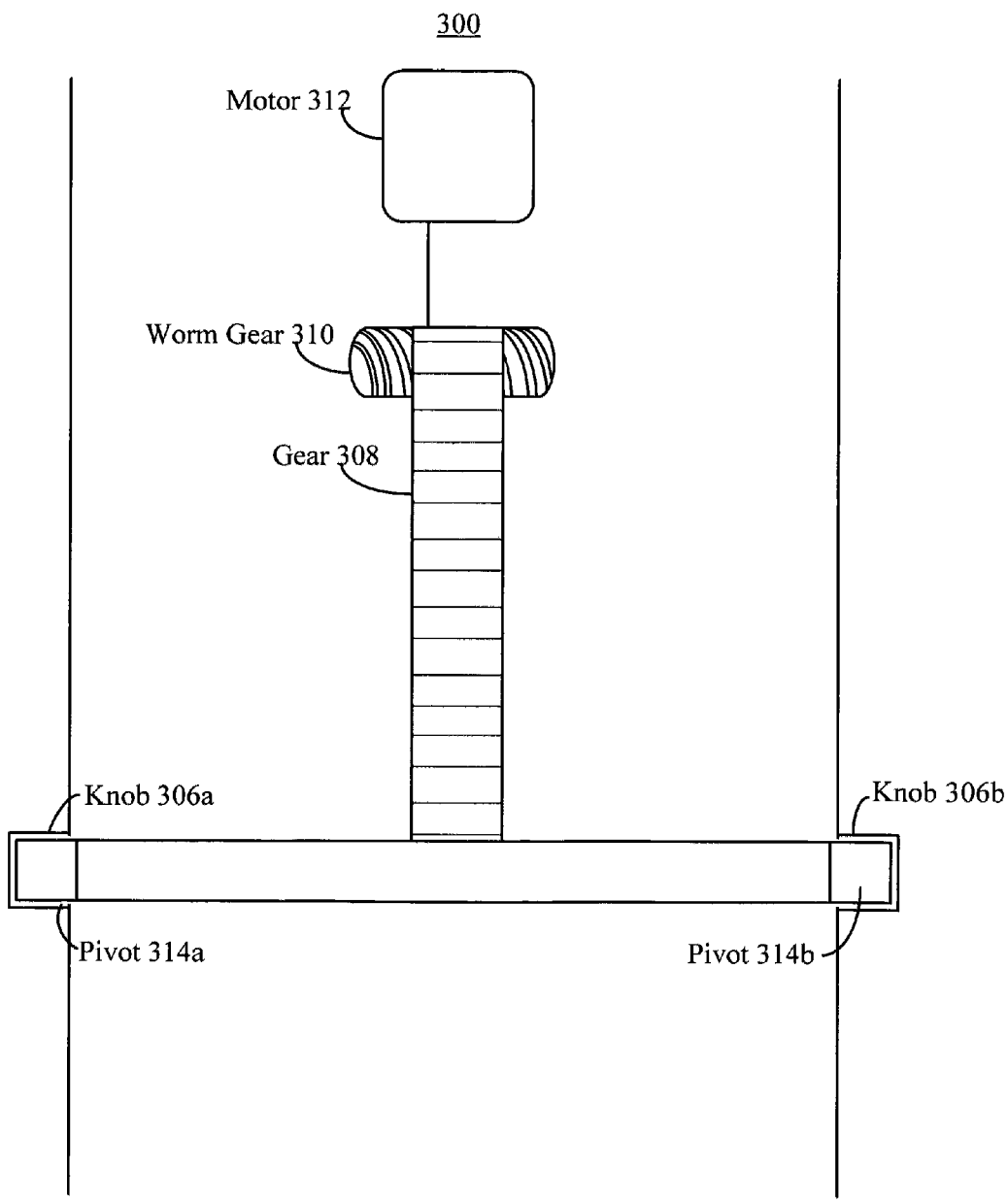
FIG. 3 shows a block diagram of another cross section of an embodiment of an air register.

FIG. 3 shows a diagram of another cross-section 300 of an embodiment of an air register 200, having the pivot axis is parallel to the page of the drawings. Air register 200 includes duct wall 202, damper 204, knobs 306a and 306b, gear 208, worm gear 210, motor 212 and pivot 314. In other embodiments, the air register of cross section 300 may not have all of the components listed above or may have other components instead of and/or in addition to those listed above. Knobs 306a and 306b may be cylindrically shaped for placing a pivots 314a and 314b (discussed below) into a fixed positions within an air register 200.

Cross section 300 is along a cut that is perpendicular to the cut that the cross section of FIG. 2 is taken. Pivots 314a and 314b are knobs on which damper 204 pivots. Pivots 314a and 314b may pivot within the inside of knobs 306a and 306b, and knobs 306a and 306b may be within the duct walls.

Figure 4:
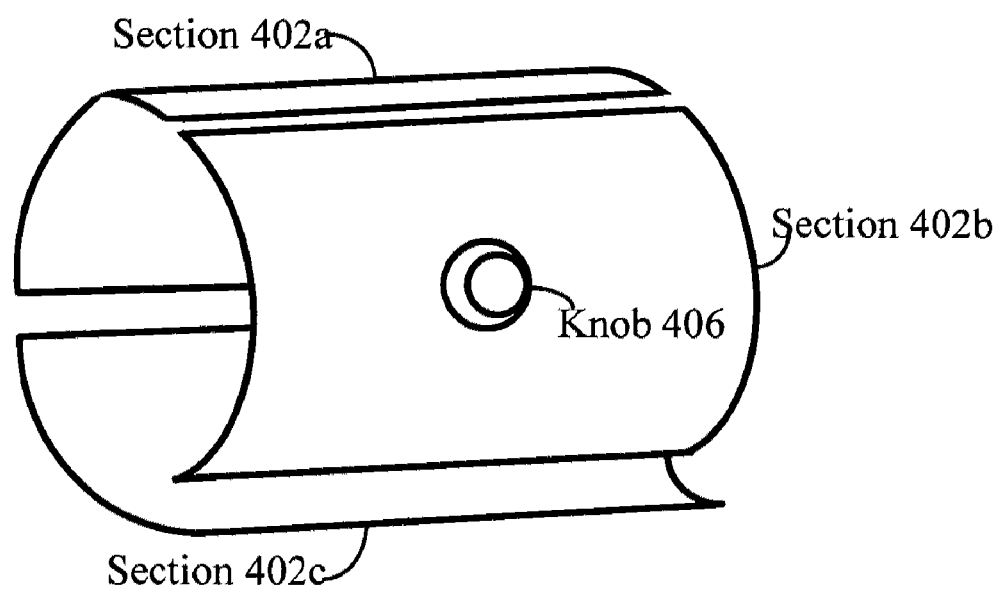
FIG. 4 shows a block diagram of an embodiment of an air register from a top view.

FIG. 4 shows a diagram of an embodiment of an air register 400 from a top view. Air register 400 includes sections 402a-402c, knobs 406a and 406b, and knob 414. In other embodiments, air register 400 may not have all of the components listed above or may have other components instead of and/or in addition to those listed above.

Air register 400 may be an embodiment of one of air registers 114aa-114nm (FIGS. 1A and 1B). FIG. 4 shows a view of the sections that make up air register 400. Sections 402a-402c may be interconnected with one another and installed within an air duct, such as air ducts 111 of FIGS. 1A and 1B. In an embodiment, sections 402a-402c are placed within air ducts 111 while sections 402a-402c are disassembled, and are assembled within air ducts 111, thereby allowing air register 400 to be installed into air ducts 111 via smaller openings than would be possible if air register 400 were not disassembled prior to insertion within ducts 111. Knob 406a and 406b may be an embodiment of one of knobs 306a and 306b (discussed in conjunction with FIG. 3).

Figure 5A:
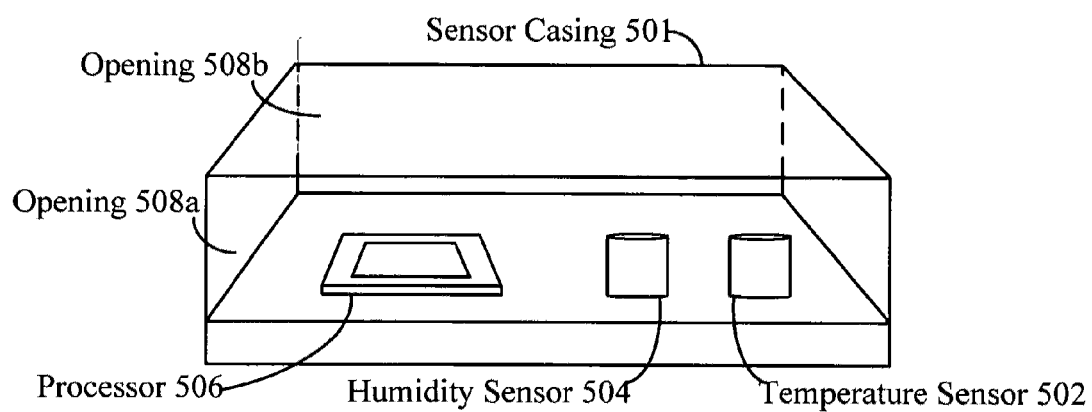
FIG. 5A shows a block diagram of a sensor unit.

FIG. 5A shows a diagram of an embodiment of a sensor unit 500. Sensor unit 500 includes sensor casing 501, temperature sensor 502, humidity sensor 504, optional processor 506, and openings 508a-508d. In other embodiments, sensor unit 500 may not have all of the components listed above or may have other components instead of and/or in addition to those listed above (e.g., sensors for measuring any state of the ambient environment).

Sensor 500 may be an embodiment of any combination of sensors 116aa-116nm (FIGS. 1A and 1B). Sensor unit 500 may measure the temperature and/or humidity. In an alternative embodiment, sensor 500 may include a motion detector or an infrared detector for detecting the presence of individuals and reporting devices in a location associated with sensor unit 500.

Sensor casing 501 encloses the other components of sensor unit 500. In an embodiment, sensor casing 501 may have openings 508a and 508b (discussed below) on one or multiple ends, allowing ambient air to flow through sensor unit 501.

Temperature sensor 502 may detect (e.g., measure and record) the temperature. In an embodiment, temperature sensor 502 may be a bi-metal strip, thermistor, or other device that measures the temperature of one of rooms 113aa-113nm.

Humidity sensor 504 may detect (e.g., measure and record) the humidity of a location, such as one of rooms 113aa-113nm (FIG. 1). In an embodiment, humidity sensor 504 may be any of a plurality of devices that measures the water vapor in the air of one of rooms 113aa-113nm. Further, humidity sensor 502 may be used in conjunction with temperature sensor 502.

Optional processor 506 (if present) may receive, perform calculations on, and report the states and readings of temperature sensor 502 and humidity sensor 504. In an embodiment, optional processor 506 is communicatively coupled with one of controllers 124a-124n (of FIG. 1), temperature sensor 502, and humidity sensor 504. Optional processor 506 may report the measurements of temperature sensor 502 and humidity sensor 504 to the one of controllers 124a-124n associated with sensor unit 500. Prior to the reporting, optional processor 506 may translate the data into one or more desired formats. In another embodiment, the calculating and translating performed by optional processor 506 are optional, and/or performed by the one of controllers 124a-124n associated with sensor unit 500. In an alternative embodiment, optional processor 506 may perform one or more of the functions of controllers 124a-124n.

Openings 508a and 508b receive a flow of ambient air from one of rooms 113aa-113nm within which sensor unit 500 is located, or within which sensor unit 500 is in contact with, and/or associated with. In an embodiment, the ambient air that moves through openings 508a and 508b encounters temperature sensor 502 and humidity sensor 504, facilitating a more accurate sampling of the climate in the one of rooms 113aa-113nm with which sensor unit 500 is associated.

Figure 5B:
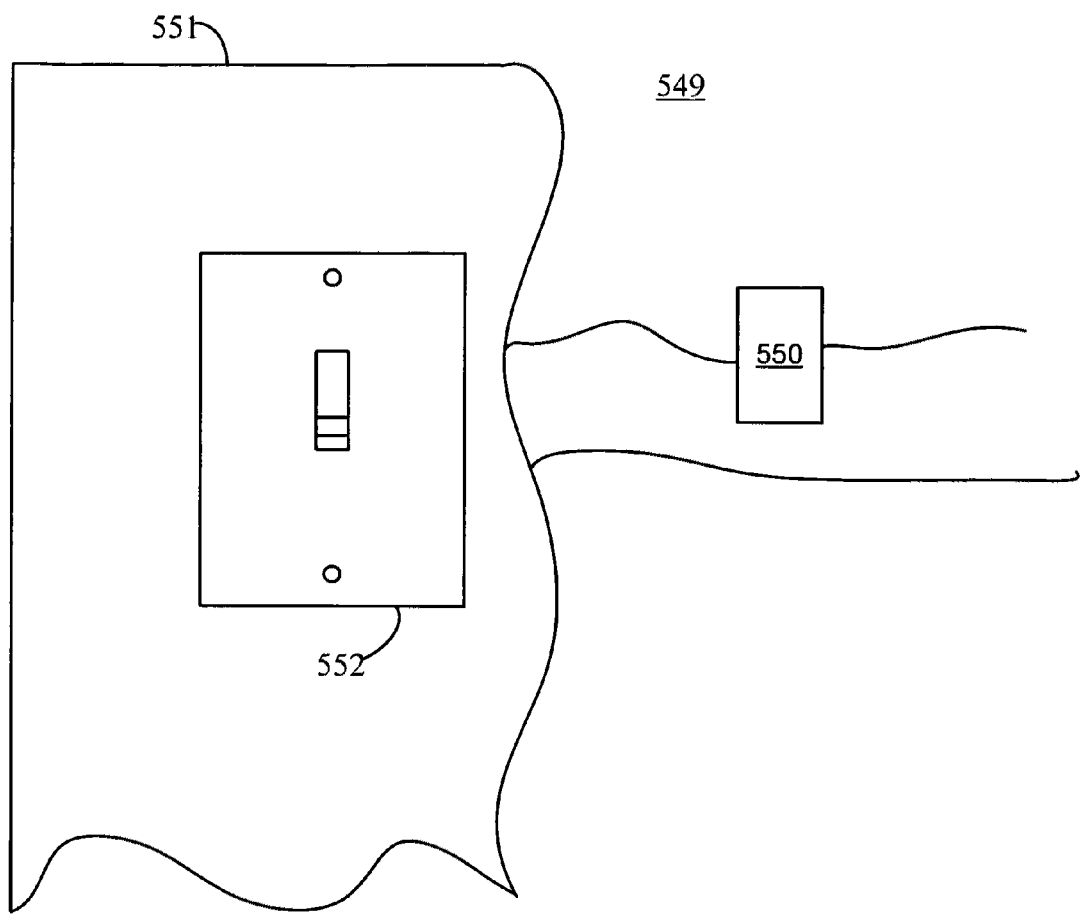
FIG. 5B shows a block diagram of an indoor sensor unit associated with a light switch.

FIG. 5B shows a diagram of an embodiment of system 549 having a wall sensor. System 549 includes person sensor 550, section of wall 551, and switch 552. In other embodiments, system 549 may not have all of the components listed above or may have other components instead of and/or in addition to those listed above.

Person sensor 550 detects indications of the presence of people and optionally the presence of specific users of retrofit control system 102. Person sensor 550 may send a signal to one or more of computers 120aa-nm, controller 124a-124n, thermostats 116aa-116nm, and/or remote server 132 indicating that a user may be present in the room. In an embodiment person sensor only detects whether a light switch is turned on. For example, in an embodiment, person sensor 550 includes at least a current sensor or is a signal producing circuit that is turned on by the switch. In this embodiment, it is assumed that when the light is turned on, a person is present in the room, and the climate of the room is to be regulated by climate control system 100. The light switch may include an infrared detector, a sound detector, a motion detector and/or other devices that automatically turn on the light switch and thereby activate person detector 550. In an embodiment, person sensor 550 may include infrared, sound, or motion detection devices. In an embodiment, person sensor 550 may be capable of detecting whether a person is in the room and optionally which person has entered the room (regardless of the state of the light switch). For example, person sensor 550 may include a receiver for detecting radio frequency signals from RFID devices on the user of the climate control system 100, which may also detect which user is in a particular location. If person sensor 550 is capable of detecting which person is in the room, person sensor 550 may send a signal indicating that the person detected is present. Wall 551 is a section of the wall of one of rooms 113aa-113nm in which sensor 550 has been installed.

Switch 552 may be a switch for turning on and off a light. In an embodiment, turning on switch 552 may activate person sensor 550 to send a signal indicating that a person is present. In an embodiment, switch 552 is a manual switch. In another embodiment, switch 552 includes a motion detector, infrared detector, a sound detector, and/or a receiver for receiving a signal transmitted by a device on the user indicating the presence of the user. In an embodiment, switch 552 may be activated by sound, motion, and/or heat, and when switch 552 detects the presence of a person, sensor 550 is activated.

Figure 5C:
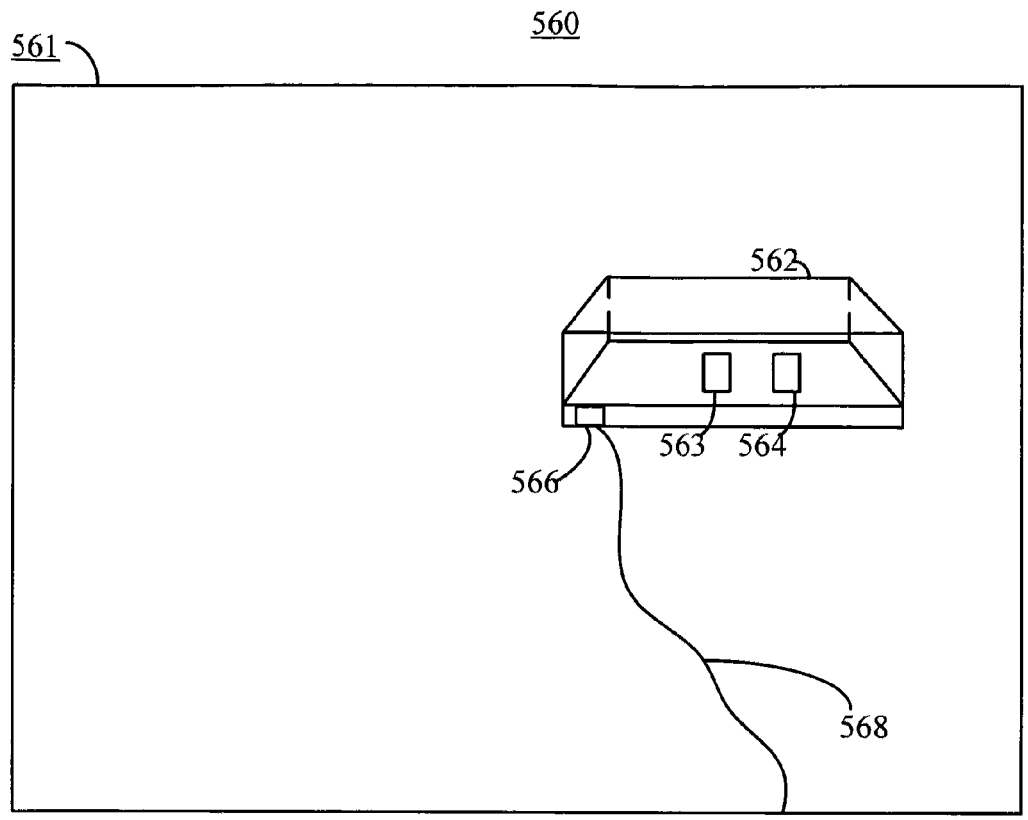
FIG. 5C shows a block diagram of an outdoor sensor unit.

FIG. 5C shows a diagram of an embodiment of outdoor sensor system 560. Outdoor sensor system 560 includes outdoor wall 561, sensor device 562 having temperature sensor 563, humidity sensor 564, input/output port 566, and communications line 568. In other embodiments, outdoor sensor system 560 may not have all of the components listed above or may have other components instead of and/or in addition to those listed above (e.g., wireless communications).

Outdoor sensor system 560 is for determining the temperature and/or the humidity of the outside air. Outdoor wall 561 is a section of the wall of the structure in climate control system 100 has been installed. Outdoor sensor 560 measures the temperature, humidity and/or other climate parameters outside of system 100 (e.g. outdoors). Sensor device 562 may be similar to sensor 500 except built to withstand outdoor weather conditions. Sensor device 562 may be mounted on wall 561 or elsewhere outside. In an embodiment, sensor device 562 is on the same wall and/or within a short distance of the intake for climate control system 100. In an embodiment, sensor device 562 is close enough to the intake so that the climate conditions detected are expected to be the same as the air brought into the building by climate control system 100, and/or sensor device 562 is far enough away from the intake so the intake does not affect the climate measurements (especially if the intake is also used as an exhaust). Temperature sensor 563 and humidity sensor 564 may be embodiments of temperature sensor 502 and humidity sensor 504, respectively. In an embodiment, input output port 566 receives data indicating outdoor climate conditions. As a result, the outdoor climate conditions are used as factors for determining settings and actions to be applied by retrofit control system 102.

In an embodiment, the readings provided by temperature sensor 563 and humidity sensor 564 may be used by retrofit control system 102 to determine whether to draw outside air into one or more of rooms 113aa-113nm, or dump air from one of rooms 113aa-113nm outside. For example, if the temperature outside is cooler (hotter) than the temperature inside, the temperature inside one or more of rooms 113aa-113nm is too hot (cold), a greater percentage of outside air may be brought in to the building cool the rooms, instead of cooling (heating) the air already in the building. In other words, a certain percentage of air may be brought into the building no matter what the temperature is for health reasons. However, a greater percentage of air may be brought into the building when climate control system 100 determines that bringing the air into the building is more efficient than heating or cooling inside air.

Communications line 568 allows sensor 560 to communicate with climate control system 100 via input/output port 566. Communications line 568 may be a wire or optical cable. Communications line 568 is optional. In an embodiment, input output port 566 communicates wirelessly with the rest of climate control system 100.

Figure 6:
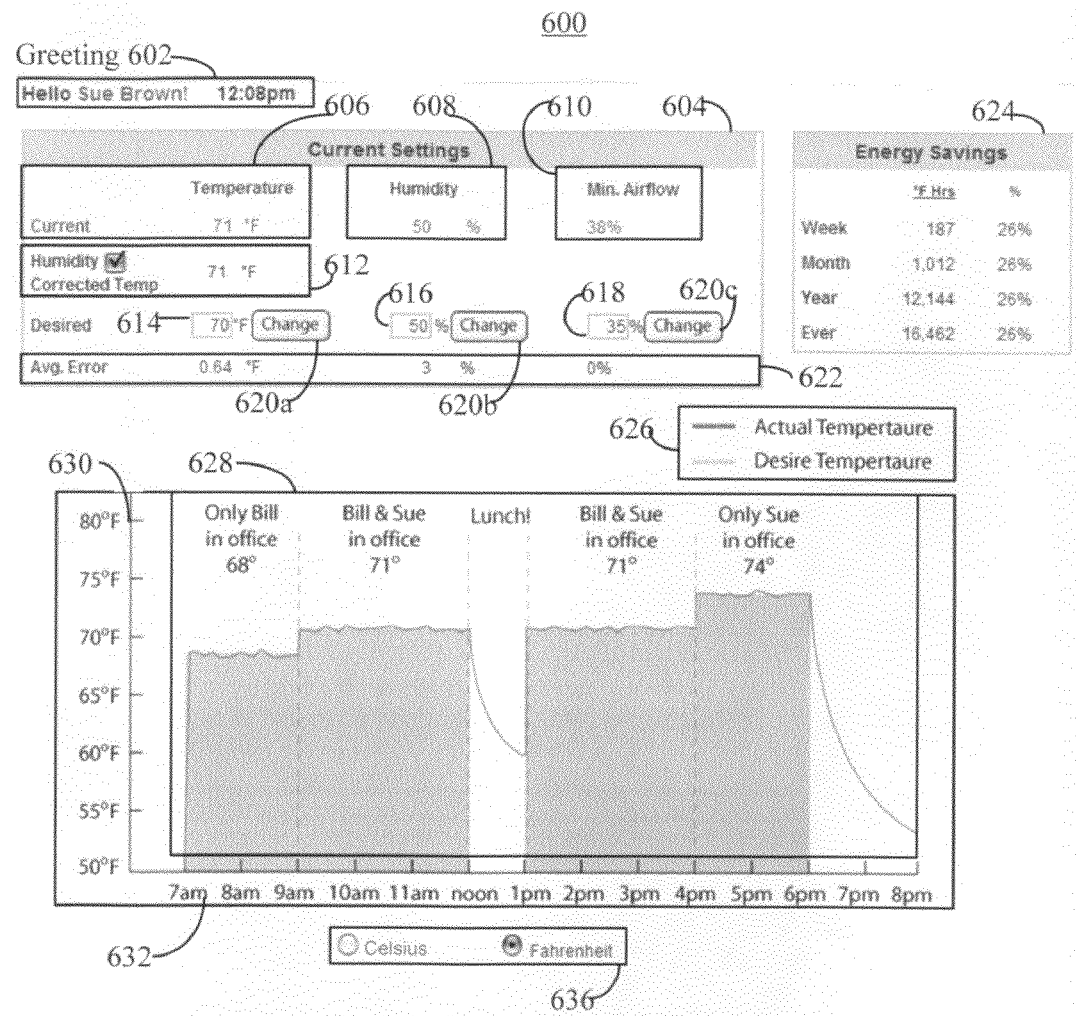
FIG. 6 shows a block diagram of a Graphical User Interface associated with current settings.

FIG. 6 shows a diagram of an embodiment of Graphical User Interface (GUI) 600. GUI 600 includes greeting 602, settings 604, having current temperature 606, current humidity 608, current airflow 610, corrected temperature 612, desired temperature 614, desired humidity 616, desired airflow 618, modifiers 620a-620c, and error averages 622. GUI 600 also includes savings 624, legend 626, graph 628 having temperature axis 630, time axis 632, and measurements 634. GUI 600 further includes format options 636. In other embodiments, GUI 600 may not have all of the components listed above or may have other components instead of and/or in addition to those listed above.

GUI 600 may provide a Graphical User Interface for implementing the functionality of one or more components of system 100. GUI 600 may present settings for adjusting a temperature associated within a single location (e.g., a room), a combination of locations (e.g. a zone), locations (e.g. a home or building), and/or one or more individual people. In an embodiment, GUI 600 may be sent to a user of a device, such as one of computers 120aa-120nm, and/or optional thermostats 118aa-118nm (of FIG. 1), for rendering and receiving control commands for a system 100 and information such as the status of locations within system 100. GUI 600 may be rendered via specialized software, an HTTP client, or other network communicable browser or device.

Greeting 602 may be a set of relevant data presented to a user upon logging onto a server associated with climate control system 100, such as, remote server 132 (FIG. 1A) or an integrated server.

Settings 604 may be a visual display of existing conditions of one or more locations within system 100, and interactive tools for managing the conditions. In an embodiment, current settings 604 may display a current temperature, humidity, airflow information, humidity corrected temperature, desired temperature, and statistical information related to an error average. Further, current settings 604 may include modules (e.g. input fields and buttons) for inputting and storing settings designated by a user. For example, settings may be inputted and stored via key presses made to one of optional thermostats 118aa-118nm controller 124a-124n, and/or a computer 120aa-120nm (FIGS. 1A and 1B) associated with the one or more rooms 113aa-113nm and/or zones 112a-112n in which the thermostat 118aa-118nm or computer 120aa-120nm is located.

Current temperature 606 displays the value of a temperature measured for one of or rooms 113aa-113nm. In an embodiment, current temperature may be the temperature for one or more of rooms 113aa-113nm and/or zones 112a-112n.

Current humidity 608 displays the value of a humidity measurement in one of rooms 113aa-113nm. In an embodiment, current humidity may be the humidity of one or more rooms 113aa-113nm and/or zones 112a-112n.

Current airflow 610 displays the value of a current setting for the air flowing into one of rooms 113aa-113nm. Further, current airflow 610 is displayed in association with user interaction, or default parameters. In an embodiment, current airflow 610 may be an estimated percentage of the total airflow output as delimited by the degree to which a damper 204 (of FIG. 2) within one of rooms 113aa-113nm is open.

In an embodiment, a user requests information associated with the current climate of a room 113aa-113nm and/or zone 112a-112n (i.e., current temperature 606, current humidity 608, and current airflow 610, cumulatively, or in varied combinations). In the specification, a "user request" is generic to user interaction with a device or software implementing GUI 600, which initiates a query of climate information. Additionally, the term "user request" is generic to an automatic query of climate information initiated by a device or software implementing GUI 600. The querying may be a default feature of the device or software. As a result of the request, climate information is displayed. The climate information may include the measured temperature and humidity and other measured climate parameters. The climate information displayed may be the last measured values of the information, which may or may not be the current climate conditions. Further, GUI 600 displays the state of the climate settings at the time of the request, and may automatically refresh the information displayed after a period of time. In another embodiment, no request is required to initiate the display of current temperature 606, current humidity 608 and current airflow 610 to GUI 600.

Corrected temperature 612 is the humidity corrected temperature, which is the temperature that an individual is expected to perceive as a result of the humidity in the air. Further, corrected temperature 612 functions as a switch between two states. In the first state, the temperature displayed is not corrected for humidity, and/or the climate of the room is modified to keep the temperature at the desired setting. In the second state, the temperature displays may be modified for humidity, and/or the climate is modified to keep the humidity corrected temperature at the level set of the humidity corrected temperature.

Desired temperature 614 is an input/output mechanism that may display a temperature value desired by a user for one or more rooms 113aa-113nm and/or zones 112a-112n. In an embodiment, desired temperature 614 may be an input field that displays and receives the temperature setting entered. For example, desired temperature 614 may contain a temperature value previously chosen by a user of GUI 600 for one or more rooms 113aa-113nm and/or zones 112a-112n. Upon selecting desired temperature 614a user may input a value representing a new desired temperature. Further, the new desired temperature value (or another new set point) may be saved by a key press to a button such as a modifier 620a-620c (discussed below).

Desired humidity 616 is an input/output mechanism that may display a humidity value desired by a user for one or more rooms 113aa-113nm and/or zones 112a-112n. In an embodiment, desired humidity 616 may be an input field that displays and receives information. For example, desired humidity 616 may contain a humidity value previously chosen by a user of GUI 600 for one or more rooms 113aa-113nm and/or zones 112a-112n. Upon selecting desired humidity 616, a user may input a value representing a new desired humidity. Further, the new humidity value may be saved by a key press to a button such as a modifier 620a-620c (discussed below). In an embodiment, desired humidity 616 is optional, and may function only as a display value.

Desired airflow 618 is an input/output display of a value selected as a minimum airflow amount desired by a user for one or more rooms 113aa-113nm and/or zones 112a-112n. In an embodiment, desired airflow 618 may be an input field that displays and receives information. For example, desired airflow 618 may contain a minimum airflow value previously chosen by a user of GUI 600 for one or more rooms 113aa-113nm and/or zones 112a-112n. Upon selecting desired airflow 616, a user may input a value representing a new desired minimum airflow. Further, the new minimum airflow value may be saved by a key press to a button such as a modifier 620a-620c (discussed below). There may be a default minimum that is related to or is a minimum amount of airflow required for health reasons. The desired airflow may be expressed as a percentage of a particular total airflow output, which may be in-part determined by the degree to which one of dampers 114aa-114nm (of FIGS. 1A and 1B) within one of rooms 113aa-113nm is open. Alternatively, the desired airflow may be expressed as a rate of air flow (e.g., in cubic centimeters per minute). As a result of the selection of a desired airflow, the necessary adjustments to the components of system 100 (of FIG. 1) for achieving the desired airflow may be made, if the desired airflow can be accommodated.

Modifiers 620a-620c are buttons or keys for storing newly entered or modified values associated with settings desired by a user of GUI 600. In an embodiment, the values stored via modifiers 620a-620c may be desired temperature 614, desired humidity 616, and desired airflow 618, respectively.

Error averages 622 may be averages, medians, variances, standard deviations, excursions, and/or other measured difference between current values and desired values of various parameters, such as current temperature 606, current humidity 608, current airflow 610, desired temperature 614, desired humidity 616 and desired airflow 618.

Savings 624 provides statistical information related to amounts of energy that may have been saved during the use of system 100. In an embodiment, savings 624 may be a visual representation of time periods (e.g. hours) in which heating/AC system 104 (discussed in conjunction with FIG. 1A) was used during a larger range of time (e.g. a week, month, year), and an estimated measurement of energy saved during that range of time.

Legend 626 may display definitions of elements, systems, and colors used with GUI 600. For example, different colored lines may represent the actual and desired temperatures.

Graph 628 is a visual representation of climate conditions associated with one or more rooms 113aa-113nm and/or zones 112a-112n over a period of time. Graph 628 may include a combination of lines, bars, and/or other indicative markings used in conjunction with the axis or scale of a graph to denote a value of temperatures and/or other sensor measurements and/or system (climate and/or HVAC) states as a function of time, amount, or degree. In an embodiment, graph 628 may provide information relating to the climates conditions within one or more rooms 113aa-113nm and/or zones 112a-112n. Further, graph 628 may include bars and/or lines for indicating the climate settings and/or measurements across a period of time. Temperature axis 630 is a scale for indicating a temperature in relation to a point along the axis of graph 628. Time axis 632 is a scale for indicating a time in relation to a point along the axis of graph 628.

In the example of FIG. 6, the room is used by different people at different times. Each of these people has entered different temperature preferences. Consequently, when only one person is present the climate of the room is set to that person's preferences, and when both people are in the room an average of the both persons' climate preferences is used to determine the climate settings. Thus, when only Bill is in the office (between hours 7 am and 9 am) the temperature is set to 68 degrees, which is the temperature that Bill entered into the thermostat as desired temperature 614. When only Sue is in the office (between the hours of 4 pm and 6 pm) the temperature is set to 74 degrees, which is the temperature that Sue entered into the thermostat as desired temperature 614. When both are in the office (9 am-12 pm and 1 pm-4 pm), the temperature is set to the 71 degrees, because 71 degrees is the average of the 68 degrees and 74 degrees (i.e., (68+74)/2=71). When neither are in the office (12 pm-1 pm and after 6 pm), the temperature is allowed to fall.

Format options 636 allow a user to change various formats associated with GUI 600. For example, format options 636 may allow a user to view temperature settings measurements in Celsius or Fahrenheit formats.

FIG. 7 shows a diagram of an embodiment of a GUI 700. GUI 700 includes greeting 602, current set points 704, dates 706, hours 708, temperatures 710, delete buttons 712, change buttons 714, periods 718, begin dates 720, end dates 722, time selections 724, desired temperatures 726, save buttons 728a and 728b, tool tips 730 and format options 636. In other embodiments, GUI 700 may not have all of the components listed above or may have other components instead of and/or in addition to those listed above.

GUI 700 may present settings for adjusting a temperature associated with a single location (e.g. a room), a combination of locations (e.g. a zone), all environments (e.g. a home or building), and/or one or more individual people. Greeting 602 was discussed above in conjunction with FIG. 6.

Set points 704 displays points (e.g. periods) of time, such as a range of days, and a range of hours during the range of days, that have been designated for having certain climate conditions chosen by a user. Further, set points 704 displays the climate conditions that were chosen and modifiers (e.g. buttons) for deleting or changing the previously chosen settings.

In this specification, a term "set point" refers to a range of dates, hours and a temperature or other state variables corresponding to values that are associatively grouped (such as the group including by one of dates 706, hours 708 and temperatures 710, or the group including one of periods 718, begin dates 720, end dates 722, time selections 724 and desired temperatures 726, which are discussed below).

Dates 706 display ranges of time previously selected by a user as part of a set point within set points 704. In an embodiment, the displayed ranges of time are days, weeks, months or years.

Hours 708 display ranges of hours previously selected by a user as part of a set point within set points 704, and periods of time within one or more of dates 706. In an embodiment, the displayed ranges of time are hours.

Temperatures 710 are the temperatures previously selected by a user as part of a set point. Further, temperatures 710 are applied during the periods of time specified by hours 708 and dates 706. In an embodiment, the displayed temperatures are temperatures within rooms 113a-113n and/or zones 112a-112n stored previously by a user as part of a set point. Temperatures 710 are associated with hours 708 and dates 706 during which temperatures 710 are applied.

Delete buttons 712 remove a stored set point with which one of delete buttons 714 is associated. Change buttons 714 initiate a modification process for entering a stored set point with which one of change buttons 714 is associated.

Set point tool 716 allows a user to create set points for implementing the selected temperature, time, and date settings of which the set point is comprised. Periods 718 allow a user to select one or more types of time periods during which a desired temperature is effected (e.g. "everyday," "one day," or any period of time between two dates).

Begin dates 720 are options denoting a date or beginning value of a range between two dates. In an embodiment, begin dates 720 correspond to one or more options of periods 718, and further specify the value or values associated with the one or more options of periods 718. Begin dates 720 form the value of a new set point when grouped with a corresponding value within periods 718, end dates 722, time selections 724 and desired temperatures 726. In an embodiment, begin dates 720 may be include an interactive calendar for entering the begin dates.

End dates 722 are options denoting an end date of period of time between two dates. In an embodiment, end dates 722 correspond to one or more options of periods 718, and further specify the value or values associated with the one or more options of periods 718. End dates 722 form the value of a new set point when grouped with a corresponding value within periods 718, begin dates 720, time selections 724, and desired temperatures 726. In an embodiment, end dates 722 may include an interactive calendar for entering the end dates.

Time selections 724 allow one or more ranges of hours and minutes to be specified. In an embodiment, time selections 724 form the value of a new set point when grouped with a corresponding value within periods 718, begin dates 720, end dates 722, and desired temperatures 726.

Desired temperatures 726 are values representing a temperature setting desire by a user. In an embodiment, desired temperatures 726 may include one or more drop down lists containing selectable values for selecting a temperature.

Save buttons 728a and 728b allow a user to store and/or effect selected changes or additions to the climate settings of the user. In an embodiment, save buttons 728a and 728b may be input buttons (e.g. input buttons written by a browser) and/or keys on a thermostat 118a (discussed in conjunction with FIG. 1) for receiving input. Tool tips 730 are general advice to aid a user in interacting with GUI 700.

Figure 8A:
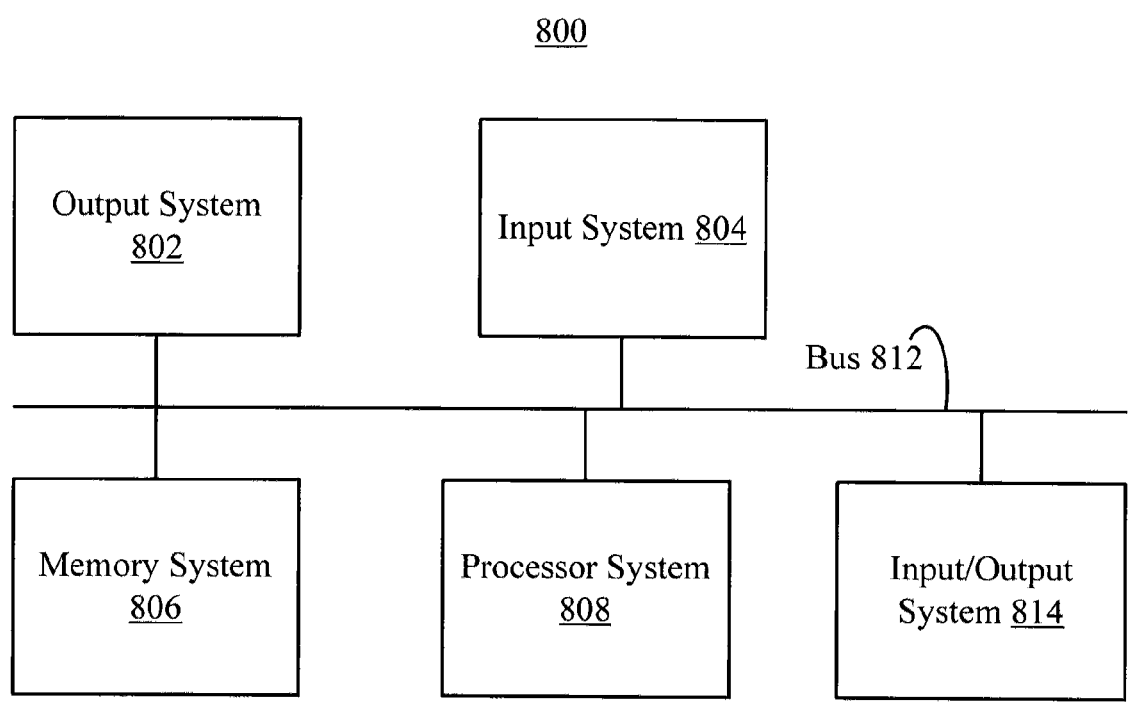
FIG. 8A shows a block diagram of a computing system.

FIG. 8A shows a diagram of an embodiment of a computer 800. Computer 800 includes output system 802, input system 804, memory system 806, processor system 808 and input/output system 814. In other embodiments, computer 800 may not have all of the components listed above or may have other components instead of and/or in addition to those listed above.

Computer 800 is an example of a computer that may be used in association with one or more systems 100. In an embodiment, computer 800 may be an embodiment of any one of, or combination of, sensors 116aa-116nm, optional thermostats 118aa-118nm, computer 120aa-120nm (of FIG. 1), controllers 124a-124n, or remote server 132, or any of a plurality of devices used in conjunction with climate control systems 100.

Output system 802 may include any one of, some of, any combination of, or all of a monitor system, a handheld display system, a printer system, a speaker system, a connection or interface system to a sound system, an interface system to peripheral devices and/or a connection and/or interface system to a computer system, intranet, LAN, and/or WAN. In an embodiment in which computer 800 is used for one or more of optional thermostats 118aa-118nm, output system 802 may include a display that displays the temperature. In an embodiment in which computer 800 is used for one or more of optional thermostats 118aa-118nm, computer 120aa-120nm (of FIG. 1), and/or controllers 124a-124n, output system 802 may include a user interface that facilitates entering climate and schedule preferences.

Input system 804 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, LAN, and/or WAN (e.g., IrDA, USB), for example. In an embodiment in which computer 800 is used for one or more of optional thermostats 118aa-118nm, input system 804 may include a key pad for entering temperature and schedule selections in response to prompts displayed on the display of output system 802. In an embodiment in which computer 800 is used for one or more of optional thermostats 118aa-118nm and/or controllers 124a-124n, input system 804 may include an input from one of sensors 116aa-116nm, via which temperature and humidity measurements may be received. In an embodiment in which computer 800 is used for one or more of controllers 124a-124n, input system 804 may include an input from one of optional thermostats 118aa-118nm, via which climate preferences and schedule settings may be received after entered by the user. In an embodiment in which computer 800 is used for one or more of optional thermostats 118aa-118nm, input system 804 may include an input from one of controllers 124a-124n, via which stored climate preferences and schedule settings a may be retrieved by a user.

Memory system 806 may include, for example, any one of, some of, any combination of, or all of a long term storage system, such as a hard drive; a short term storage system, such as random access memory; a removable storage system, such as a floppy drive or a removable drive; and/or flash memory. Memory system 806 may include one or more machine-readable mediums that may store a variety of different types of information. The term machine-readable medium is used to refer to any medium capable carrying information that is readable by a machine. One example of a machine-readable medium is a computer-readable medium. Other examples of machine-readable mediums include a paper having holes that are detected that trigger different mechanical, electrical, and/or logic responses and physical or other device switches corresponding to binary flags used to track settings. The term machine-readable medium also includes mediums that carry information while the information that is in transit from one location to another.

In an embodiment, computer 800 may be a personal computer, a thermostat, a sensor or a climate controller. If computer 800 is an embodiment of a sensor, memory 806 may include software for controlling other devices (which may be referred to as "device software") and climate data. Device software may be any type of code capable of being executed by a hardware device processor. In an embodiment, device software may include programming code for determining, evaluating and reporting data from a temperature and/or humidity detector related to a climate. Device software may further include one or more methods for rendering a GUI to a display device. Examples of device software are discussed below in conjunction with FIG. 8B.

If computer 800 is an embodiment of a personal computer, memory 806 includes client software, program code and program data. Client software may be downloadable software for implementing a GUI and/or a suite of control functions for controlling system 100. In an embodiment, client software may be a stand alone application, a local or remote interne browser application, or any other environment that allows a user to view, set, and modify settings associated with system 100. Program code may be any type of code that is executed by a software program present on a personal computer. In an embodiment, program code may include code 834 of FIG. 8B (discussed below). Program code may also include functions for computing the operating efficiency of system 100, savings accrued during the use of retrofit control system 102, and methods for determining and implementing an optimal usage plan for operating system 100. Program data may be any collection of data capable of being interpreted, evaluated and stored by a software program present on a personal computer. As a result of the storing, program data may be reported or retrieved from computational components within system 100. In an embodiment, program data may be an embodiment of climate data and/or user data 836 (discussed below).

Processor system 808 may include any one of, some of, any combination of, or all of multiple parallel processors, a single processor, a system of processors having one or more central processors and/or one or more specialized processors dedicated to specific tasks.

Communications bus 812 communicatively links output system 802, input system 804, memory system 806, processor system 808, and/or input/output system 814 to each other and external devices. Communications bus 812 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 814 may include devices that have the dual function as input and output devices. For example, input/output system 814 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 814 is optional, and may be used in addition to or in place of output system 802 and/or input device 804.

Figure 8B:
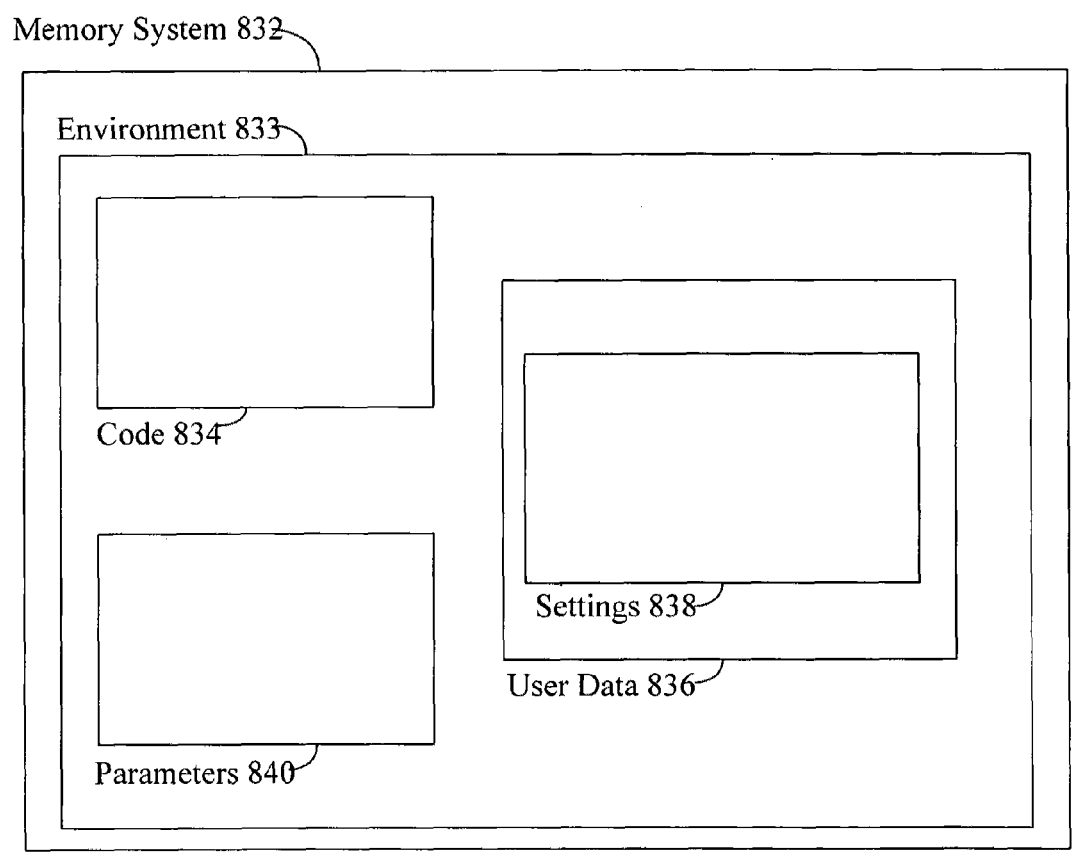
FIG. 8B shows a block diagram of the memory of FIG. 8A.

FIG. 8B shows a diagram of an embodiment of memory system 832, which is an embodiment of memory system 806 of computer 800. Memory system 832 includes environment 833, having code 834, and user data 835, user settings 836, and parameters 840. In other embodiments, memory system 832 may not have all of the components listed above or may have other components instead of and/or in addition to those listed above.

Memory system 832 may be an embodiment of the memory of one of controllers 124a-124n. Environment 833 may be an implementation platform for facilitating the execution, sending, receiving and/or storing of commands, information, data, settings and programming code associated with the functionality and users of a system 100. In an embodiment, environment 833 may be a WAN application server (such as Linux, Apache, Tomcat, Java Server, or other WAN application server), an operating system, a combination of an operating system and WAN application server, or any other platform capable of executing software. In an embodiment, environment 833 may execute and/or receive information and commands from a remote client, a software program and/or hardware drivers associated with computational components of system 100, and may cause the display and/or storage of the received information or commands.

Code 834 may include instructions for retrieving temperature and humidity measurements from sensors 116aa-116nm and optional thermostats 118aa-118nm. In this specification, the terms "code" and "computer code" are generic to applications and software. Code 834 may further include instructions for retrieving user settings (e.g. input) and other data from optional thermostats 118aa-118nm, computers 120aa-120nm, remote server 132, and/or other locations where user data may be located. Code 834 may also include instructions for analyzing (e.g. evaluating and/or comparing) the retrieved values as part of computing (1) whether to implement directives and settings associated with components of system 100 (e.g. the positions of the air registers 114aa-114nm, the on/off state of devices within heating/AC system 104, and a degree of change in settings required to obtain a desired climate), (2) when to implement the directives and/or settings, and (3) how to implement the directives and settings optimally and efficiently. Further, code 834 may contain methods for determining whether and how to modify existing directives and settings, and instances when such modifications will be necessary. Code 834 may also include instructions for checking remote server 132 for updates to code 834.

In an embodiment in which computer 800 is one of controllers 124a-124n, computer 800 may be a master controller that controls the others of controllers 124a-124n, and code 834 may include directives programming directives sent from to others of controllers 124a-124n for controlling the operations of heating/AC system 104 and air registers 114aa-114nm. Similarly, in an embodiment in which computer 800 is one of controllers 124a-124n, control of the entire system may be distributed among all of, or a select group of controllers 124a-124n, individual ones of controllers 124a-124n may send control directives to others of controllers 124a-124n, and code 834 may include programming directives sent from computer 800 to others of controllers 124a-124n. In an embodiment, code 834 may be an example of the device software discussed in conjunction with FIG. 8A.

Local system data 836 may be a collection of data for identifying communicatively linked computational devices within system 100 (such as controllers 124a-124n, sensors 116aa-116nm, optional thermostats 118aa-118nm and computers 120aa-120nm). Local system day may further store data associated with user inputs to, and reports from, the computational devices. In an embodiment, local system data 836 may be an entry within a data file (such as a node or branch within an XML file), a data construct (e.g. a database), and/or any of a plurality of known methods for tracking settings associated with one or more users of a network.

User data 838 may be a collection of data for identifying users of the system 100 associated with local system data 836, and storing settings associated with the users. An example of user data may be a desired range of temperatures and/or a humidity adjustment to be applied to one or more of rooms 113aa-113nm (of FIG. 1). User data 838 may also include a desired display format for climate readings, intervals of times during which chosen climate settings will be applied, and other settings related to viewing, managing, and controlling the features of a system 100 in a manner the user may prefer. User data 838 may also include subset of data for collecting the inputs of preferences chosen by a user to form a user history and/or profile.

Parameters 840 may be values which may be evaluated and/or applied when operating system 100. In an embodiment, parameters 840 may be the result of formulas computed during the installation of system 100, and/or determined via the execution of code by computational components within retrofit control system 102 (e.g. one of controllers 124a-124n, computers 120aa-120nm, and/or remote server 940, which is discussed below). Examples of parameters 840 may be values for determining a humidity corrected temperature, estimated airflow coefficients, and/or other values relevant for evaluation when system 100 is instructed to apply settings.

FIG. 9A shows a diagram of an embodiment of the memory system of remote server 132. Memory system 900 includes server application 902, code 904, interface 905, parameters 906, system data 908, user data 910 and GUI 912. In other embodiments, memory system 900 may not have all of the components listed above or may have other components instead of and/or in addition to those listed above.

Memory system 900 is an example of a server system that manages the operations of system 100 via user input to and remote commands from a server application. Memory system 900 may store and implement settings sent by a user system (e.g. a client system such as one of computers 120aa-120nm) associated with system 100. Memory system 900 may be an embodiment of memory system 806 of FIG. 8A when remote server 132 is an embodiment of computer 800 (also of FIG. 8A).

Server application 902 may be any of a plurality of applications capable of processing programming code, and executable by a WAN application server (such as Linux, Apache, Tomcat, Java Server, or other WAN application server), an operating system, or a combination of an operating system and WAN application server. In the specification, a server (e.g. an application server) is a computing device capable of storing, rendering and serving documents, data and instructions across any of a plurality of communications ready networks, and receiving, processing and/or storing data and inputs sent across such networks.

Code 904 may include functions for computing the operating efficiency of system 100, savings accrued during the use of retrofit control system 102, graphing of historical and/or future data, updating code to clients, serving the UI functions of a control system, creating zone schedules from individuals' schedules, and methods for determining and implementing an optimal usage plan for operating system 100. In an embodiment, code 904 may include the program code of memory 806 of FIG. 8A, for implementing and managing the functions of one or more sensors 116aa-116nm, optional thermostats 118aa-118nm and/or the client software of computers 120aa-120nm of retrofit control system 102. Code 904 may further include, code 834 of FIG. 8B, for implementing and managing the functions of one or more controllers 124a-124n. Memory 806 and code 834 were discussed above in conjunction with FIGS. 8A and 8B.

GUI 905 may be a graphical user interface for sending and receiving data to and from remote server 132. In an embodiment, GUI 912 may be an embodiment of GUI 600 and/or GUI 700 of FIGS. 6 and 7, respectively, and may be used by users for entering climate preferences.

Parameters 906 may be values which may be evaluated and/or applied during the operation of system 100. In an embodiment, parameters 906 may be the result of formulas computed during the installation of system 100, and/or determined via the execution of code by computational components within retrofit control system 102 (e.g., one of controllers 124a-124n, computers 120aa-120nm, and/or remote server 906). In an embodiment, parameters 906 may be an embodiment of parameters 840 of FIG. 8B.

System data 908 may be a collection of data for identifying a system 100 that connects to remote server 132, and for storing user data associated with the system 100 connecting to remote server 132. In an embodiment, system data 908 may be an entry within a data file (such as a node or branch within an XML file), a data construct (e.g. a database), and/or any of a plurality of known methods for tracking settings associated with one or more users of a networked server.

User data 910 may be a collection of data for identifying a user of the system 100 associated with system data 908, and storing settings associated with the user. An example of user data may be a desired range of temperatures and/or a humidity adjustment to be applied to one or more of rooms 113aa-113nm (of FIG. 1). User data 910 may also include a desired display format for climate readings, intervals of times during which chosen climate settings will be applied, and other settings related to viewing, managing, and controlling the features of a system 100 in a manner the user may prefer. User data 910 may also include subset of data for collecting the inputs of preferences chosen by a user to form a user history and/or profile.

FIG. 9B shows a diagram of an embodiment of a sensor. Sensor 950 includes temperature sensor 952, humidity sensor 954, optional memory system 956, optional processor system 958, input/output system 960, and communications bus 962. In other embodiments, sensor 950 may not have all of the components listed above or may have other components instead of and/or in addition to those listed above.

Temperature sensor 952 and humidity sensor 954 may be embodiments of temperature sensor 502 and humidity sensor 504 of FIG. 5, respectively. Optional memory system 956 may collect data related to climate measurements and readings performed by temperature sensor 952 and humidity sensor 954. In an embodiment, memory system 906 may be an embodiment of memory 906 of FIG. 8. Optional processor system 958, if present, may be an embodiment of processor system 808 of FIG. 8, and may convert the output of temperature sensor 952 and humidity sensor 954 into a format required by optional thermostats 118aa-118nm, and/or controllers 124a-124n. Processor system 958 may handle communications of sensor 950 with optional thermostats 118aa-118nm, and/or controllers. Input/output system 960 may send output related to climate measurements to one or more optional thermostats 118aa-118nm and/or controllers 124a-124n. In an embodiment, input/output system 960 may be a set (e.g. two or more) of communication wires which are wired directly from sensor 950 to one of optional thermostats 118aa-118nm, and/or controllers 124a-124n. In an embodiment, communications bus 912 may be an embodiment of bus 812 of FIG. 8.

FIG. 10A shows a diagram of an embodiment of a Table 1000. Table 1000 includes rooms 1002, nominal rate of flow 1004, max rate of flow 1006, max quiet rate of flow 1008, airflow coefficient 1010, desired temperature 1012, temperature tolerance 1014, measured humidity 1016, and measured temperature 1018. In other embodiments, table 1000 may not have all of the components listed above or may have other components instead of and/or in addition to those listed above.

Table 1000 may be a set of values associated with equations and algorithms for calculating and resolving values associated with the climate settings and functionality of system 100. In an embodiment, table 1000 may form a set of parameters used by computational devices within system 100 for operating and controlling climate altering components of system 100. Further, the parameter set formed by table 1000 may be used to partially or fully determine the information displayed to users of retrofit control system 102 of system 100 (FIG. 1).

Rooms 1002 may be numerical values for rooms within system 100 (e.g. rooms 113aa-113nm of FIG. 1). In an embodiment, rooms 1002 may have a one-to-many relationship with other values of table 1000. In an embodiment, the numerical value of one of rooms 1002 may serve as an identifier of the one of rooms 1002 having the numerical value. (e.g., a room having the numerical value of the numeral "1" may be identified as "1", "room 1", and so on, in equations or relevant tasks applicable to a room). The numerical value of a room within system 100 may be an identifier associated with one of optional thermostats 118aa-nm, one of sensors 116aa-nm or other device present in, for example, each room within system 100 (e.g., the detection of each sensor or thermostat may be the method of identifying an individual room). Further, during the installation process of retrofit control system 102 (FIG. 1), rooms 1002 may be assigned to users of retrofit control system 102 and zones (such as zones 112a-112n of FIG. 1) designated as containing rooms 1002.

Nominal rate of flow 1004 may be a value for representing an estimated amount of air flowing through one of air ducts 111 associated with one of air registers 114aa-114nm (of FIG. 1), which may be expressed in cubic feet per minute or other units. In an embodiment, during the installation of a system 100, information may be gathered and tests performed on heating/AC system 104 (of FIG. 1) to determine the diameter and length of air ducts 111 (of FIG. 1), the power (e.g. output) of fan 106 (of FIG. 1), requisite airflow rates for safe usage, and the duration of time required for heating/AC system 104 to cause rooms 113aa-nm (of FIG. 1) to reach designated temperatures. As a result of the testing, nominal rate of flow 1004 and other relevant values may be established. Nominal rate of flow 1004 may be derived by an equation based on the diameter, duct length, fan power and/or other empirical data associated with the capabilities of heating/AC system 104.

Max rate of flow 1006 may be a value for representing a measurement of the maximum airflow capacity of one of air ducts 111 associated with one of air registers 114aa-114nm (of FIG. 1). In an embodiment, during the installation of a system 100, information may be gathered and tests performed with heating/AV system 104 (as described above regarding nominal rate of flow 1004). As a result of the testing, Max rate of flow 1006 and other relevant values may be established. Max rate of flow 1006 may be derived by an equation based on diameter, duct length, power of fan, other specification and/or empirical data associated with the capabilities of heating/AC system 104.

Max quiet rate of flow 1008 may be a value for representing a measurement of the maximum rate of airflow sent into rooms 113aa-113nm (of FIG. 1), while keeping the noise below a maximum tolerable volume. The measurement may be associated with an amount of airflow considered to generate less noise during the operation of retrofit control system 102. In an embodiment, the value of max rate of flow 1006 is used as a point from which to scale back to a lower airflow amount. The lower airflow amount may be an estimated value or a value derived via testing of heating/AV system 104, with the desired aim of determining an airflow value which generates less noise.

Additional airflow coefficient 1010 may be a value representing an additional amount of airflow required to achieve a temperature within a room. In an embodiment, the coefficient may be a multiplicative coefficient that is multiplied by the airflow that would be otherwise computed. The additional airflow coefficient may be derived from empirical data associated with the actual performance of heating/AC system 104 (of FIG. 1). In an embodiment, the greater the length of time required for a temperature to be reached with a room, the higher the airflow coefficient value will be set. For example, max rate of flow 1006 and the capabilities of heating/AC system 104 may be used as upper limit values for retrofit control system 102. The upper limit values may be used as a baseline from which settings and values are reduced to reflect the currently necessitated operating parameters required by system 100 to obtain user desired results.

User desired temperature 1012 may be a value representing a temperature desired by a user for one of rooms 113aa-113nm when the humidity is 50%. In an embodiment, user temperature 1012 may be a humidity adjusted temperature applied when a user desires humidity adjusted settings within one or more rooms 113aa-113nm. The humidity adjustment may be an adjustment of temperature so that the perceived temperature is the temperature at the current humidity that the user perceives as the closer temperature if the humidity were not to vary from a datum (e.g., 50%). Although in this specification the current temperature is compensated to a temperature at 50% relative humidity, another datum/baseline of percentage of relative humidity could be used instead, such as 60% relative humidity, 40% relative humidity, 0% relative humidity.

The user temperature tolerance is an amount that it is expected that the temperature can vary from the set point without the user feeling uncomfortable. In another embodiment, the user temperature tolerance may be set by the administrator, a default setting and/or set by the end user. In an embodiment, user temperature tolerance 1014 may be inputted via GUI 600 and/or GUI 700 (of FIGS. 6 and 7). In other embodiments, user temperature tolerance 1014 may be an estimated default value. In an embodiment, there may also be other temperature tolerances (which may be referred to as "system tolerances") that are a measure of the accuracy within which a particular temperature may be set and/or maintained. In an embodiment, there may be one system tolerance for the entire system and/or different locations (rooms and/or zones) may have different tolerances. Similarly, in an embodiment, there may be one user tolerance for the entire system and/or different locations (rooms and/or zones) and/or individuals may have different user tolerances.

Measured humidity 1016 may be values representing a measured humidity reading within rooms 113aa-113nm. In an embodiment, measured humidity 1016 represents humidity readings for rooms 113aa-113nm reported by the sensors 116aa-116nm.

Measured temperatures 1018 may be values representing a measured temperature reading within rooms 113aa-113nm. In an embodiment, measured temperatures 1018 may be temperature readings for rooms 113aa-113nm reported by the sensors 116aa-116nm.

FIG. 10B shows a diagram of an embodiment of a Table 1020. Table 1020 includes rooms 1002, comfort control 1021, desired temperature full 1022, set point temperature 1024, temperature error 1026, error signal 1028, airflow share 1030, airflow percentage 1032, desired duct rate of flow 1034, open position 1036, actual position 1038, calculated airflow 1040 and air handler state 1042.

In other embodiments, table 1020 or other algorithm implementing such logic may not have all of the components listed above or may have other components instead of and/or in addition to those listed above.

Comfort control 1021 may be a flag for determining whether a selected temperature applied within one of rooms 113aa-113nm is a humidity adjusted temperature. In the specification, a humidity adjusted temperature is a perceived temperature felt when heat and humidity are combined. A table reflecting apparent temperature values (e.g. perceived temperatures) of rooms when varying percentages of relative humidity are present, can be found via the National Oceanic and Atmospheric Administration's Environmental Data and Information Service. In an embodiment, comfort control 1021 has on/off states which are set by a user via GUI 600 and/or GUI 700 (discussed in conjunction with FIGS. 6 and 7). User desired temperature 1022 may be a desired temperature value associated with a user selection. User desired temperature 1022 is the temperature that was input by the user without any modification. Set point temperature 1024 is a computed value to which the temperature of the room is to be set. In an embodiment, even if the humidity adjustment is off, then the set point temperature may still not be the temperature desired by the user, as entered by the user as user desired temperature 1022, because the system may use a different set point in order to conserve energy and/or to better meet other needs of the system or of that location.

If the humidity adjustment is on, the temperature set point may be modified by the temperature required at the current humidity to obtain a perceived temperature that is the same as entered as user desired temperature 1022 at 50% RH. Set point 1024 may also be one or more current target values of the temperature and/or one or more values for determining and/or representing the system state (e.g., climate), and may be associated with methods for setting the parameters of one or more of controllers 124a-124n. In an embodiment, set point temperature 1024 may be part of code 834 and/or code 904 associated with computer 800 and/or memory system 900 of remote server 132 (of FIGS. 8B and 9A), respectively. Set point temperature 1024 may be a location in memory that receives the value of a temperature desired for one of rooms 113aa-113nm. Further, set point temperature 1024 may be evaluated in conjunction with the values of set point temperatures associated with other users and/or rooms 113aa-113nm. For example, to obtain the set point temperature 1024 of a first user, retrofit control system 102 may use other rooms 113aa-113nm as areas to pull and/or push air to and/or from (assuming that the ducts and dampers are setup in a manner that allows the desired pushing and/or pulling of air). Prior to designating one of rooms 113aa-113nm for pushing and/or pulling for air to and/or from, the set point temperatures 1024 associated with those of rooms 113aa-113nm being considered for pushing and/or pulling air may be evaluated to ensure that the pushing and/or pulling of air under consideration will not create a conflict with the desired settings of that room (e.g., and will not result in one of rooms 113aa-113nm exceeding the target temperature range and/or other settings associated with that one of rooms 113aa-113nm). As a result, methods for obtaining the temperature of set point 1024 may be determined. Examples of considerations for determining set points 1024 for a given room may include evaluating (a) the total air capacity of system 104 in comparison with the amount of air desired for each of rooms 113aa-113nm and the particular room under consideration (b) the desired climate of rooms surrounding the room under consideration (c) whether a user associated with set point temperature 1024 set comfort control 1020 to an on or off state, (d) the degree of allowable temperature variance that may be entered by the user as user temperature tolerance 1014, (e) the value of current set points 704 (FIG. 7) of other rooms 113aa-113nm which form a zone, and (e) energy conservation requirements.

Temperature error 1026 is the difference between set point temperature 1024 and measured temperature 1018. For example, if measured temperature 1018 is 70 degrees and set point temperature 1024 may be 66 degrees, then the value of temperature error 1026 would be 4 degrees.

Error signal 1028 is a parameter for determining a percentage of airflow into rooms 113aa-113nm required to adjust set point temperature 1024 to the value of a temperature desired by a user (e.g. user desired temperature 1012 or user desired temperature 1022). The error signal may be determined by a formula, which may be the product of the temperature error 1026 and additional airflow 1010.

Share of airflow 1030 may represent the value of a percentage of the total airflow into one of rooms 113aa-113nm. In an embodiment, the entry for each room for the share of airflow 1030 may be computed from the percentage that the error signal for that room is of the total of all of the error signals. For example, consider the following scenario of FIG. 10B. The total of the error signals is 12.4 (because 4+3.3+2.4+1.3+1.4=12.4). Consequently, the share of air for room 1 is 100*4/12.4=32%, for room 2 is 100*3.3/12.4=27%, for room 3 is 100*2.4/12.4=19%, for room 5 is 100*1.3/12.4=10%, for room 5 is 100*1.4/12.4=11%, and for the remaining rooms is 0%.

Airflow percentage 1032 may be a percentage of the airflow capacity of one of air registers 114aa-114nm required to obtain a temperature desired by a user, while simultaneously achieving desired setpoint temperatures in all other rooms. In an embodiment, the desired temperature associated with the one of rooms 113aa-113nm may require the position of a damper within the associated air register or duct 114aa-114nm to be partially or fully open or closed in order to receive the amount of additional conditioned air associated with achieving that room's desired temperature. For example, a room 113aa-113nm with a higher temperature may require a higher airflow percentage to become cooled than a room 113aa-113nm with a lower temperature.

Desired duct rate of flow 1034 may be a value representing the amount of airflow sent into a room as a result of the settings for share of airflow 1030. In an embodiment, the value of desired duct rate of flow 1034 is stated in cubic feet per minute. Further, the amount of airflow desired duct rate of flow 1034 represents may be a portion of, or all of the amount of airflow signified by nominal duct rate of flow as determined by airflow percentage 1032. For example, if the current amount of airflow for six rooms were 5,000 cubic feet per minute, and a room received 10% of the airflow, the amount of airflow and the desired duct rate of flow would be 500 cubic feet per minute.

Desired position 1038 may be the amount, measured in degrees, that a duct within air registers 114aa-114nm is desired to be open. In the specification, the term "desired" is generic to both a user preference and the ideal functioning of components within system 100 (of FIG. 1). In an embodiment, desired position 1038 is the degree to which a duct within an air registers 114aa-114nm should be open in order for the air register 114aa-114nm to receive the percentage of airflow specified by percentage of airflow 1032.

Actual open position 1038 may be the amount, measured in degrees, that a duct within air registers 114aa-114nm is currently open prior to making any adjustments, or while adjustments are being made (dampers may require much more than one sample period to move to their desired positions).

Calculated airflow 1040 may be the calculated current air flow based on the current damper position.

Air handler 1042 is a relay (e.g. a flag) for determining the on/off state of an air handler or other HVAC equipment being controlled, and the heating cooling state of heating/AC system 104. In an embodiment, air handler 1042 has states representing the on or off status of an air handler, and a switch for determining which component of heating/AC system 104 will be used for altering the air flowing into rooms 113aa-113nm (e.g. fan 106, air conditioner 108 or heater 110). The states managed by air handler 1042 may be switched on and off via GUI 600 and/or GUI 700 (of FIGS. 6 and 7). However, in an embodiment, states handled by air handler 1042 may generally be switched by logic circuits and/or algorithms embedded in controllers 124a-124n.

Figure 11:
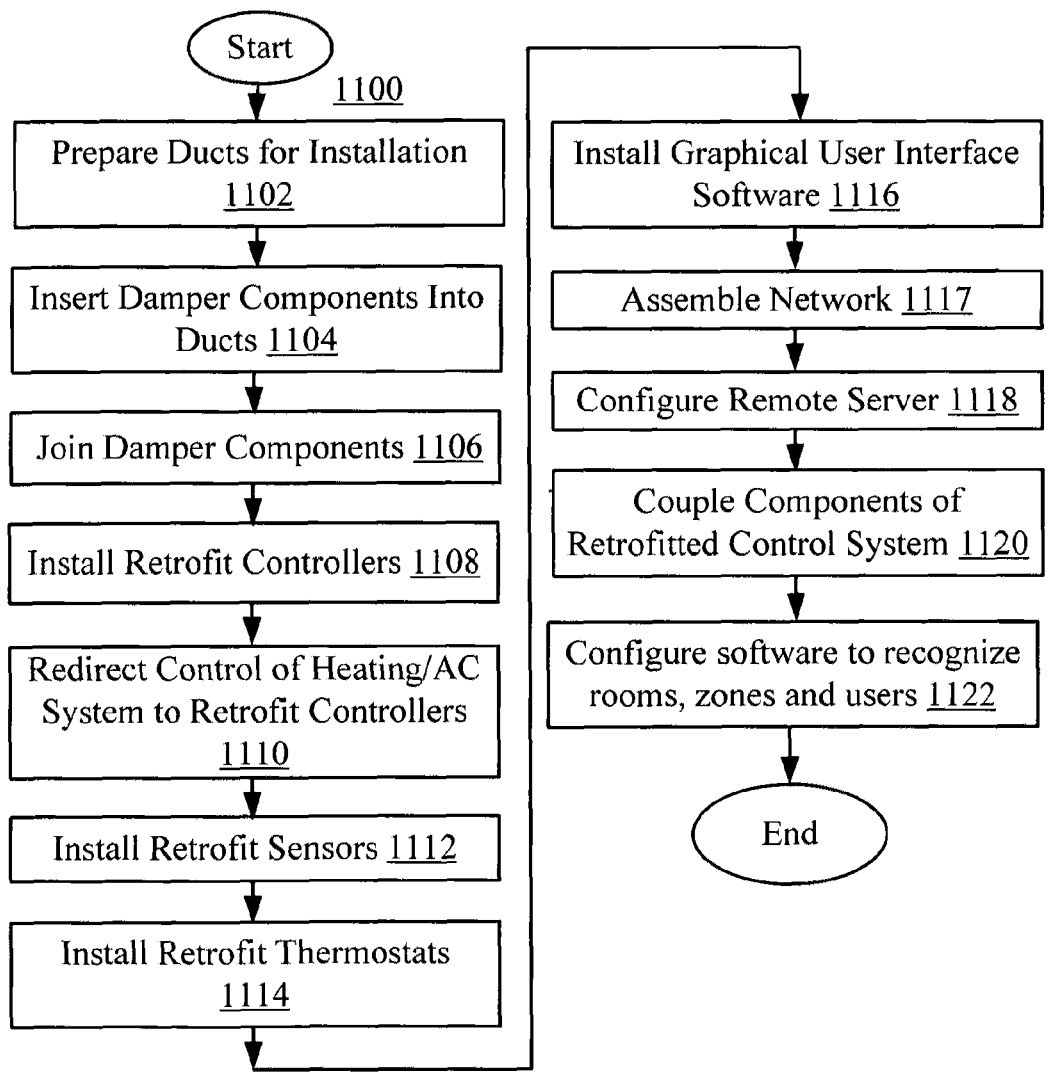
FIG. 11 shows a flowchart of an example of a method of assembling system 100.

FIG. 11 is a flowchart of an example of a method 1100 of making system 100. In step 1102, air ducts 111 (FIG. 1) are prepared for the installation of air registers 114aa-114nm. Step 1102 may include, removing a cover attached over openings of air ducts 111 into rooms 113aa-113nm (FIG. 1), and optionally removing a legacy air damper (if one is present), adjusting and/or otherwise altering a segment of air ducts 111 to receive air registers 114aa-114nm. In step 1104, the components of air registers 114aa-114nm are inserting into or in series with air ducts 111. Optionally, step 1104 may include the disassembly of the components of air registers 114aa-114nm prior to their inserting into air ducts 111. In step 1106, the components of air registers 114aa-114nm within or with air ducts 111 are joined together. Step 1106 may include the joining a motor, gears, pivot, damper, and/or pieces forming a cylindrical housing. Step 1106 may also involve returning the air duct cover to its original location.

In step 1108, legacy thermostats 122a-122n of legacy control system 101 are disconnected from legacy controller 103 (discussed in conjunction with FIG. 1). As part of step 1108, controllers 124a-124n of retrofit control system 102 are connected to heating/AC or other HVAC system 104 (discussed in conjunction with FIG. 1). Optionally, controllers 124a-124n are connected to legacy controller 103. As part of step 1108, control of heating/AC system 104 may be communicatively coupled to controllers 124a-124n (FIG. 1). Step 1108 may include hardwiring controllers 124a-124n to heating/AC system 104 and legacy controller 103 in a manner that allows controllers 124a-124n to switch on and off fan 106, air conditioner 108, heater 110, and/or legacy controller 103 (FIG. 1). As part of step 1108, different ones of controllers 124a-124n are configured to control different areas defined as zones. Each zone may contain one or more rooms, which correspond to zones 112a-112n and rooms 113aa-113nm (of FIG. 1) (optionally, a room may be divided into several zones or a zone may include several rooms. In an embodiment, each zone is a different area and the zones do not overlap one another. In another embodiment, the zones may overlap.

In optional step 1110, one or more computers 120aa-120nm (FIG. 1) are installed within rooms 113aa-113nm or elsewhere (if computers 120aa-120nm are not already present and are desired). In step 1112, sensors 116aa-116nm, are installed within retrofit control system 102. Step 1112 may include providing and installing sensors 116aa-116nm within areas designated as one of rooms 113aa-113nm or zones 112a-112n. In an embodiment, there may be at least one sensor for each zone.

In step 1114, optional thermostats 118aa-118nm are installed within retrofit control system 102. Step 1114 may include providing and installing optional thermostats 118aa-118nm within areas designated as one of rooms 113aa-113nm and/or one of zones 112a-112n.

In optional step 1116, software associated with the functionality of the components and applications discussed in FIGS. 6-10 is installed into optional thermostats 118aa-118nm, controllers 124a-124n and/or computers 120aa-120nm. Step 1116 may include the installation of software for implementing GUI 600, GUI 700, environment 833, an integrated server of controllers 124a-124n, and the values, parameters, formulae and algorithms of table 1000 (of FIGS. 6, 7, 8B, 9 and 10, respectively). In step 1116 one or more graphical user interfaces are installed to one or more computers 120aa-120nm, optional thermostats 118aa-118nm and/or remote server 132. Step 1116 may include the installation of software and/or devices (such as an LCD display) capable of rendering a graphical user interface.

In optional step 1117, network 130 is assembled (if not already present) and/or communicatively coupled to one or more of controllers 124a-124n and/or computers 120aa-120nm. In optional step 1118, remote server 132 may be installed and/or configured to enable controlling zones 112a-112n and/or heating/AC system 104 via network 130 (FIG. 1). Alternatively, remote server 132 (FIG. 1) may be configured to provide other WAN based functionality to retrofit control system 102. Step 1118 may include the installation of other hardware and/or software components for implementing the functionality of remote server 132. In an embodiment, remote server 132 and/or server software may be installed in an entity's (e.g., a company's) intranet and/or hosted elsewhere, such as at another company. In optional step 1120, any of the components of control system 100 that are not already connected are communicative coupled to the appropriate portions of climate control system 100.

In step 1122, values for parameters of formulas associated with table 1000 are established, such as the airflow capacity of air ducts 111, an estimated length of time required for a temperature within rooms 113aa-113nm to be attained and other values associated with the functioning of system 100. Step 1122 may include configuring software associated with the functionality of retrofit control system 102 in other manners. Step 1122 may include the establishing variables and settings for recognizing and applying the settings for rooms, zones, and users associated with retrofit control system 102. For example, rooms may be assigned reference values, zones may be defined as groupings of one or more rooms, default settings for rooms and zones may be set, storage for user information may be configured and administrative and user accounts may be created.

Figure 12A:
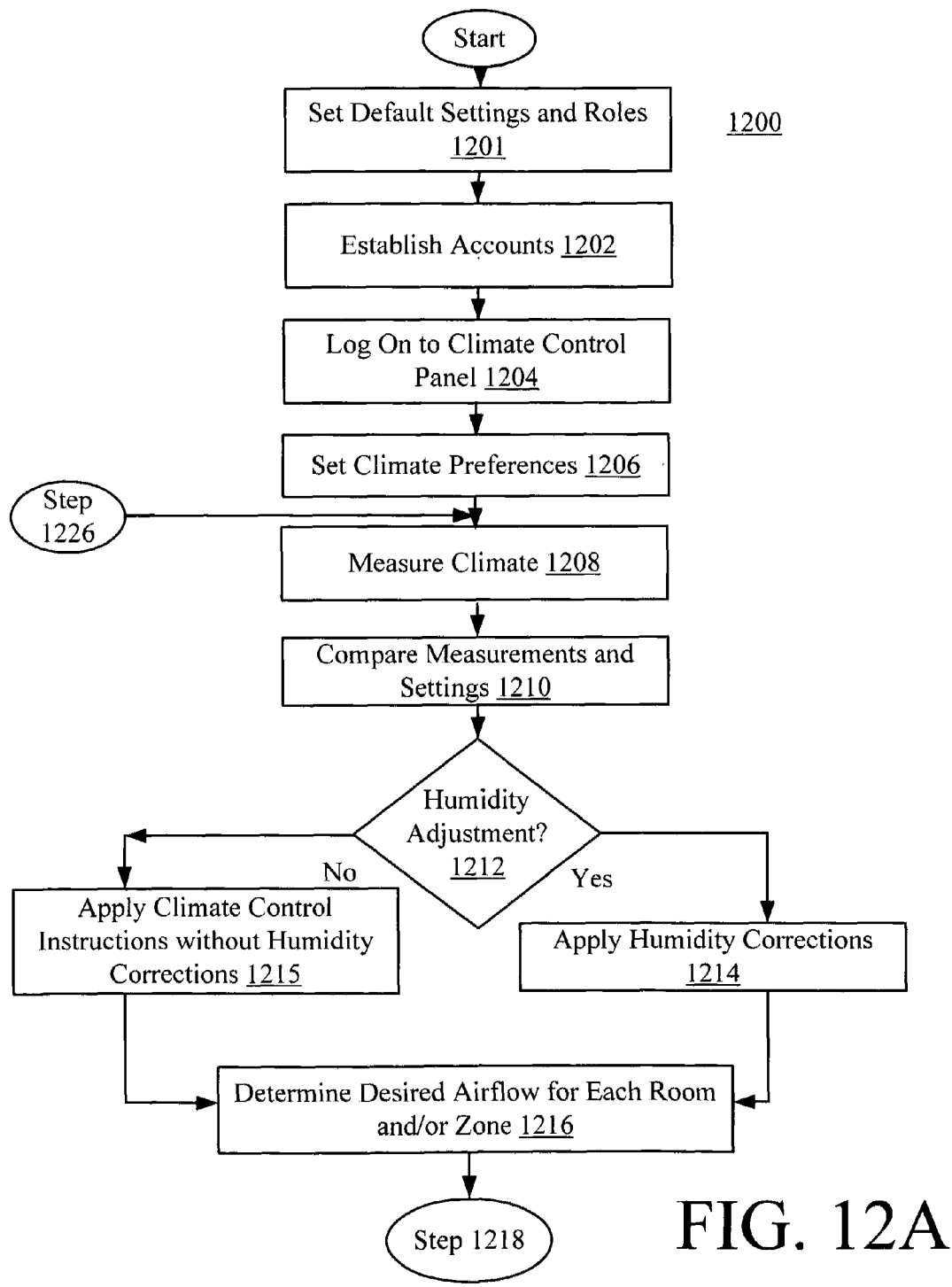
FIG. 12A shows a first half of a flowchart of an example of a method of using system 100.

FIG. 12A is a flowchart of an example of a method 1200 of using system 100. The second half of the method 1200 is described in FIG. 12B.

In optional step 1201, default settings are established for users. Optional roles are also established for different types of users, such as administrator and/or end user. There may also be seniority settings or other roles and different priorities are assigned to the different seniority settings and/or roles. An administrator may have certain privileges to modify system settings that affect the entire system or other user accounts. End users may be given privileges that include setting personal preferences. The personal preferences may be associated with an employee's normal location of work (e.g., the employee's office or work area), locations where the user is expected to be, and/or locations where the user is currently detected. Seniority settings may determine which end user settings have a priority (which may be associated with higher ranking persons and/or more important rooms, such as computer rooms and/or customer areas), in cases of conflict and the desired of settings of all end users cannot be achieved.

In step 1202, one or more accounts established are for one or more users of control system 100.

In step 1204, using the account established in step 1202, a user accesses (e.g. logs on) to a control panel for creating climate settings for immediate or future implementation. Step 1204 may also include providing a user name password combination established in step 1202.

In step 1206, temperature preferences are created and stored for an end user of retrofit control system 102. Step 1206 may include the creation of set points (such as set points 704 of FIG. 7). Optionally, step 1206 may include the user entering a schedule of when the user may be present in their work area, so that the work area only needs to be maintained at the climate settings chosen by the user while the user is present. The schedule may also include where the user will be within the building at different times, so that the climate preferences of the user may be applied to the locations where the user expects to be at a given time. Alternatively or additionally, as part of step 1206, the user may passively enter current location information via a Radio Frequency Identifier (RFID) device or another location identifying device, so that user-chosen climate conditions may be maintained at the current location of the user. An advantage of using both a location identifying device and a preprogrammed schedule is that if the schedule information is know in advance, the room may brought to the desired climate prior to the user entering the room, while the location identifying device may be used to adjust the climate when the user moves to an unscheduled location.

In step 1208, one or more sensors (such as sensors 500, 550 and/or 560) measure climate (e.g., temperature, rate of airflow, and/or humidity) readings for locations within retrofit control system 102. Step 1208 may further include the storing or the reporting of the measured readings to other components of retrofit control system 102.

In step 1210 a comparison is made between the preferences received as part of step 1206 and the climate measurements of step 1208. Step 1210 may include one or more controllers 124a-124n reading the climate preferences set and/or reading the climate measurements recorded prior to making the comparison. Step 1210 may include the storing and/or reporting of the result of the comparison to other components of retrofit control system 102. For example, a subset of one or more of controllers 124a-124n may perform the comparison, which is then sent to or retrieved by others of controllers 124a-124n. Also, the measurements, settings, and the results of the comparisons may be sent to optional thermostats 118aa-118nm, computer 120aa-120nm, and/or remote server 130 for display to the end user.

In step 1212, a determination of whether desired climate conditions for a given room and/or user are expressed in terms of the temperature or the humidity adjusted temperature. If the desired climate conditions include factoring in the humidity, method 1200 proceeds to step 1214. Alternatively or additionally, step 1212 may determine whether a particular humidity was specified for the end user and/or room in question.

In optional step 1214, as a result the determination of step 1212 indicating that a humidity or a humidity adjusted temperature is desired, a set of instructions are applied that require humidity measurements and/or compute the humidity adjusted temperature, which are implemented by optional thermostats 118aa-118nm, computer 120aa-120nm, and controller 124a-124n. As part of step 1214, based on the implemented instructions control signals may be sent to heating/AC system 104.

Returning to step 1212, if the desired climate conditions do not include factoring in the humidity, method 1200 proceeds to step 1215. In optional step 1215, as a result the determination of step 1212 indicating that a humidity or a humidity adjusted temperature is not desired, a set of instructions are applied that do not require humidity measurements and do not compute the humidity adjusted temperature, which are implemented by optional thermostats 118aa-118nm, computer 120aa-120nm, and controller 124a-124n. As part of step 1215, based on the implemented instructions control signals may be sent to heating/AC system 104.

In step 1216, a determination is made of the errors signal. Determining the error signal may involve computing the difference between the current temperature or other climate parameter and the set point temperature or other climate parameter and then multiplying the difference by a multiplicative coefficient.

In optional step 1218, a determination is made as to the path of airflow. Step 1218 may include determining whether to pull air from or push air to the outside and/or one or more of the other of rooms 113aa-113nm to obtain a user desired temperature, humidity, airflow, and/or humidity adjusted temperature. Step 1218 may include an evaluation of parameters associated with rooms adjacent to the one of rooms 113aa-113nm for which a temperature change is desired, and outdoor climate conditions. Step 1218 may also include a determination of a source from which air will be pulled (e.g. a room, outside) when a choice of where to pull air from is an option in obtaining a desired temperature or a desired set of temperatures. Step 1218, may include evaluating whether one or more rooms is expected to be in use, and when it would be in use (e.g., possibly to save more energy by ventilating a room more with either inside or fresh outside air before the room is to be occupied, so that less airflow (at least temporarily) would be needed to achieve user preferences and/or legal statues for minimal airflow). As a simple example, if one room is too hot and another air is too cold it may be more efficient to transfer the air from the room that is too hot into the room that is too cold than to move the air elsewhere, especially if the room that is too cold is not currently in use and is not expected to be in use for a while (but needs to be heated so that when in use later the room will already be at the correct temperature). As another example, if the temperature outside is very cold, one room is too hot, and another room is not in use, it may not matter what the climate conditions are in the room that is not in use. Consequently, it may be more efficient to transfer some of the hot air from the room that is too hot to the room not in use instead of transferring/conditioning the air in another manner, especially if the room that is not in use is near other rooms that need to be heated.

Dumping the hot air into the room that is not in use may keep the building as whole warmer and/or the rooms next door to it warmer, and therefore reduce the amount of energy spent running heater 110. The determination of the path of the airflow may affect the error signal. After step 1218 method 1200 proceeds to step 1220 of FIG. 12B.

Figure 12B:
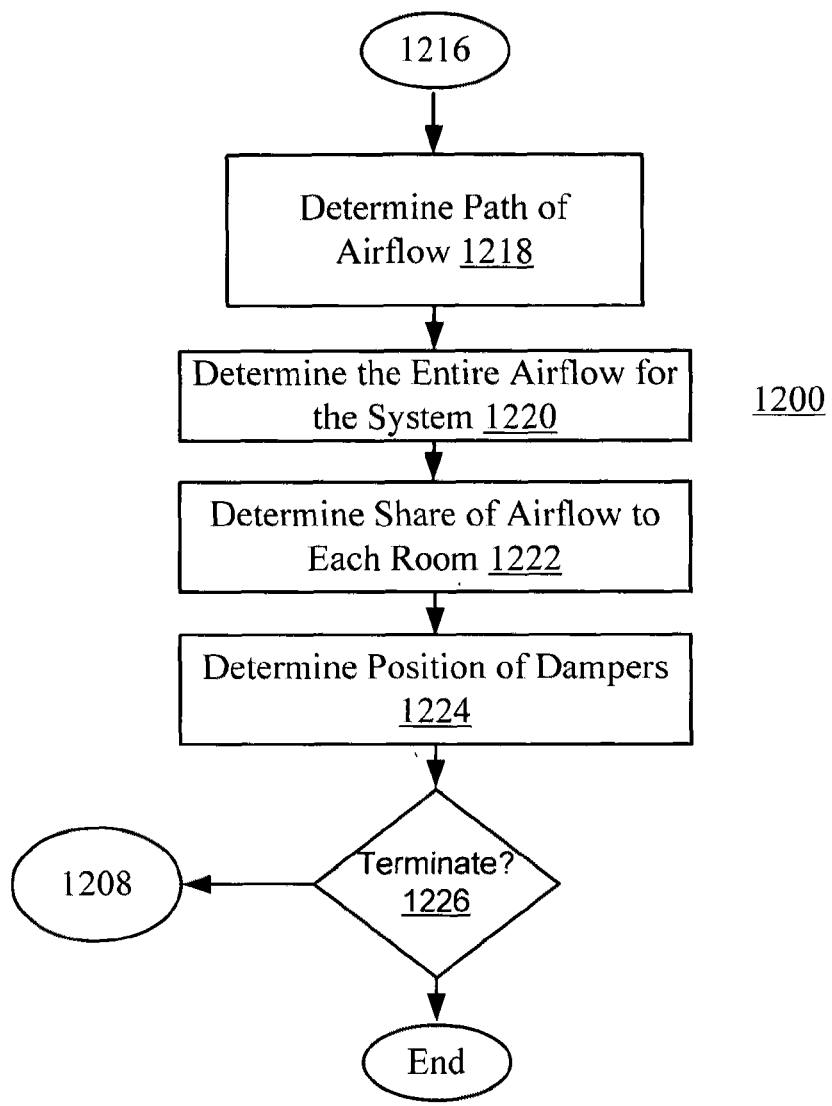
FIG. 12B shows a second half of a flowchart of an example of a method of using system 100.

FIG. 12B is a continuation of the process of FIG. 12A. After step 1218 of FIG. 12A, method 1200 proceeds to step 1220 of FIG. 12B. In step 1220, a total amount of airflow that is preferable for obtaining a set of user desired temperatures, humidities, and/or adjusted humidities are calculated, based on the error signals 1028. Step 1220 may include an evaluation of values associated with the airflow capacity of the fans 106 and/or air ducts 111 of system 100. Step 1220 may also include an evaluation of stored data associated with airflow amounts and lengths of time required to obtain user desired temperatures during prior usage of retrofit control system 102. Step 1220 may further include the storing and/or reporting of data associated with the share of airflow that is preferable to send into multiple rooms 113*aa*-113*nm*. Step 1220 may be performed in conjunction with steps 1212-1216. In step 1222, an amount of airflow for each room that is preferable for obtaining a set of user desired temperatures, humidities, and/or adjusted humidities is calculated, based on the error signals 1028. Steps 1220 and 1222 may be performed in conjunction with one another. In an embodiment, step 1222 is performed before step 1220 by correcting the error signal for each room based on step 1218. Each error signal is converted into a rate of airflow, and then the total of the airflows for each room is the total airflow of step 1220 unless the climate control system 100 is not safely capable of the rates of airflow computed. In step 1224, as a result of a determination of the percentage of the total amount of airflow that is preferable for sending to each of rooms 113*aa*-113*nm*.

In step 1224, the position of dampers within the air registers of room 113*aa*-113*nm* is calculated and set. Step 1224 may include the evaluation of shared airflow values set in step 1224, the calculation of the position to which one or more dampers should be turned in order to obtain the desired airflow into each room, and the activation of the appropriate components of an air register 114*aa*-114*nm* (e.g. motor 212, worm gear 210 and gear 208 of FIG. 2) required to adjust damper 204.

The computations associated with determining the motor speed and/or stages of fan 106, temperature and/or stage setting(s) of air conditioner 108, temperature and/or stage setting(s) of heater 110, and/or damper positions associated with steps 1212-1224 may be an iterative process in which the computations of associated with steps 1212-1224 are repeated multiple times before a final set of the actuations of fan 106, air conditioner 108, heater 110, other optional HVAC equipment, and/or damper positions is determined. In performing the computations associated with determining the actuations of fan 106, air conditioner 108, heater 110, other optional HVAC equipment, and/or damper positions the user tolerances may be used particularly in situations where it is not possible to achieve the precise desired temperature, humidity and/or humidity adjusted temperature for each room because heating/AC system 104 may not generate enough or may generate too much heat, airflow, and/or cool enough air to meet the preferred temperature for each room. User tolerances may also be used to reduce operational costs of the HVAC system. Also, in an embodiment in which the locations of the individuals is detected and the climate settings are adjusted according to the location of each individual as the individual moves about the building, when multiple people are in the room, although one or more people may desire the room to be at different temperature, there may still existing a range of temperature defined by an overlap in the tolerance of the individuals in the room to which the temperature can be adjusted.

In step 1226, a determination is made whether to shut control system 100 off. If control system 100 is shut off, method 1200 terminates. If controls system 100 is not shut off, method 1200 returns to step 1208 where the climate measurements are repeated. Re-measuring the current climate and repeating steps 1210-1224 provides a feedback that allows system 100 to adjust its settings according to the actual climate conditions produced. Additionally, re-measuring the current climate and repeating steps 1210-1224 allows climate control system 100 to adjust to changes in user settings. In an embodiment, sensor readings may continue to be made even if the other equipment is shut off. In an embodiment, step 1226 may be performed by switching a switch form on to off. Although step 1226 is illustrated as occurring after step 1224, it may be possible to shut off control system 1200 at any time during method 1200.

Figure 13A:
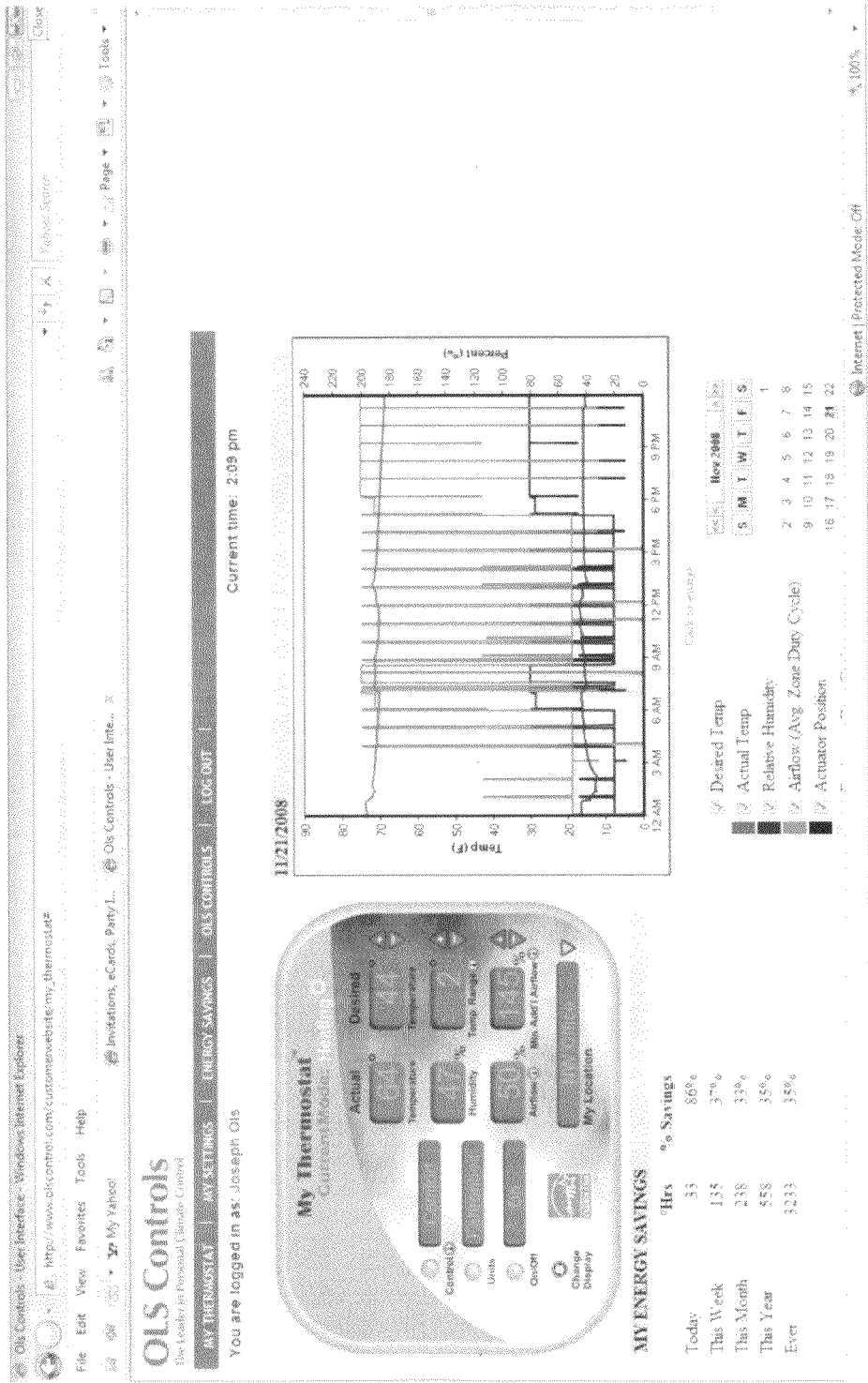
FIG. 13A shows screenshot of an embodiment of a Graphical User Interface for the system of FIG. 1.
Figure 13B:
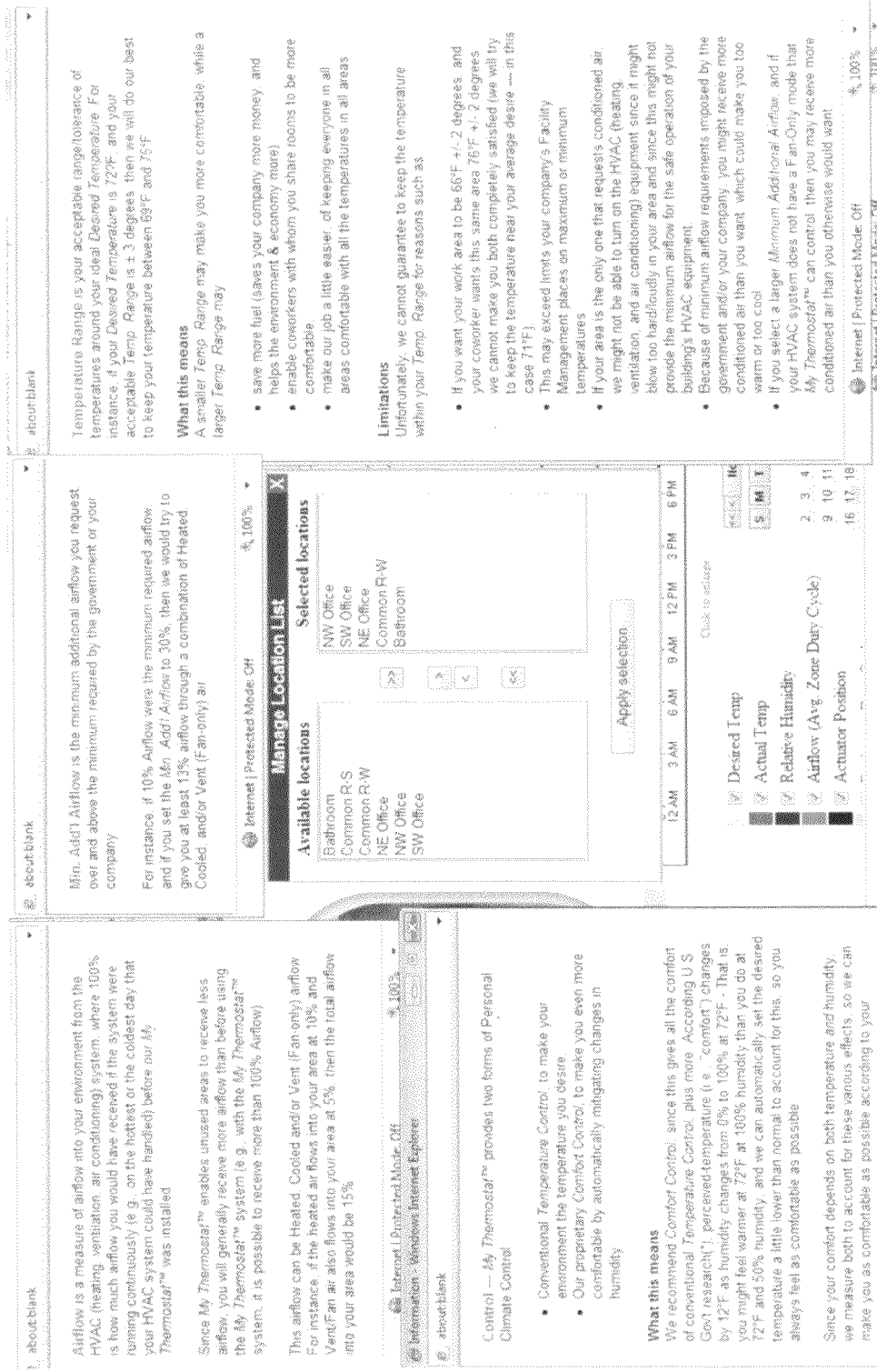
FIG. 13B shows a screenshot of an embodiment of a MyLocations list of the GUI of FIG. 13A.

FIG. 13A shows screenshot of an embodiment of a Graphical User Interface for the system of FIG. 1. FIG. 13A shows the current climate settings, the desired climate settings, and energy savings, for example, for a zone and/or for a plurality of zones. FIG. 13B shows a MyLocation list on the MyThermostat page, of FIG. 13A. The MyLocations list allows the user to specify the location where the user expects to be frequently. The system controls the climate in those locations according to that user's preferences. The user may be able to just before exiting one room and entering another room select the room from the MyLocations list that the user is going to, and then the user's climate preferences will be applied to that room. Optionally, the user may also be able to specify which times the user expects to be in each location and the system will control the climate according to that user's preferences during the times that the user specifies. The MyLocations feature makes it easier for users with many rooms to use the system (e.g., an engineer at HP may regularly switch between his Office, a Lab, 2 Conf. Rooms, and his Boss' Office—with 5 rooms on his MyLocation list, he can easily toggle between them—however, were he to have to select between the 10,000 rooms at HP every time, he would never use this system).

Figure 14:
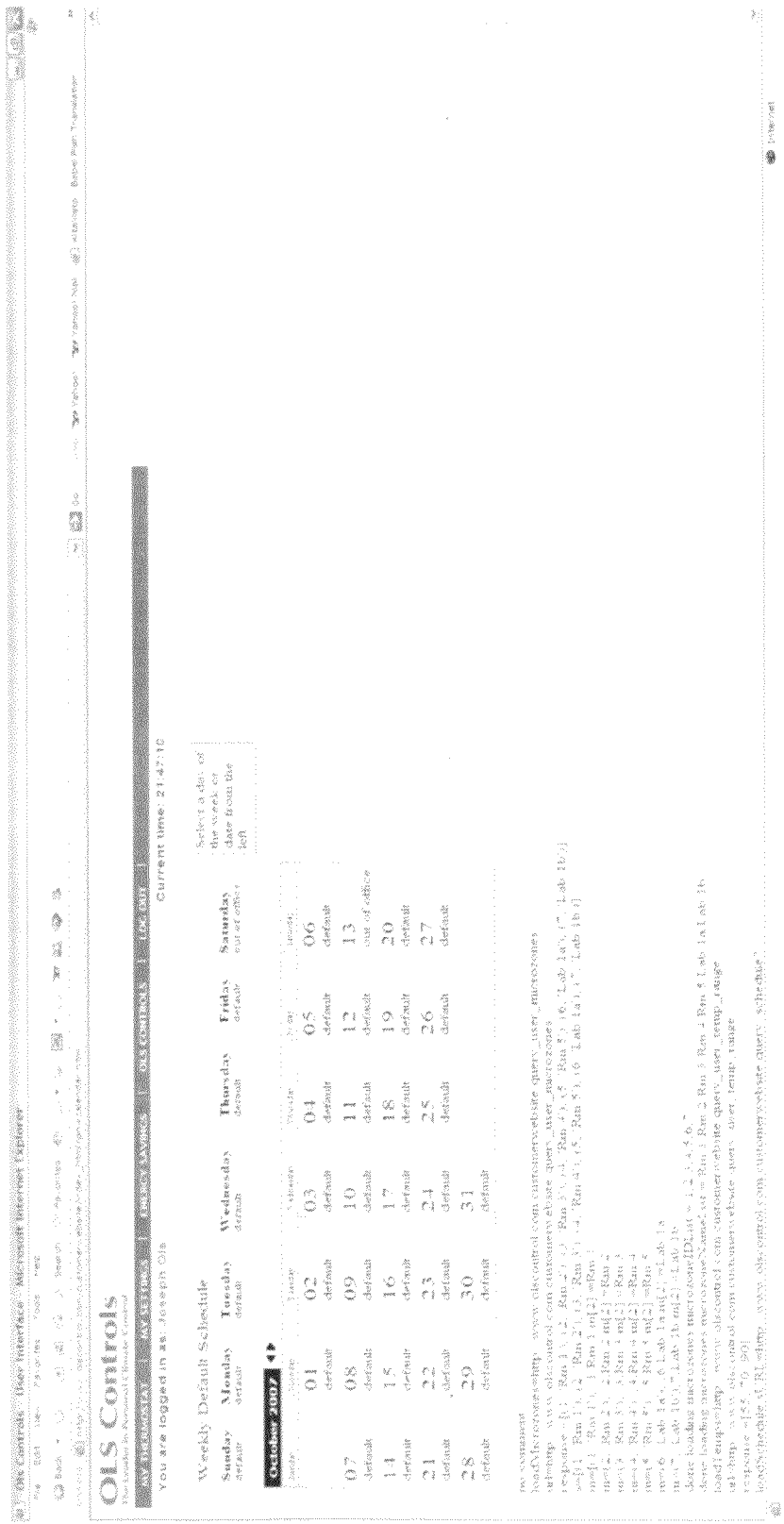
FIG. 14 shows screenshot of an embodiment of a Graphical User Interface for the system of FIG. 1.

FIG. 14 shows screenshot of an embodiment of a Graphical User Interface for the system of FIG. 1. FIG. 14 shows a calendar listing the settings that are to be applied for each day on the calendar.

Figure 15A:
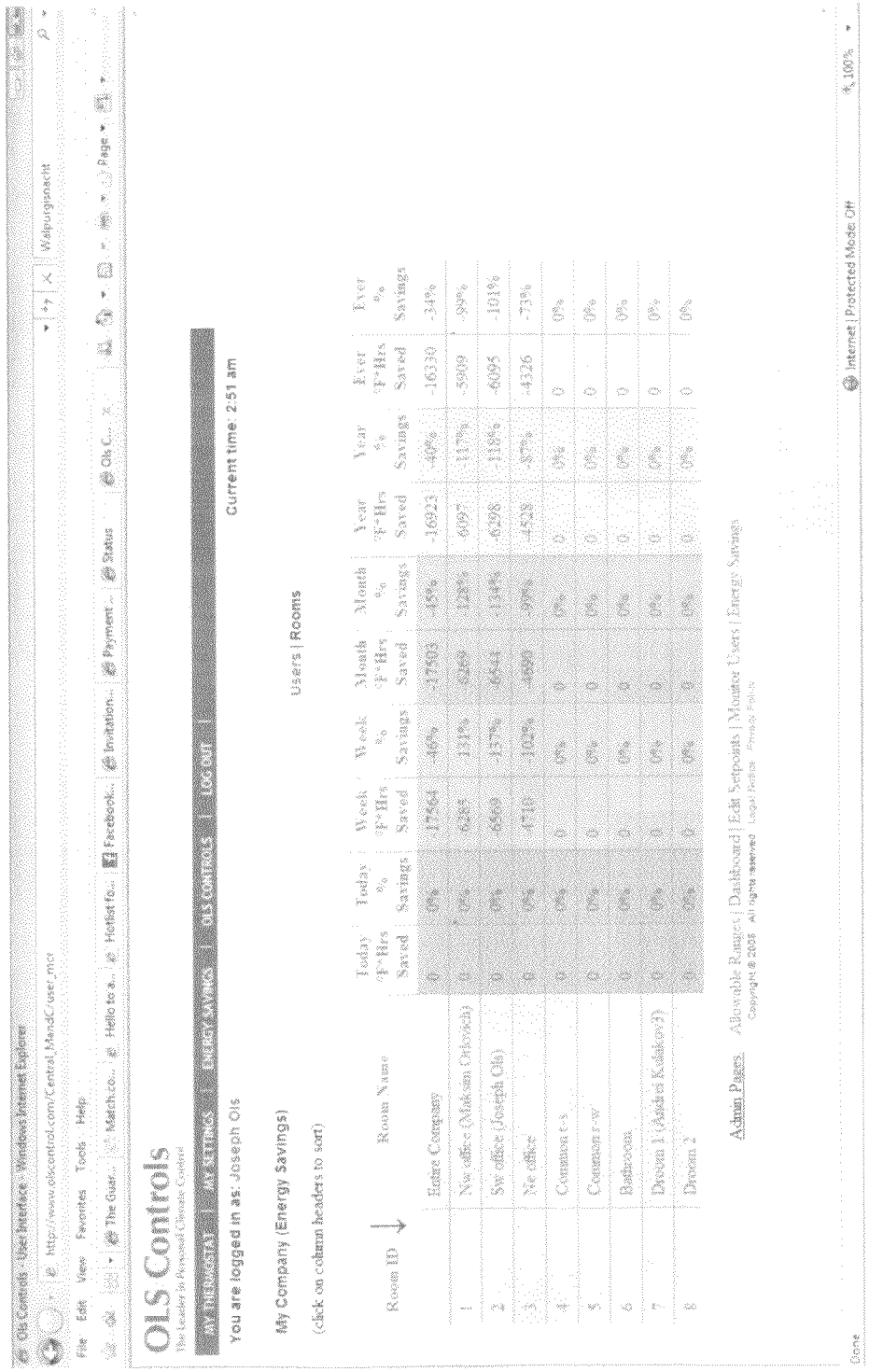
FIGS. 15A and B show screenshot of an embodiment of a Graphical User Interface for the system of FIG. 1.
Figure 15B:
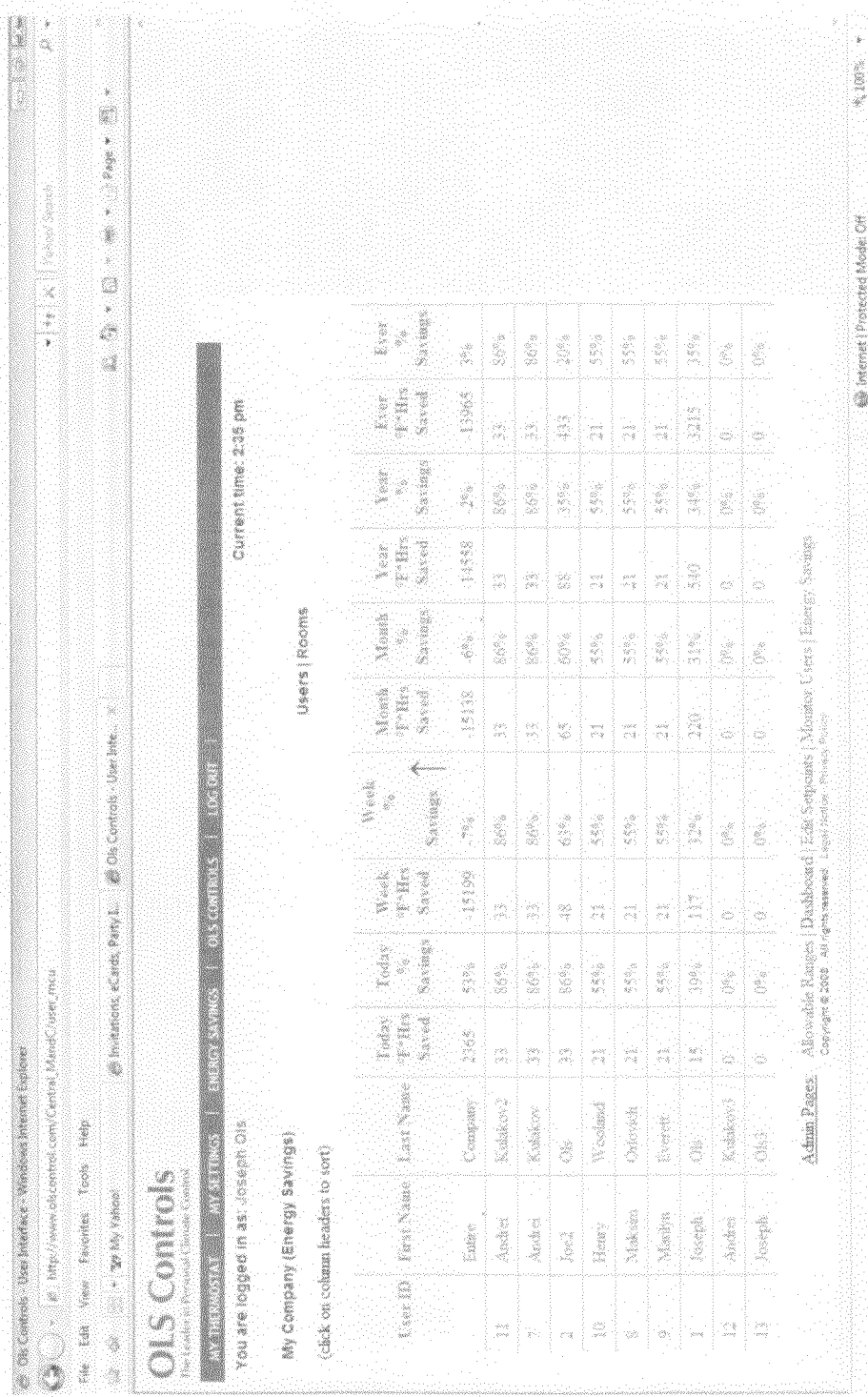

FIGS. 15A and B show screenshot of an embodiment of a Graphical User Interface for the system of FIG. 1. FIGS. 15A and B show a screenshot of a user interface that shows energy savings resulting form use of system 100. The energy savings of individual rooms and of the building as a whole are shown. Additionally, energy savings over different periods of time are also shows, such as the energy savings resulting from a given day, week, month, and/or year.

Figure 16:
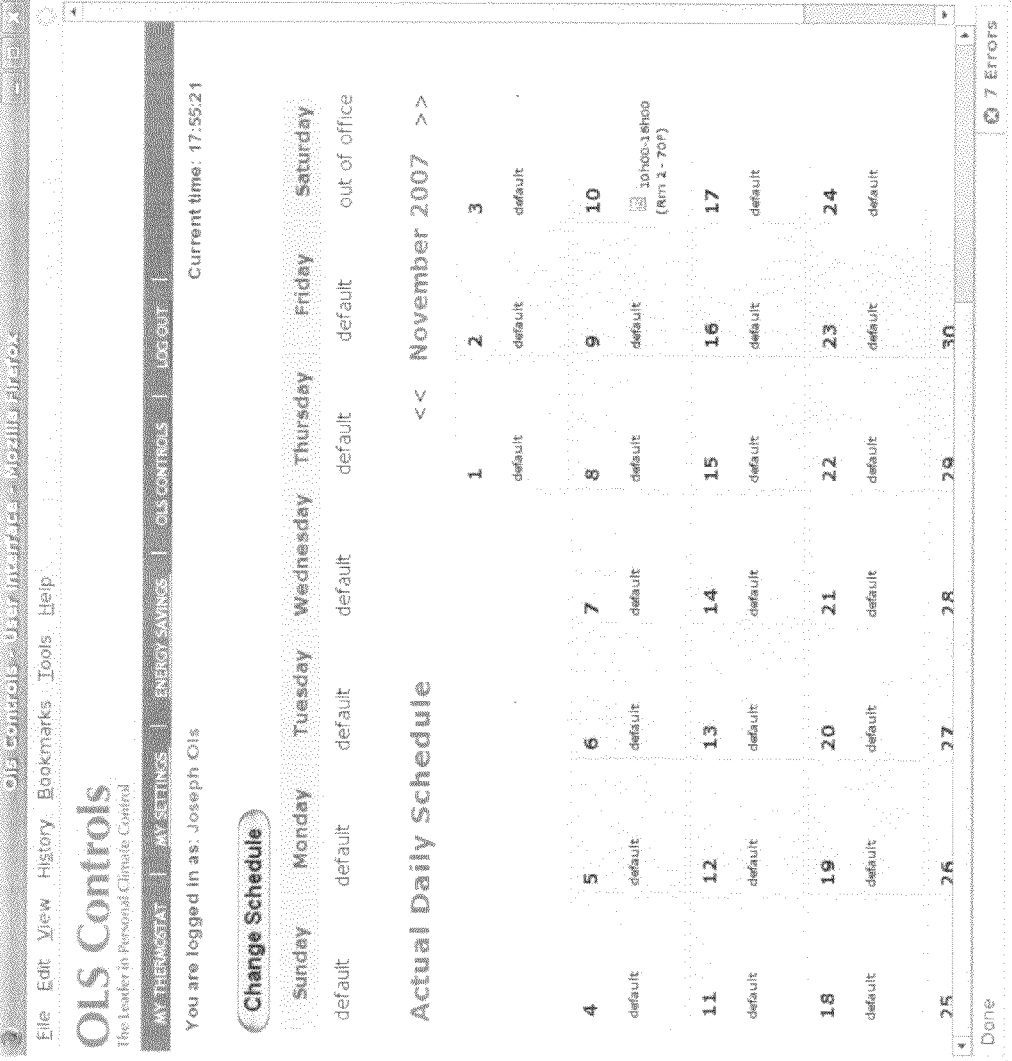
FIG. 16 shows screenshot of an embodiment of a Graphical User Interface for the system of FIG. 1.

FIG. 16 shows screenshot of an embodiment of a Graphical User Interface for the system of FIG. 1. FIG. 16 shows a calendar listing the settings that are to be applied for each day on the calendar. The Graphical User Interface of FIG. 16 is compatible with the Fire Fox browser.

Figure 17:
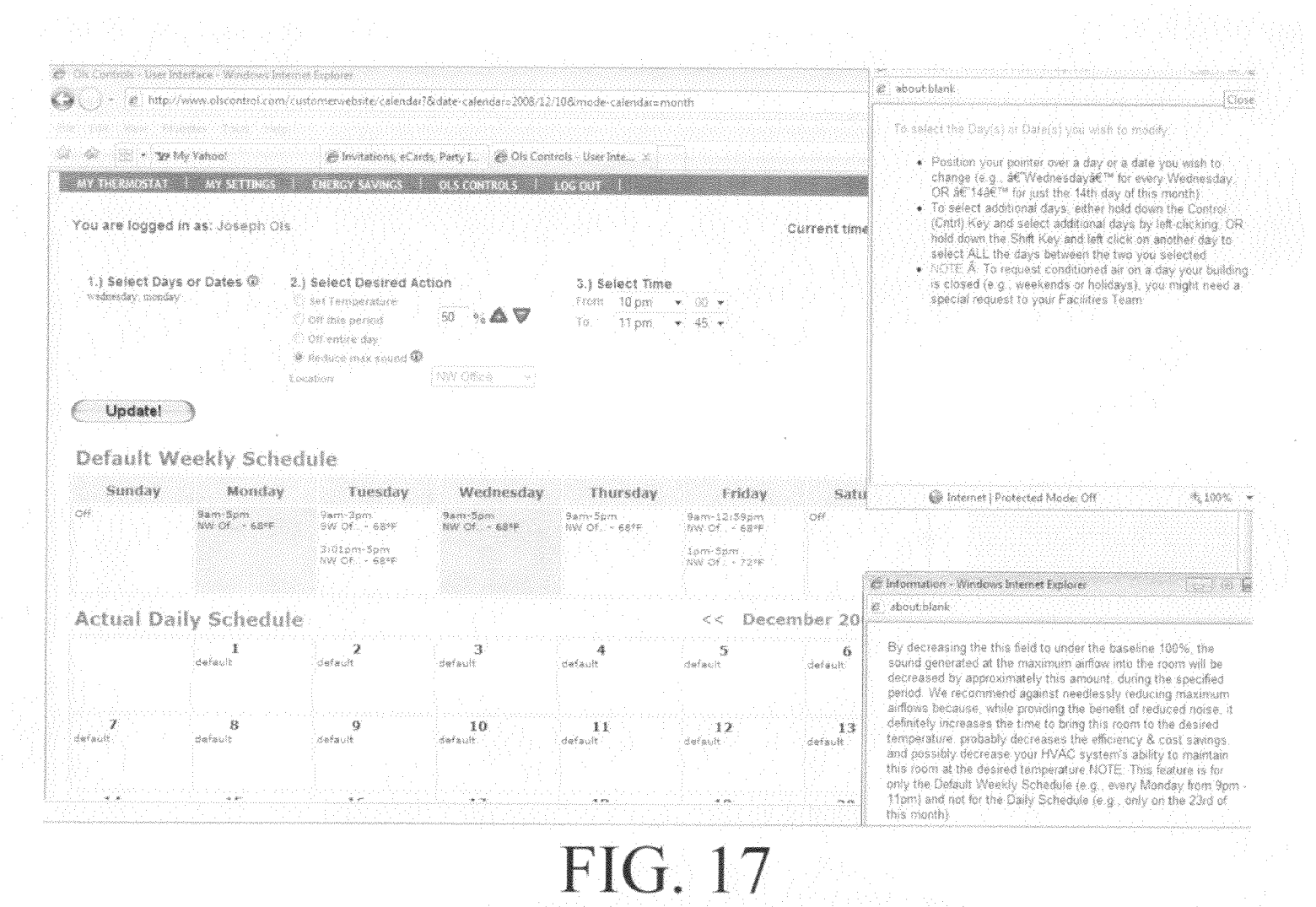

FIG. 17 shows screenshot of an embodiment of a Graphical User Interface for the system of FIG. 1. FIG. 17 shows a calendar listing the settings that are to be applied for each day on the calendar. The Graphical User Interface of FIG. 17 is compatible with the Internet Explorer browser.

Figure 18:
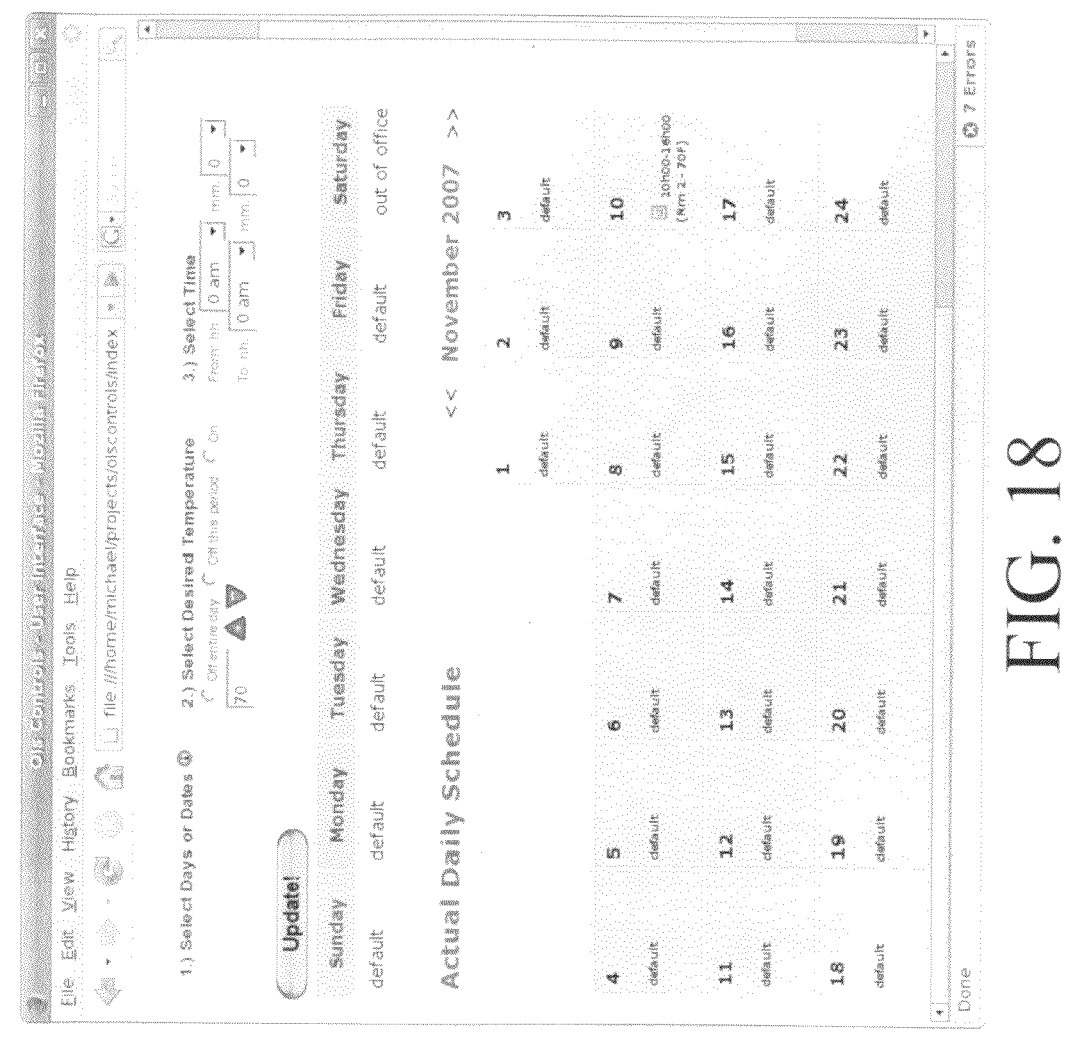

FIG. 18 shows screenshot of an embodiment of a Graphical User Interface for the system of FIG. 1. FIG. 18 shows links that may be used for changing the settings of a particular day or group of days.

Figure 19A:
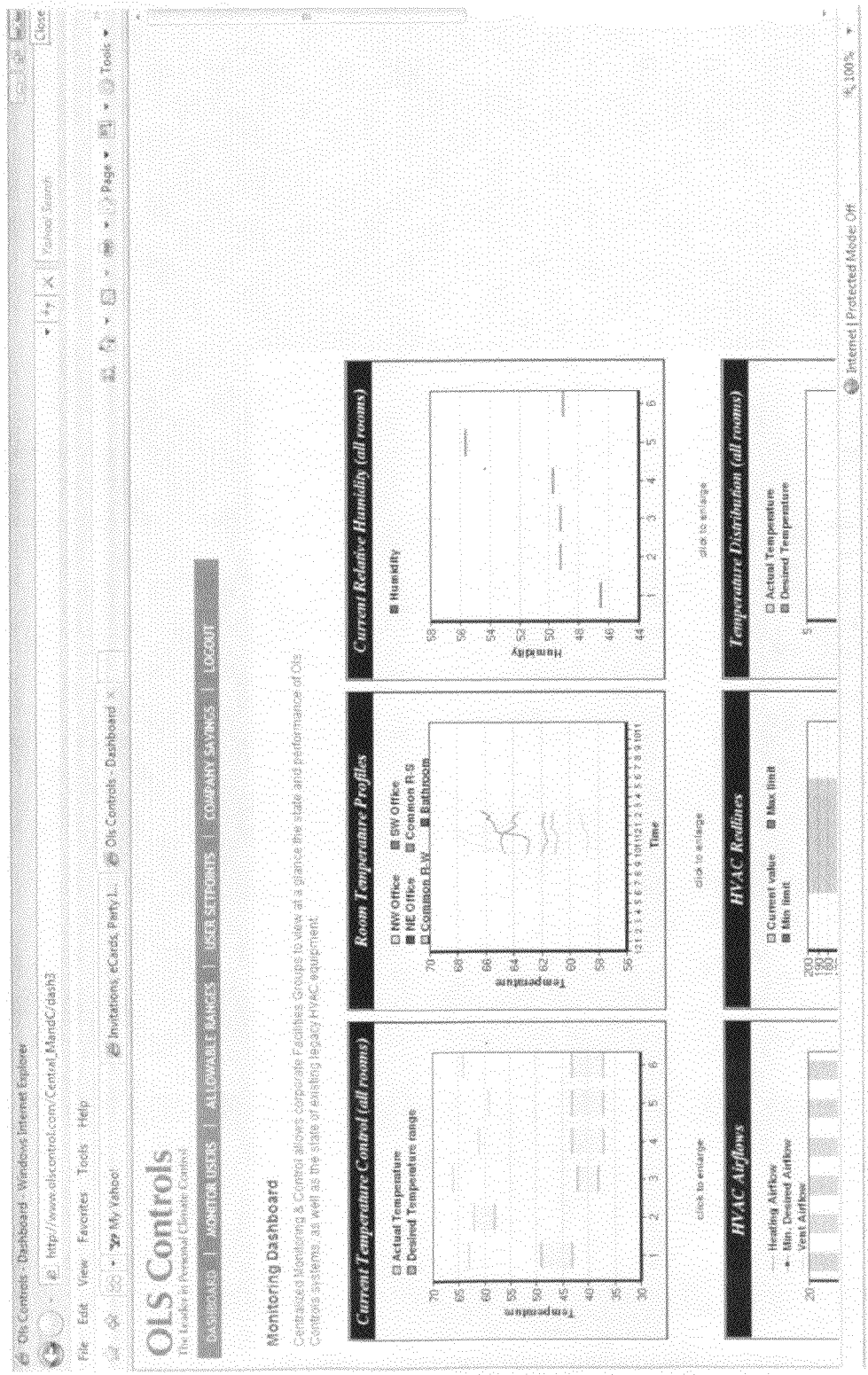
FIGS. 19A and B show screenshots of an embodiment of a Graphical User Interface which may be referred to as a 'Dashboard.'
Figure 19B:
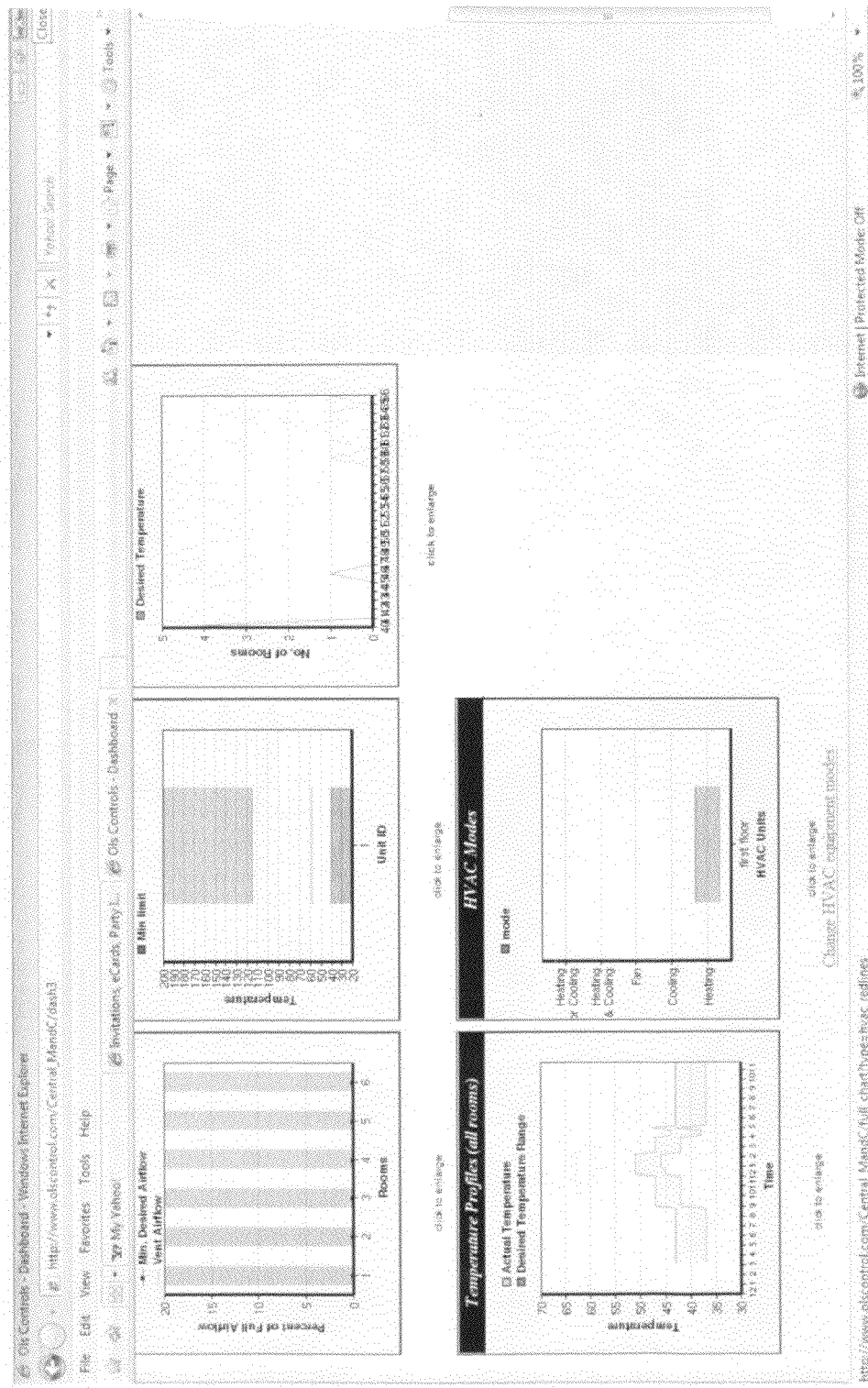

FIGS. 19A and B show two screenshots of an embodiment of a Graphical User Interface (which may be referred to as a 'Dashboard'), each screenshot show the GUI with different charts visible. Optionally, the GUI of FIGS. 19A and B may be used by and dedicated to a Chief Administrator of the system of FIG. 1, and may be used to see an overview the status of the system and of legacy system(s). FIGS. 19A and B show versions of other GUIs that are available for using.

Figure 20:
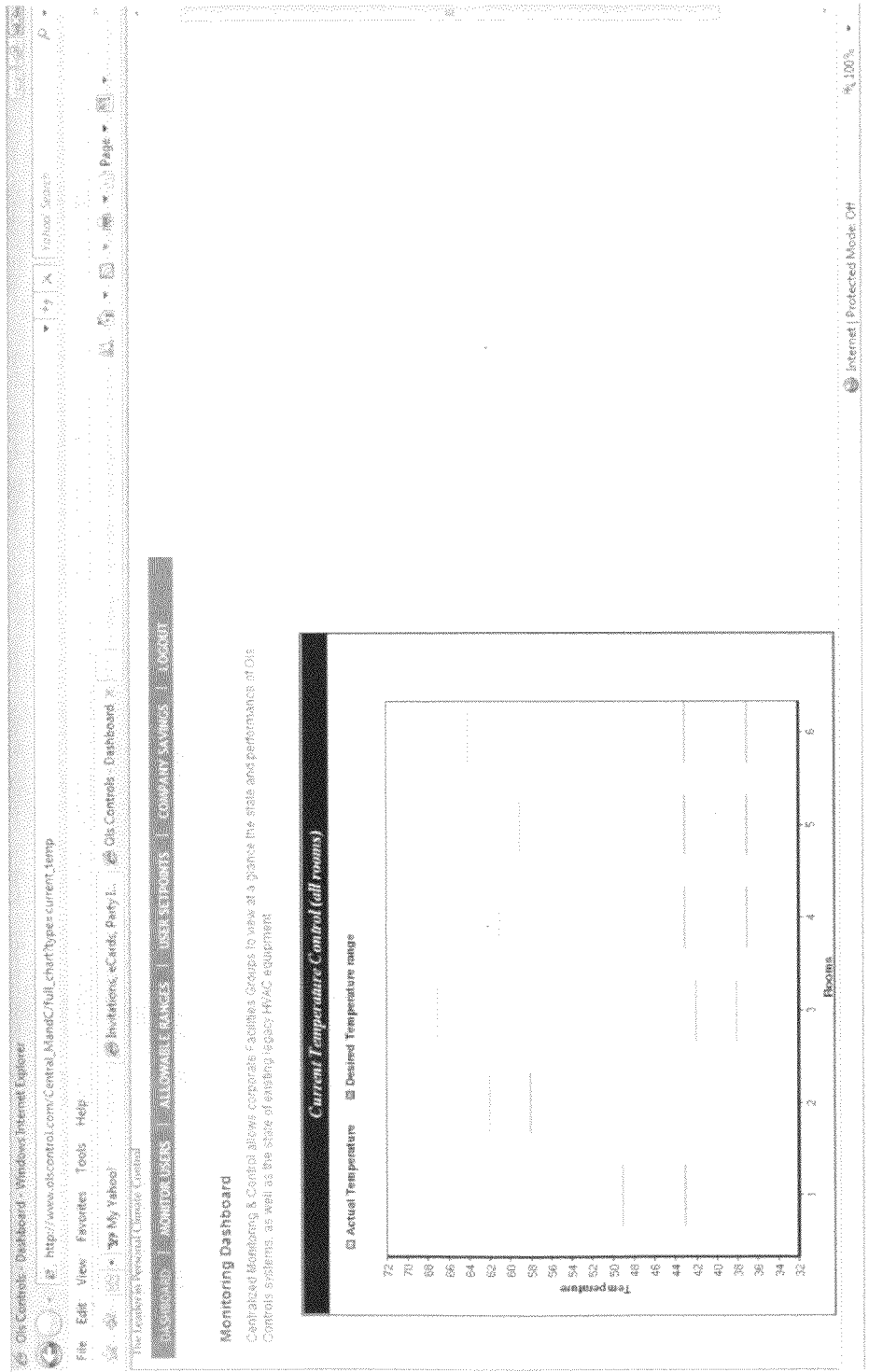
FIG. 20 shows an enlarged screenshot of an embodiment of one of the graphs in FIGS. 19A and B.

FIG. 20 shows an enlarged screenshot of one of the graphs in FIGS. 19A and B. FIG. 20 shows a plot of the desired temperature range (indicated as a rectangle) for each of several rooms and the actual temperature of that room (indicated as a line).

Figure 21:
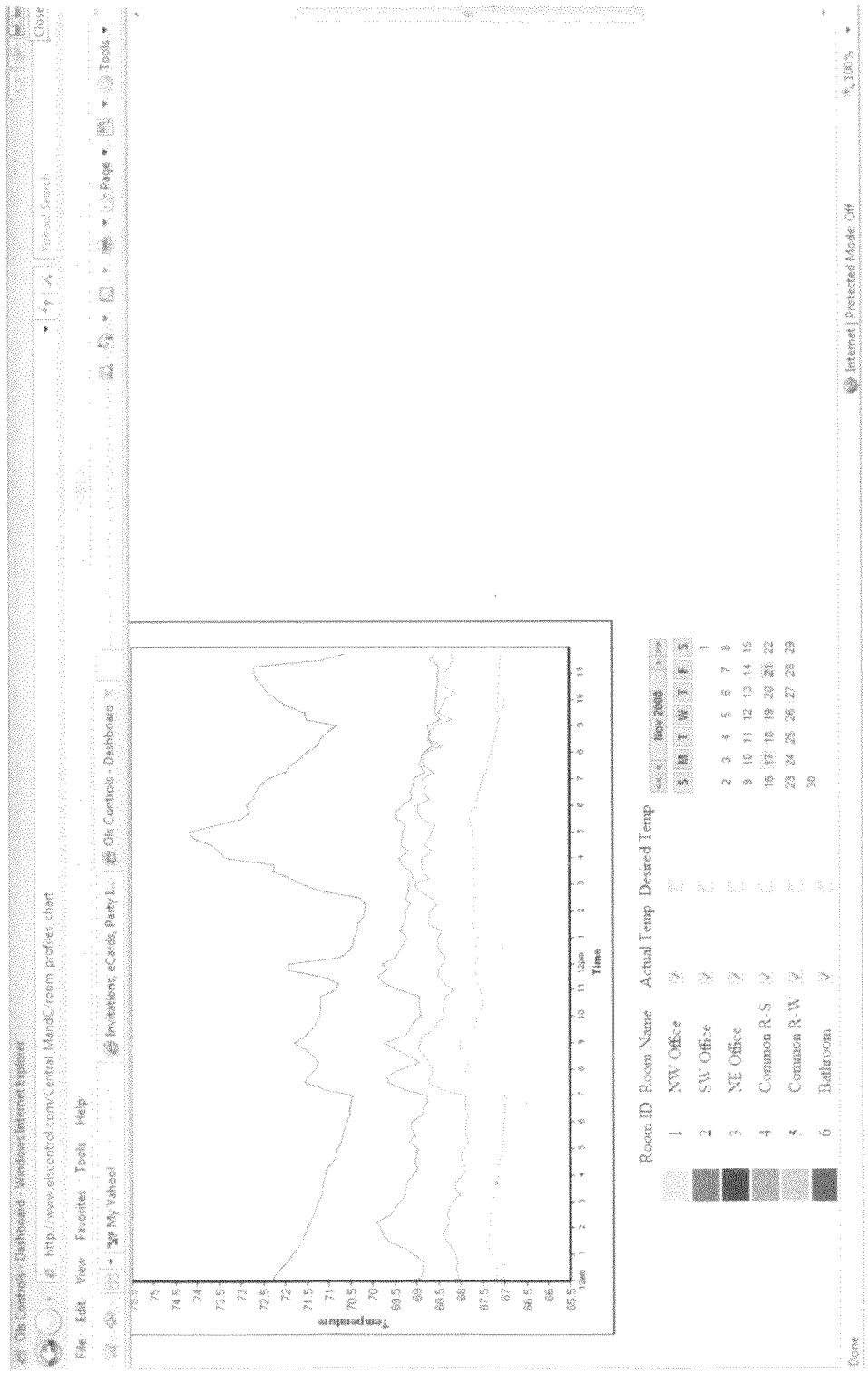
FIG. 21 shows an enlarged screenshot of an embodiment of one of the graphs in FIGS. 19A and B.

FIG. 21 shows an enlarged screenshot of one of the graphs in the GUI of FIGS. 19A and B. FIG. 21 shows a series of plots in which each plot shows the temperature of a different region (e.g., a different room or other region) as a function of time.

Figure 22:
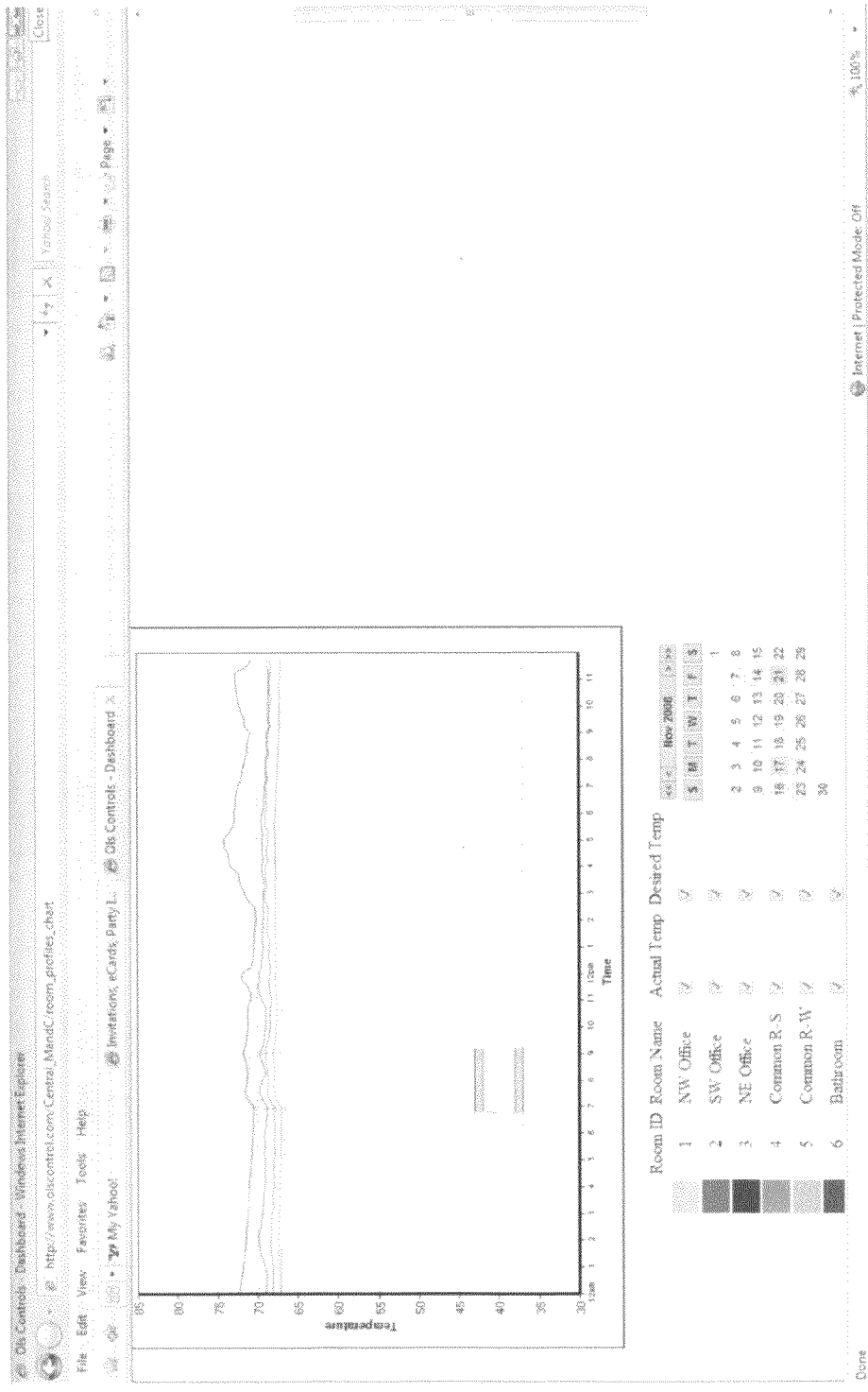
FIG. 22 shows an enlarged screenshot of an embodiment of graphing the parameters graphed in the GUI of FIG. 21 and other parameters (desired ranges vs. actual states) not shown in FIG. 21.

FIG. 22 shows an enlarged screenshot of plots other parameters (desired ranges vs. actual states) not shown in FIG. 21 in addition to showing plots of shown in FIG. 21. Specifically, FIG. 22 shows plots of the desired temperatures of each room (which is not shown in FIG. 21) in addition to showing the actual temperature (which is shown in FIG. 21).

Figure 23:
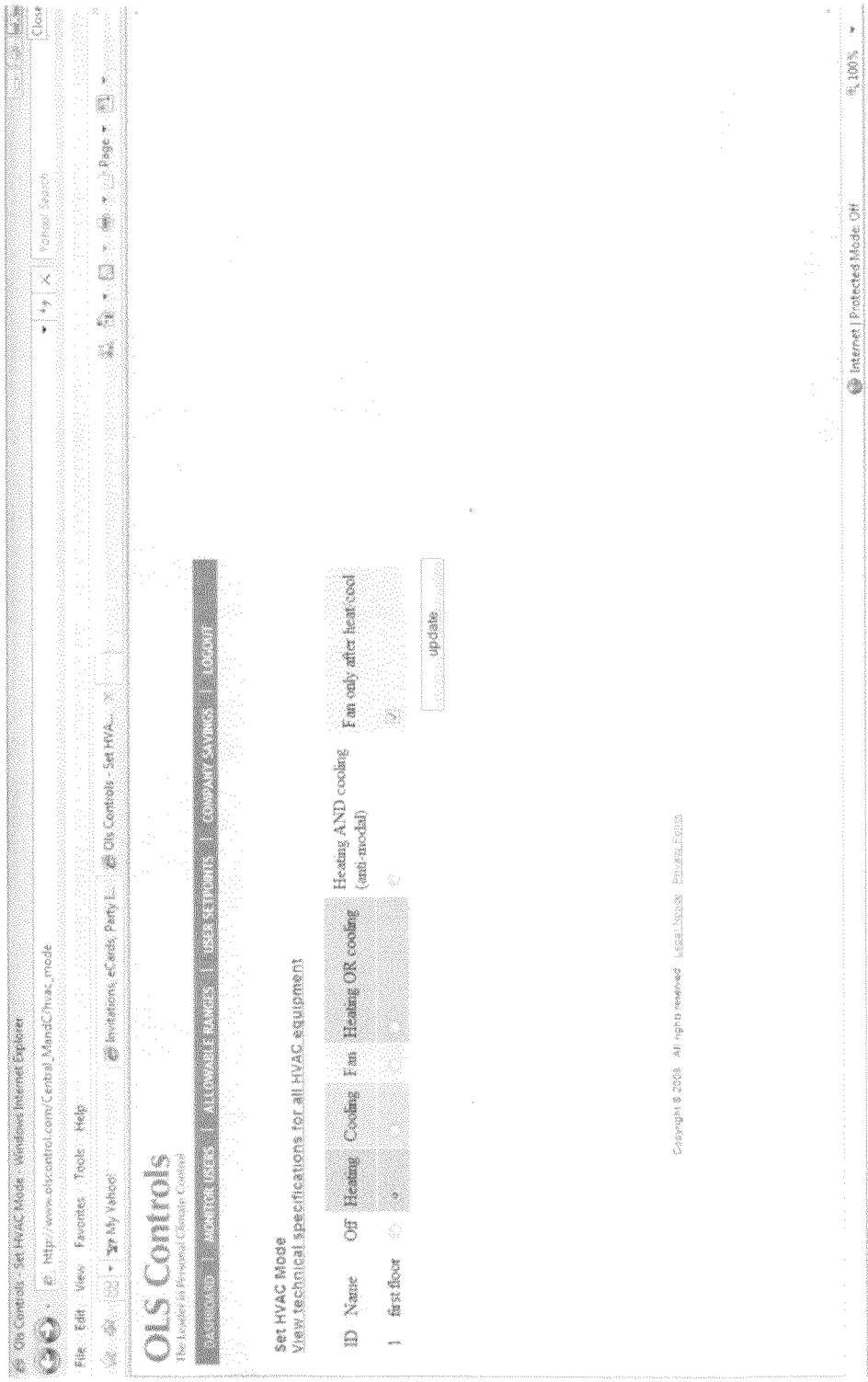
FIG. 23 shows a screenshot of an embodiment of a Graphical User Interface for setting the status of an HVAC System.

FIG. 23 shows a screenshot of an embodiment of a Graphical User Interface the system of FIG. 1. Similar to the GUI of FIGS. 19A and B, the GUI of FIG. 23 may be used for a Chief Administrator. The GUI of FIG. 23 may be used for setting the status of the HVAC System. Some examples of the statuses that the Chief Administrator may choose from are Heating only (which is a state in which only heating is available in all locations), Cooling Only (which is a state in which only cooling, e.g., air conditioning, is available in all locations), Fan only (which is a state in which only fan is available in all locations), Heating or Cooling (e.g., which is a state in which only one of heating or cooling is available in all locations, but which one is available depends on whichever a preponderance of locations desires), or Heating and Cooling (e.g., which is a state in which both heating and cooling may be available, and some rooms may be heated before the system switches over into cooling mode to cool other rooms—alternatively any user may decide whether to heat or cool their room independently of the which of the other rooms and whether the other rooms are heated or cooled).

Figure 24:
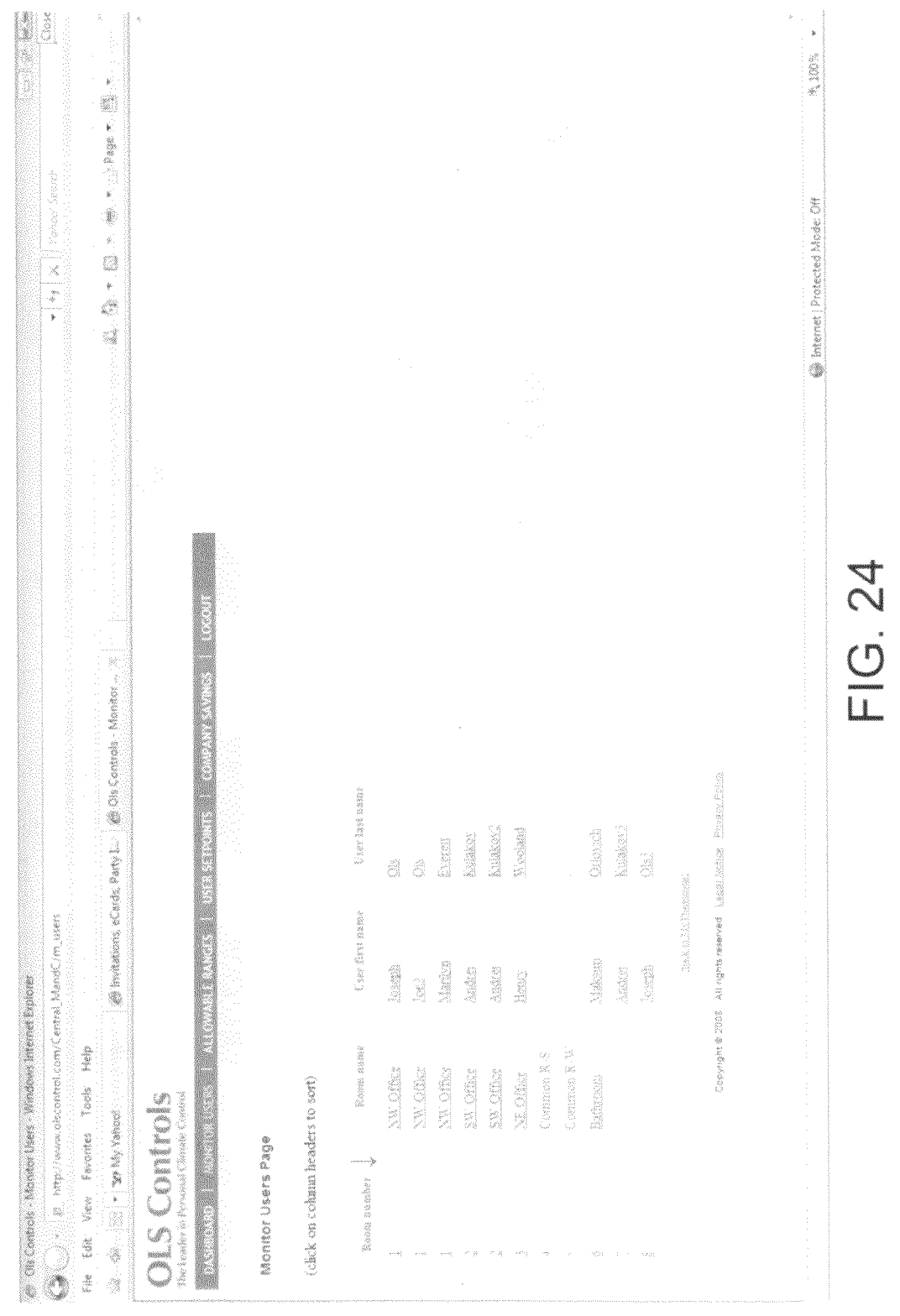

FIG. 24 shows a screenshot of an embodiment of a Graphical User Interface. The GUI of FIG. 24 may be used by a Chief Administrator of the system of FIG. 1, and may be used to monitor users and/or the room that the user occupies or is associated with.

Figure 25:
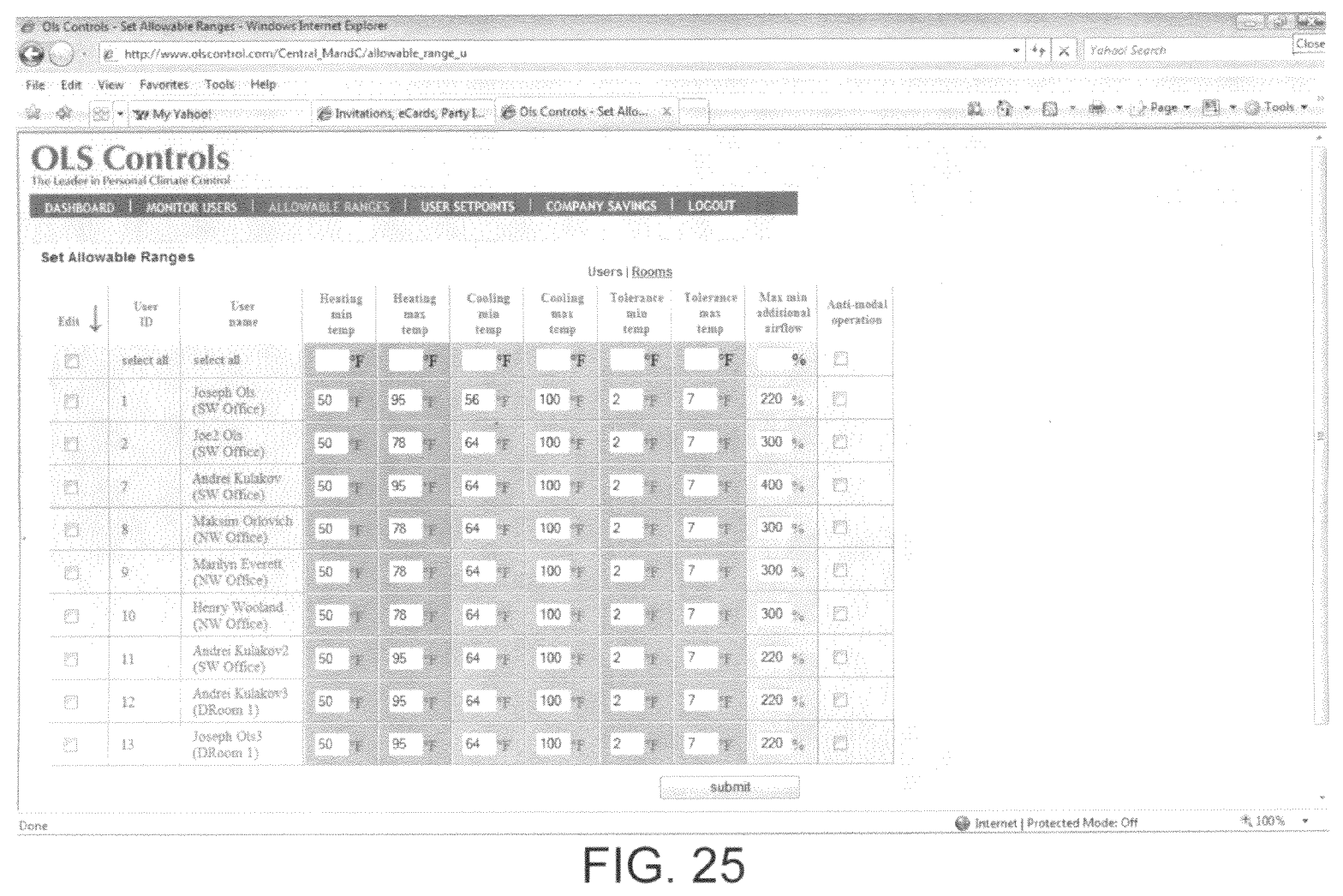

FIG. 25 shows a screenshot of an embodiment of a Graphical User Interface. Optionally, the GUI of FIG. 2 may be used by a Chief Administrator of the system of FIG. 1, and may be used to set allowable ranges for heating, cooling, temperature tolerance and airflow for individual regions, rooms, and/or people. The GUI of FIG. 25 may also be used to determine if a room or user may receive anti-modal operation (e.g., if the system is heating all other areas, a room/person may get cooling if desired, such as a computer room, which must stay cool).

Figure 26:
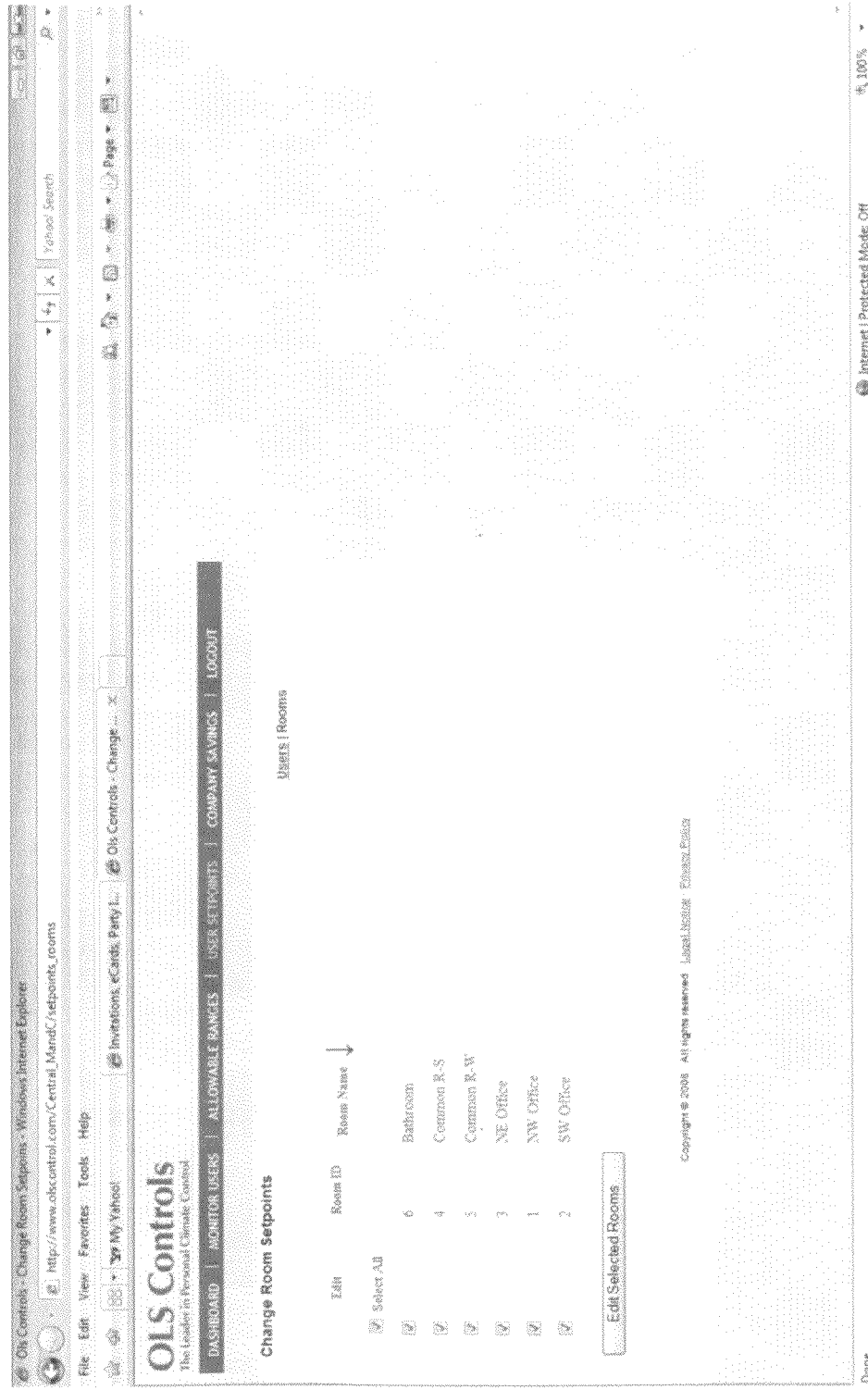
FIG. 26 shows a screenshot of an embodiment of a Graphical User Interface of FIG. 1 to set or to change (e.g., override) setpoints for rooms and/or users.

FIG. 26 shows a screenshot of an embodiment of a Graphical User Interface. Optionally, the GUI of FIG. 26 may be used by a Chief Administrator of the system of FIG. 1, and may be used to set or to change (e.g., override) setpoints for individual rooms and/or users. The GUI of FIG. 26 may include a menu of links that may be selected independently of one another. Each link may allow the administrator to edit select points associated with the selected rooms, regions, and/or people.

OTHER ALTERNATIVE EMBODIMENTS

In an embodiment, heating/AC system 104 may contain one or more fans, heaters and/or air cooling units for altering the temperature conditions of any of a plurality of associated environments (e.g. rooms 113*aa*-113*nm*, discussed below). The temperature altering affect of heating/AC system 104 may involve causing heated, cooled or unaltered air to flow, or cease its flow, into rooms 113*aa*-113*nm*. The temperature altering affect is controlled via the activation or deactivation of components of heating/AC system 104, as directed by legacy controller 102.

In an embodiment, evaluator 830 may function as a temperature and/or humidity anticipator containing variables for computation. For example, a variable for the heating/cooling state of one of controllers 124*a*-124*n* (which were discussed in conjunction with FIG. 1), a variable for the temperature a few degrees higher than the current temperature, and a variable for a temperature a few degrees lower than current temperature. The higher variable being used when the one of controllers 124*a*-124*n* is in a "heating" state, and the lower variable being used when the one of controllers 124*a*-124*n* is in a "cooling state." As a result of reporting the higher temperature to an associated one of controllers 124*a*-124*n*, the one of controllers 124*a*-124*n* causes the heating of a room 113*a*-113*n* to end prematurely, preventing excess heating of a room 113*a*-113*n*. Similarly, as a result of reporting the lower temperature to an associated one of controllers 124*a*-124*n*, the one of controllers 124*a*-124*n* causes the cooling of a room 113*a*-113*n* to end prematurely, preventing excess cooling of a room 113*a*-113*n*. The exceeding of desire climate settings during the process of sensing the climate details is thereby reduced in comparison to what would be expected if optional processor 506 were not present.

In an embodiment, retrofit system 102 may be associated with one or more services related to managing the components and features of retrofit system 102. For example, a service may be provided for reducing the peak power consumption of environments (e.g. offices and/or homes) within which retrofit control system 102. Further, the service may include a fee based software for monitoring and executing the capabilities of a system 100 on which retrofit control system 102 is installed. In an embodiment, the software may include an artificial intelligence for interpreting variances in the capabilities of a system 100, over time, and may determine and/or initiate corrective measures for maintaining operating parameters and/or energy consumption rates determined by users of system 100. In an embodiment, the associated services requires no or reduced immediate cost, and is structured to ensure recurring costs which are lesser in amount than energy savings provided by retrofit system 102.

In another embodiment, the equipment and installation of retrofit system 100 are optimized for efficiency in relation to comparable systems. For example, the mechanical dampers of retrofit system 102 (e.g. damper 204) are formed within an air duct, and may thereby eliminate the need to cut or detach segments of the existing ductwork, drill holes, wrap components with duct tape, install set screws, fit external damper motors, remove drywall and/or other labor intensive measures associated with installing climate control system components. A further example may include the use of a compressible material around the periphery of the damper to reduce airflow leaks and to simultaneously position the damper firmly and or permanently into the duct.

Peer to peer network 132 is a communicative network between controllers 124*a*-124*n*. Peer to peer network 132 transfers status, settings and history data of amongst controllers 124a-124n and between one or more controllers 124a-124n and computers 120aa-120nm and/or remote server 134. Further, peer to peer network 132 may transfer instructions amongst controllers 124a-124n and between one or more controllers 124a-124n and computers 120aa-120nm and/or remote server 134. In an embodiment, one of controllers 124a-124n, computers 120aa-120nm, or remote server 134 may function as a parent node (e.g. master controller) for establishing and monitoring the communicative link and/or relationships between other controllers 124a-124n, computers 120aa-120nm, or remote server 134, which function as child nodes (e.g. slave controllers). As a result of the link, the component functioning as the parent node of peer to peer network 132 may have access to the status, settings, operation history and functions of other controllers, computers and remote servers of retrofit system 102. In an embodiment, peer to peer network 132 may be used in conjunction with code, such as code 808 and 908 (of FIGS. 8 and 9, respectively) to track history settings (e.g. previous temperatures, operations of a controller 124a-124n associated with a room 113aa-113nm, and measurements of time required to achieve desired climates). As a result of the tracking, intelligent methods of code 808 and 908 may make operational adjustments to the user commands sent to a controller 124a-124n to optimize the performance and energy saving features of retrofit system 102, and predict techniques for attaining desired temperature changes more quickly.

The invention claimed is:

1. A system comprising:
   climate control equipment; and
   a controller for directly controlling climate control equipment by turning the climate control equipment on and off to obtain a desired setting, the controller being connected to the climate control equipment, and the controller connecting to a thermostat interface, circumventing a legacy controller;
   one or more sensors for sensing climate parameters including at least temperature and humidity, the sensor being communicatively coupled to the controller;
   the controller storing instructions that cause the controller to maintain a humidity adjusted temperature in an area.

2. The system of claim 1, the system being configured to include a mode in which the interface displays
   a humidity adjusted temperature, the humidity adjusted temperature being a temperature at a current humidity that is expected to feel as comfortable to the user as the current temperature at a predetermined reference humidity; and
   input a setting that allows the user to set a desired humidity adjusted temperature, which will cause the controller to adjust the temperature or humidity until temperature at a current humidity is a temperature that is expected to feel as comfortable to the user as a predetermined desired temperature at a predetermined reference humidity, the reference humidity being different than the current humidity.

3. A system comprising:
   climate control equipment; and
   a controller for directly controlling climate control equipment by turning the climate control equipment on and off to obtain a desired setting, the controller being connected to the climate control equipment, and the controller connecting to a thermostat interface, circumventing a legacy controller;
   the controller storing
   a plurality of climate preference settings with each climate preference setting corresponding to a different user;
   instructions for regulating the climate of plurality of locations, the instructions causing the controller to regulate the climate of each location at a given time based on the climate preference settings of each user expected to be at that location at the given time.

4. A system comprising:
   climate control equipment; and
   a controller for directly controlling climate control equipment by turning the climate control equipment on and off to obtain a desired setting, the controller being connected to the climate control equipment, and the controller connecting to a thermostat interface, circumventing a legacy controller;
   the controller storing one or more instructions that cause the controller to
   determine through which of a plurality of vents to pull air through, each of the plurality of vents being installed in a building in which the system is installed, based at least on a current mode of operation and a current climate in a plurality of locations, each of the plurality of locations being one of a set of at least two locations between which air is transmitted via at least one of the plurality of vents.

5. A system comprising:
   climate control equipment; and
   a controller for directly controlling climate control equipment by turning the climate control equipment on and off to obtain a desired setting, the controller being connected to the climate control equipment, and the controller connecting to a thermostat interface, circumventing a legacy controller;
   the controller storing one or more instructions that causes the controller to
   send air to a first room having a first climate condition, in response to a climate measurement, to adjust the first room to have a second climate condition based on a climate setting for the first room;
   transfer the air having the first climate condition from the first room to a second room having air of a third climate condition to adjust the second room to have a fourth climate condition, based on a climate setting for the second room.

6. A system comprising:
   climate control equipment having
     climate modifying equipment,
     circuitry that controls the climate modifying equipment,
     a thermostat interface with a set of parameters that are controlled via the thermostat interface,
     the circuitry communicating with the thermostat interface, the circuitry having portions for controlling each parameter of the set of parameters by controlling the climate modifying equipment in a particular way for each parameter; and
   a controller for controlling the climate control equipment, the controller being connected to the climate control equipment via the thermostat interface and controlling at least a subset of the parameters, the controller controlling at least one of the parameters via the thermostat interface, but in a different manner than the particular way for that parameter.

7. The system of claim 6, the set of parameters including an intermediate setting for at least one piece of equipment of the climate modifying equipment, the controller turning on and off the piece of equipment instead of activating the intermediate setting.

8. The system of claim 6, the circuitry including a programmable timer via which a schedule of times of when different climate settings are applied are programmable, the controller having a separate programmable timer and scheduling when the different climate settings will be applied without programming the programmable timer of the circuitry.

9. A system comprising:
climate control equipment; and
a controller configured to directly control climate control equipment by turning the climate control equipment on and off to obtain a desired setting, the controller being connected to the climate control equipment, and the controller connecting to a thermostat interface, the turning of the climate control equipment to an on state and to an off state, via the thermostat interface, to obtain a desired setting circumvents a legacy controller that is also configured to obtain the desired setting, the desired setting being a setting that is not obtainable by keeping the climate control equipment always in the on state or always in the off state.

10. The system of claim 9, further comprising:
a plurality of locations, each location having at least one damper;
the controller storing instructions that cause the controller to adjust each damper based on user chosen climate preferences, the instructions causing the controller to adjust the position of each damper based on a separate set of climate settings.

11. The system of claim 9, the controller storing one or more instructions that cause the controller to
store a list of locations,
automatically identify a group of the locations that have similar settings and create a dynamic zone for the group of locations identified.

12. The system of claim 9, the controller storing one or more instructions that cause the controller to
determine through which of a plurality of vents to take air in from outside of a building in which the system is installed, based at least on a current outside climate, a current inside climate, and a current mode of operation.

13. The system of claim 9, the controller storing one or more instructions that causes the controller to
send relatively cool air to a first room having relatively hot air, in response to a temperature measurement, to maintain a climate condition based on a climate setting for the first room;
transfer the relatively hot air from the first room to a second room having relatively cool air to cool the second room, based on a climate setting for the second room;
the relatively cool air being cool relative to the relatively hot air, and the relatively hot air being hot relative to the relatively cool air.

14. The system of claim 9, the controller storing one or more instructions that causes the controller to
send relatively hot air to a first room having relatively cool air, in response to a temperature measurement, to maintain a climate condition based on a climate setting for the first room;
transfer the relatively cool air from the first room to a second room having relatively hot air to cool the second room, based on a climate setting for the second room;
the relatively cool air being cool relative to the relatively hot air, and the relatively hot air being hot relative to the relatively cool air.

15. The system of claim 9, the controller including a neural network that learns relationships between control instructions sent to the climate control equipment and resulting climate changes in different parts of a building whose climate is being controlled by the climate control equipment, based on recorded data of past changes in climate caused by control instructions implemented by the climate control equipment in the past.

16. The system of claim 9, the controller including a learning algorithm, which when implemented causes the controller to learn relationships between control instructions sent to the climate control equipment and resulting climate changes in different parts of a building whose climate is being controlled by the climate control equipment, based on recorded data of past changes in climate caused by control instructions implemented by the climate control equipment in the past.

17. The system of claim 9, the controller storing one or more instructions that causes the controller to
maintain air flow past a heat exchanger above a certain level for safe operation of the heat exchanger.

18. The system of claim 11, the controller storing machine instructions that handle climate settings of locations of a dynamic zone being no different than locations of any zone.

19. The system of claim 9, the turning of the climate control equipment on and off to obtain the desired setting including at least pulsing the climate control equipment on and off.

20. The system of claim 9, further comprising:
the controller storing instructions that cause the controller to adjust the at least one damper of each of plurality of locations based on user chosen climate preferences, each location having at least one damper, the instructions causing the controller to adjust the position of the at least one damper of each location based on a separate set of climate settings, each separate set of climate settings corresponding to a different set of user chosen climate preferences.

21. The system of claim 20, the instructions including at least one instruction for associating each set of user instructions with a different user.

22. The system of claim 9, further comprising:
the controller storing instructions that cause the controller
to receive sensor information indicative of locations of specific users;
to determine a location for each specific user;
to associate different climate settings with different users and adjust climate settings of each location based on which users are currently present at that location and the climate settings associated with the users currently at that location
to send signal to adjust positions of dampers at each location to facilitate adjusting climate parameters to meet the settings.

23. The system of claim 9, the instructions include instructions for the controller to choose a set of climate settings to apply to that location based on the user associated with that set of climate settings having a particular status and being at that location.

24. The system of claim 9, the controller storing instructions for collecting feedback from multiple sensors, each of the multiple sensors sensing the same climate parameter, the instructions determining one setting for that climate parameter for the room based on each of the feedback from each of the multiple sensors and a record of prior settings correlated with prior feedback from the multiple sensors.

25. The system of claim 9, the controller storing instructions for dividing a single room into multiple zones, collecting feedback from multiple sensors, each of the multiple sensors sensing the same climate parameter; the instructions determining multiple setting for that climate parameter based on the feedback; each of the multiple settings being applied to a different zone of the room.

* * * * *